United States Patent
Panfilov et al.

(10) Patent No.: US 7,219,087 B2
(45) Date of Patent: *May 15, 2007

(54) SOFT COMPUTING OPTIMIZER OF INTELLIGENT CONTROL SYSTEM STRUCTURES

(75) Inventors: Sergey A. Panfilov, Crema (IT); Ludmila Litvintseva, Crema (IT); Sergey V. Ulyanov, Crema (IT); Viktor S. Ulyanov, Moscow (RU); Kazuki Takahashi, Crema (IT)

(73) Assignee: Yamaha Hatsudoki Kabushiki Kaisha (JP)

( * ) Notice: Subject to any disclaimer, the term of this patent is extended or adjusted under 35 U.S.C. 154(b) by 299 days.

This patent is subject to a terminal disclaimer.

(21) Appl. No.: 10/897,978

(22) Filed: Jul. 23, 2004

(65) Prior Publication Data

US 2005/0119986 A1 Jun. 2, 2005

Related U.S. Application Data

(60) Provisional application No. 60/490,397, filed on Jul. 25, 2003.

(51) Int. Cl.
 G05B 13/00 (2006.01)
 G05B 13/04 (2006.01)
 G05B 15/00 (2006.01)
 G05B 17/00 (2006.01)

(52) U.S. Cl. ............... 706/23; 706/1; 706/19; 700/28; 700/50

(58) Field of Classification Search ............ 706/59, 706/8, 50, 1, 23, 19; 700/28, 50
See application file for complete search history.

(56) References Cited

U.S. PATENT DOCUMENTS

| | | | |
|---|---|---|---|
| 5,111,531 A | 5/1992 | Grayson et al. | |
| 5,142,877 A | 9/1992 | Shimizu | |
| 5,159,660 A | 10/1992 | Lu et al. | |
| 5,204,718 A | 4/1993 | Morita | |
| 5,208,749 A | 5/1993 | Adachi et al. | |
| 5,214,576 A | 5/1993 | Tani et al. | |
| 5,263,123 A * | 11/1993 | Hayashi .................. | 706/45 |
| 5,268,835 A | 12/1993 | Miyagaki et al. | |
| 5,285,377 A | 2/1994 | Sugasaka et al. | |
| 5,305,230 A | 4/1994 | Matsumoto et al. | |
| 5,324,069 A | 6/1994 | Ogawa | |
| 5,349,646 A * | 9/1994 | Furuta et al. ............ | 706/23 |
| 5,361,628 A | 11/1994 | Marko et al. | |
| 5,367,612 A | 11/1994 | Bozich et al. | |
| 5,372,015 A | 12/1994 | Suzuki et al. | |
| 5,434,951 A | 7/1995 | Kuwata | |
| 5,471,381 A | 11/1995 | Khan | |
| 5,483,450 A | 1/1996 | Titli et al. | |
| 5,488,562 A | 1/1996 | Otterbein et al. | |
| 5,539,638 A | 7/1996 | Keeler et al. | |
| 5,557,520 A | 9/1996 | Suissa et al. | |
| 5,740,323 A * | 4/1998 | Nomura et al. ............ | 706/13 |
| 5,815,198 A | 9/1998 | Vachtsevanos et al. | |
| 5,877,954 A | 3/1999 | Klimasauskas et al. | |
| 5,912,821 A | 6/1999 | Kobayashi | |
| 5,928,297 A | 7/1999 | Murata et al. | |
| 5,943,660 A | 8/1999 | Yesildirek et al. | |
| 5,971,579 A | 10/1999 | Kim | |
| 6,021,369 A | 2/2000 | Kamihira et al. | |
| 6,064,996 A | 5/2000 | Yamaguchi et al. | |
| 6,188,988 B1 * | 2/2001 | Barry et al. ............... | 705/3 |
| 6,411,944 B1 * | 6/2002 | Ulyanov .................. | 706/13 |
| 6,463,371 B1 * | 10/2002 | Ulyanov et al. ........... | 701/40 |
| 6,490,237 B1 * | 12/2002 | Supino .................... | 369/59.1 |
| 6,496,761 B1 * | 12/2002 | Ulyanov et al. ........... | 701/37 |
| 6,701,236 B2 * | 3/2004 | Ulyanov et al. ........... | 701/40 |
| 6,711,556 B1 * | 3/2004 | Sepe et al. ............... | 706/6 |
| 6,721,718 B2 * | 4/2004 | Ulyanov .................. | 706/2 |
| 6,735,576 B1 * | 5/2004 | Kaji et al. ............... | 706/1 |
| 6,829,604 B1 * | 12/2004 | Tifft .................... | 707/5 |
| 2002/0016665 A1 * | 2/2002 | Ulyanov et al. ........... | 701/106 |
| 2002/0099673 A1 * | 7/2002 | Pappalardo et al. ........ | 706/1 |
| 2003/0078899 A1 * | 4/2003 | Shanahan .................. | 706/8 |

| | | | |
|---|---|---|---|
| 2003/0093392 A1 | 5/2003 | Ulyanov | |
| 2004/0024750 A1* | 2/2004 | Ulyanov et al. | 707/3 |
| 2004/0030420 A1* | 2/2004 | Ulyanov et al. | 700/48 |

FOREIGN PATENT DOCUMENTS

| | | |
|---|---|---|
| EP | 1 085 460 | 3/2001 |
| JP | 10268904 A | 10/1998 |

OTHER PUBLICATIONS

Fuzzy Control of Rider-Motorcycle System Using Genetic Algorithm and Auto-Tuning. J.C. Wu and T.S. Liu. Mechatronics vol. 5, No. 4, pp. 441-455, 1995.*
A Model for a Rider-Motorcycle System Using Fuzzy Control. T.S. Lui and J.C. Wu. IEEE Transactions on Systems, Man, and Cybernetics, vol. 23, No. 1, pp. 267-276, 1993.*
J.C. Wu and T.S. Liu, Fuzzy Control of Rider-Motorcycle System Using Genetic Algorithm and Auto-Tuning, Mechatronic vol. 5, pp. 441-455. 1995.*
Antony Satyadas and K. Krishnakumar, GA-optmized Fuzzy Controller for Spacecraft Attitude Control, IEEE, pp. 1979-1984. 1994.*
Bose, Bimal K., (1994), "Expert System, Fuzzy Logic, and Neural Network Applications in Power Electric and Motion Control," Processing of the IEEE, vol. 82, No. 8, pp. 1303-1323.
Chen, Jen-Yang, "An Integration Design Approach in PID Controller," IEEE, 1999, pp. 901-907.
Dote, Y., "Real Time Nonlinear Learning Control for Robotic Manipulator Using Novel Fuzzy Neural Network," IEEE International Conference on System, Man, and Cybernetics, Oct. 1998.
Feng Q and Yamafuji K., (1988), "Design and Simulation of Control System of An Inverted Pendulum," Robotica, vol. 6, No. 3, pp. 235-241.
Gradetsky V.G. and Ulyanov S.V., (1993), "Mobile System With Wall Climbing Robots," Intern. J. of Computer and Systems Sciences, vol. 31, No. 1, pp. 126-142.
Johansson R., Magnusson M. and Fransson P.A., (1995), "Galvanic Vestibular Stimulation for Analysis of Postural Adaptation and Stability," IEEE Transactions on Biomedical Engineering, vol. 42, No. 3, pp. 282-292.
Ju M.S., Yi S.G., Tsuei Y.G, and Chou Y.L., (1995), "Fuzzy Control of Electrohydraulic Above-Knee Prostheses," JSME International Journal, vol. 38, No. 1, pp. 78-85.
Lee Y.N., Kim T.W. and Suh I.H., (1994), "A Look-Up Table-Based Self Organizing Fuzzy Plus Linear Controller," Mechatronics, vol. 4, Vo. 1, pp. 71-90.
Liu T.S. and Wu J.C., (1993), "A Model For Rider-Motorcycle System Using Fuzzy Control," IEEE Transactions on Systems, Man and Cybernetics, vol. 23 SMC, No. 1, pp. 267-276.
Mendel, Jerry M., (1995), "Fuzzy Logic Systems for Engineering: A Tutorial", Proceeding of the IEEE, vol. 83, No. 3, pp. 345-377.
Nakajima R., Tsubouchi T., Yuta S. and Koyanagi E., (1997), "A development of a new mechanism of an autonomous unicycle", Proc. IEEE/RSJ International Conference on Intelligent Robots and Systems (IROS '97), vol. 2, Grenoble, France, pp. 906-912.

Perround M. and Saucier A., (1987), "Thermodynamics of dissipative systems", Helvetica Physica, vol. 60, No. 8, pp. 1038-1051.
Sheng Z.Q. and Yamafuji K., (1995), "Realization of a human riding a unicycle by a robot", Proc. of '95 IEEE Intern. Conf. on Robotics & Automation, Japan, vol. 2, pp. 1319-1326.
Sheng Z.Q. and Yamafuji K., (1997), "Postural stability of a human riding a unicycle and its emulation by a robot", IEEE Trans. on Robotics and Automation, vol. 13, No. 5, pp. 709-720.
Sheng, Z.Q. and Yamafuji K., (1995), "Study on the stability and motion control of a unicycle, $1^{st}$ Report: Dynamics of a human riding a unicycle and its modeling by link mechanism", JSME International Journal, vol. 38C, No. 2, pp. 249-259.

* cited by examiner

*Primary Examiner*—Anthony Knight
*Assistant Examiner*—Adrian L. Kennedy
(74) *Attorney, Agent, or Firm*—Knobbe, Martens, Olson & Bear, LLP

(57) ABSTRACT

The present invention involves a Soft Computing (SC) optimizer for designing a Knowledge Base (KB) to be used in a control system for controlling a plant such as, for example, an internal combustion engine or an automobile suspension system. The SC optimizer includes a fuzzy inference engine based on a Fuzzy Neural Network (FNN). The SC Optimizer provides Fuzzy Inference System (FIS) structure selection, FIS structure optimization method selection, and teaching signal selection and generation. The user selects a fuzzy model, including one or more of: the number of input and/or output variables; the type of fuzzy inference model (e.g., Mamdani, Sugeno, Tsukamoto, etc.); and the preliminary type of membership functions. A Genetic Algorithm (GA) is used to optimize linguistic variable parameters and the input-output training patterns. A GA is also used to optimize the rule base, using the fuzzy model, optimal linguistic variable parameters, and a teaching signal. The GA produces a near-optimal FNN. The near-optimal FNN can be improved using classical derivative-based optimization procedures. The FIS structure found by the GA is optimized with a fitness function based on a response of the actual plant model of the controlled plant. The SC optimizer produces a robust KB that is typically smaller that the KB produced by prior art methods.

3 Claims, 54 Drawing Sheets

SOFT COMPUTING OPTIMIZER OF INTELLIGENT CONTROL SYSTEM STRUCTURES

REFERENCE TO RELATED APPLICATIONS

This present application claims priority benefit of U.S. Provisional Application No. 60/490,397, filed Jul. 25, 2003, titled "SOFT COMPUTING OPTIMIZER OF INTELLIGENT CONTROL SYSTEM STRUCTURES," the entire contents of which is hereby incorporated by reference.

BACKGROUND

1. Field of the Invention

The present invention relates generally to control systems, and more particularly to the design method of intelligent control system structures based on soft computing optimization.

2. Description of the Related Art

Feedback control systems are widely used to maintain the output of a dynamic system at a desired value in spite of external disturbances that would displace it from the desired value. For example, a household space-heating furnace, controlled by a thermostat, is an example of a feedback control system. The thermostat continuously measures the air temperature inside the house, and when the temperature falls below a desired minimum temperature the thermostat turns the furnace on. When the interior temperature reaches the desired minimum temperature, the thermostat turns the furnace off. The thermostat-furnace system maintains the household temperature at a substantially constant value in spite of external disturbances such as a drop in the outside temperature. Similar types of feedback controls are used in many applications.

A central component in a feedback control system is a controlled object, a machine or a process that can be defined as a "plant", whose output variable is to be controlled. In the above example, the "plant" is the house, the output variable is the interior air temperature in the house and the disturbance is the flow of heat (dispersion) through the walls of the house. The plant is controlled by a control system. In the above example, the control system is the thermostat in combination with the furnace. The thermostat-furnace system uses simple on-off feedback control proportional feedback control, integral feedback control, and derivative feedback control. A feedback control based on a sum of proportional, plus integral, plus derivative feedbacks, is often referred as a P(I)D control.

A P(I)D control system is a linear control system that is based on a dynamic model of the plant. In classical control systems, a linear dynamic model is obtained in the form of dynamic equations, usually ordinary differential equations. The plant is assumed to be relatively linear, time invariant, and stable. However, many real-world plants are time varying, highly non-linear, and unstable. For example, the dynamic model may contain parameters (e.g., masses, inductance, aerodynamics coefficients, etc.), which are either only approximately known or depend on a changing environment. If the parameter variation is small and the dynamic model is stable, then the P(I)D controller may be satisfactory. However, if the parameter variation is large or if the dynamic model is unstable, then it is common to add Adaptive or Intelligent (AI) control functions to the P(I)D control system.

AI control systems use an optimizer, typically a non-linear optimizer, to program the operation of the P(I)D controller and thereby improve the overall operation of the control system.

Classical advanced control theory is based on the assumption that all controlled "plants" can be approximated as linear systems near equilibrium points. Unfortunately, this assumption is rarely true in the real world. Most plants are highly nonlinear, and often do not have simple control algorithms. In order to meet these needs for a nonlinear control, systems have been developed that use Soft Computing (SC) concepts such Fuzzy Neural Networks (FNN), Fuzzy Controllers (FC), and the like. By these techniques, the control system evolves (changes) in time to adapt itself to changes that may occur in the controlled "plant" and/or in the operating environment.

Control systems based on SC typically use a Knowledge Base (KB) to contain the knowledge of the FC system. The KB typically has many rules that describe how the SC determines control parameters during operation. Thus, the performance of an SC controller depends on the quality of the KB and the knowledge represented by the KB. Increasing the number of rules in the KB generally increases (very often with redundancy) the knowledge represented by the KB but at a cost of more storage and more computational complexity. Thus, design of a SC system typically involves tradeoffs regarding the size of the KB, the number of rules, the types of rules. etc. Unfortunately, the prior art methods for selecting KB parameters such as the number and types of rules are based on ad hoc procedures using intuition and trial-and-error approaches.

SUMMARY

The present invention solves these and other problems by providing a SC optimizer for designing a KB to be used in a SC system such as a SC control system. In one embodiment, the SC optimizer includes a fuzzy inference engine. In one embodiment, the fuzzy inference engine includes a Fuzzy Neural Network (FNN). In one embodiment, the SC Optimizer provides Fuzzy Inference System (FIS) structure selection, FIS structure optimization method selection, and Teaching signal selection.

In one embodiment, the user makes the selection of fuzzy model, including one or more of: the number of input and/or output variables; the type of fuzzy inference model (e.g., Mamdani, Sugeno, Tsukamoto, etc.); and the preliminary type of membership functions.

In one embodiment, a Genetic Algorithm (GA) is used to optimize linguistic variable parameters and the input-output training patterns. In one embodiment, a GA is used to optimize the rule base, using the fuzzy model, optimal linguistic variable parameters, and a teaching signal.

One embodiment, includes fine tuning of the FNN. The GA produces a near-optimal FNN. In one embodiment, the near-optimal FNN can be improved using classical derivative-based optimization procedures.

One embodiment, includes optimization of the FIS structure by using a GA with a fitness function based on a response of the actual plant model.

One embodiment, includes optimization of the FIS structure by a GA with a fitness function based on a response of the actual plant.

The result is a specification of an FIS structure that specifies parameters of the optimal FC according to desired requirements.

DETAILED DESCRIPTION

Figure 1:
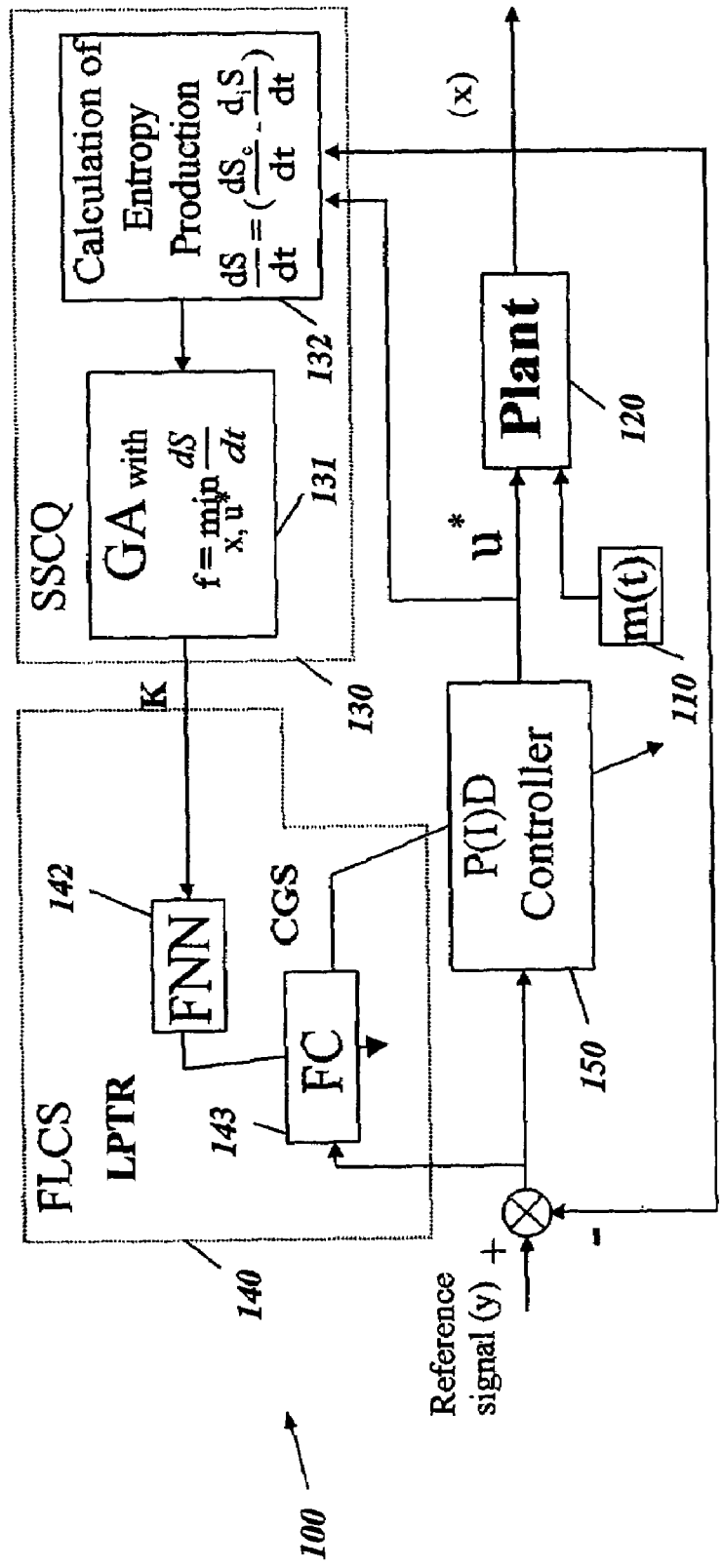
FIG. 1 is a block diagram of the general structure of a self-organizing intelligent control system based on SC

FIG. 1 shows a self-organizing control system 100 for controlling a plant based on Soft Computing (SC). The control system 100 includes a plant 120, a Simulation System of Control Quality (SSCQ) 130, Fuzzy Logic Classifier System (FLCS) 140 and a P(I)D controller 150. The SSCQ 130 includes a module 132 for calculating a fitness function, such as, in one embodiment, entropy production from of the plant 120, and a control signal output from the P(I)D controller 150. The SSCQ 130 also includes a Genetic Algorithm (GA) 131. In one embodiment, a fitness function of the GA 131 is configured to reduce entropy production. The FLCS 140 includes a FNN 142 to program a FC 143. An output of the FC 143 is a coefficient gain schedule for the P(I)D controller 150. The P(I)D controller 150 controls the plant 120.

Using a set of inputs, a fitness function 132 in a GA 131 works in a manner similar to an evolutionary process to arrive at a solution which is, hopefully, optimal. The GA 131 generates sets of "chromosomes" (that is, possible solutions) and then sorts the chromosomes by evaluating each solution using the fitness function 132. The fitness function 132 determines where each solution ranks on a fitness scale. Chromosomes (solutions) which are more fit, are those which correspond to solutions that rate high on the fitness scale. Chromosomes which are less fit, are those which correspond to solutions that rate low on the fitness scale.

Chromosomes that are more fit are kept (survive) and chromosomes that are less fit are discarded (die). New chromosomes are created to replace the discarded chromosomes. The new chromosomes are created by crossing pieces of existing chromosomes and by introducing mutations.

A P(I)D controller 150 has a substantially linear transfer function and thus is based upon a linearized equation of motion for the controlled "plant" 120. Prior art GA used to program P(I)D controllers typically use simple fitness functions and thus do not solve the problem of poor controllability typically seen in linearization models. As is the case with most optimizers, the success or failure of the optimization often ultimately depends on the selection of the performance (fitness) function 132.

Evaluating the motion characteristics of a nonlinear plant is often difficult, in part due to the lack of a general analysis method. Conventionally, when controlling a plant with nonlinear motion characteristics, it is common to find certain equilibrium points of the plant and the motion characteristics of the plant are linearized in a vicinity near an equilibrium point. Control is then based on evaluating the pseudo (linearized) motion characteristics near the equilibrium point. This technique is scarcely, if at all, effective for plants described by models that are unstable or dissipative.

Computation of optimal control based on SC includes the GA 131 as the first step of global search for optimal solution on a fixed space of positive solutions. The GA searches for a set of control weights for the plant. Firstly the weight vector $K=\{k_1, \ldots, k_n\}$ is used by a conventional proportional-integral-differential (P(I)D) controller 150 in the generation of a signal $\delta(K)$ which is applied to the plant. The entropy $S(\delta(K))$ associated to the behavior of the plant on this signal is assumed as a fitness function to minimize. The GA is repeated several times at regular time intervals in order to produce a set of weight vectors. The vectors generated by the GA 131 are then provided to a FNN 142 and the output of the FNN 142 to a Fuzzy Controller (FC) 143. The output of the FC 143 is a collection of gain schedules for the P(I)D-controller 150 that controls the plant.

Figure 2:
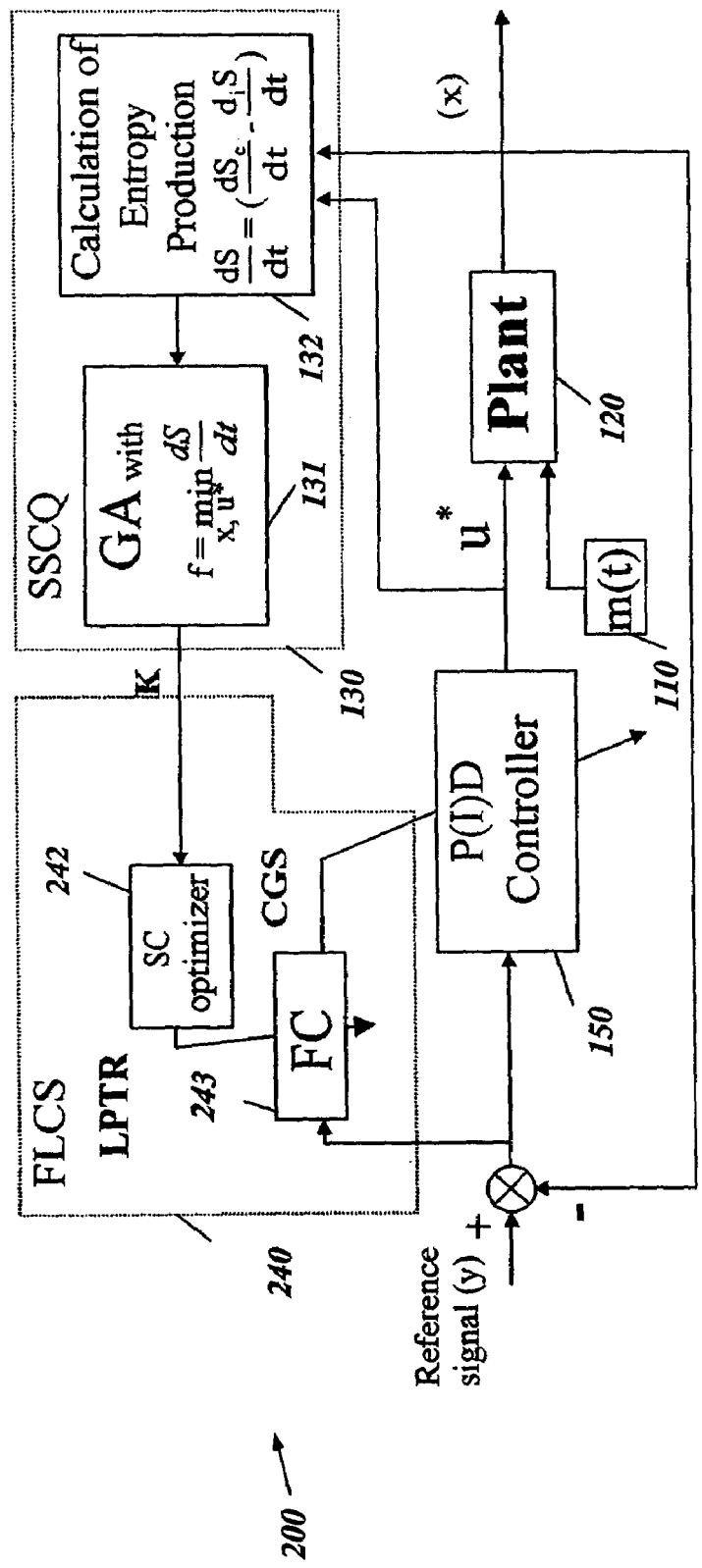
FIG. 2 is a block diagram of the general structure of a self-organizing intelligent control system based on SC with a SC optimizer.

FIG. 2 shows the self-organizing control system of FIG. 1, where the FLCS 140 is replaced by an FLCS 240. The FLCS 240 includes a SC optimizer 242 configured to program an optimal FC 243.

The SSCQ 130 finds teaching patterns (input-output pairs) for optimal control by using the GA 131 based on a mathematical model of controlled plant 120 and physical criteria of minimum of entropy production rate. The FLCS 240 produces an approximation of the optimal control produces by the SSCQ 130 by programming the optimal FC 243.

The SSCQ 130 provides acquisition of a robust teaching signal for optimal control. The output of SSCQ 130 is the robust teaching signal, which contains the necessary information about the optimal behavior of the plant 120 and corresponding behavior of the control system 200.

The SC optimizer 242 produces an approximation of the teaching signal by building a Fuzzy Inference System (FIS). The output of the SC optimizer 242 includes a Knowledge Base (KB) for the optimal FC 243.

The optimal FC operates using an optimal KB from the FC 243 including, but not limited to, the number of input-output membership functions, the shapes and parameters of the membership functions, and a set of optimal fuzzy rules based on the membership functions.

In one embodiment the optimal FC 243 is obtained using a FNN trained using a training method, such as, for example, the error back propagation algorithm. The error back propagation algorithm is based on application of the gradient descent method to the structure of the FNN. The error is calculated as a difference between the desired output of the FNN and an actual output of the FNN. Then the error is "back propagated" through the layers of the FNN, and the parameters of each neuron of each layer are modified towards the direction of the minimum of the propagated error. The back propagation algorithm has a few disadvantages. First, in order to apply the back propagation approach it is necessary to know the complete structure of the FNN prior to the optimization. The back propagation algorithm can not be applied to a network with an unknown number of layers or an unknown number nodes. Second, the back propagation process cannot modify the types of the membership functions. Finally, the back propagation algorithm very often finds only a local optimum close to the initial state rather then the desired global minimum. This occurs because the initial coefficients for the back propagation algorithm are usually generated randomly. The error back propagation algorithm is used, in a commercially available Adaptive Fuzzy Modeler (AFM). The AFM permits creation of Sugeno 0 order FIS from digital input-output data using the error back propagation algorithm. The algorithm of the AFM has two steps. In the first AFM step, a user specifies the parameters of a future FNN. Parameters include the number of inputs and number of outputs and the number of fuzzy sets for each input/output. Then AFM "optimizes" the rule base, using a so-called "let the best rule win" (LBRW) technique. During this phase, the membership functions are fixed as uniformly distributed among the universe of discourse, and the AFM calculates the firing strength of the each rule, eliminating the rules with zero firing strength, and adjusting centers of the consequents of the rules with nonzero firing strength. It is possible during optimization of the rule base to specify the learning rate parameter. The AFM also includes an option to build the rule base manually. In this case, user can specify the centroids of the input fuzzy sets, and then the system builds the rule base according to the specified centroids.

In the second AFM step, the AFM builds the membership functions. The user can specify the shape factors of the input membership functions. Shape factor supported by the AFM include: Gaussian; Isosceles Triangular; and Scalene Triangular. The user must also specify the type of fuzzy AND operation in the Sugeno model, either as a product or a minimum.

After specification of the membership function shape and Sugeno inference method, AFM starts optimization of the membership function shapes. The user can also specify optional parameters to control optimization rate such as a target error and the number of iterations.

AFM inherits the limitations and weaknesses of the back propagation algorithm described above. The user must specify the types of membership functions, the number of membership functions for each linguistic variable and so on. AFM uses rule number optimization before membership functions optimization, and as a result, the system becomes very often unstable during the membership function optimization phase.

The Structure of an Intelligent Control System Including SC-Optimizer

In FIG. 2 the SC optimizer 242 creates a FIS using the teaching signal from the SSCQ 130. The SC optimizer 242 provides GA based FNN learning including rule extraction and KB optimization. The SC optimizer 242 can use as a teaching signal either an output from the SSCQ 130 and/or output from the plant 120 (or a model of the plant 120).

Figure 3:
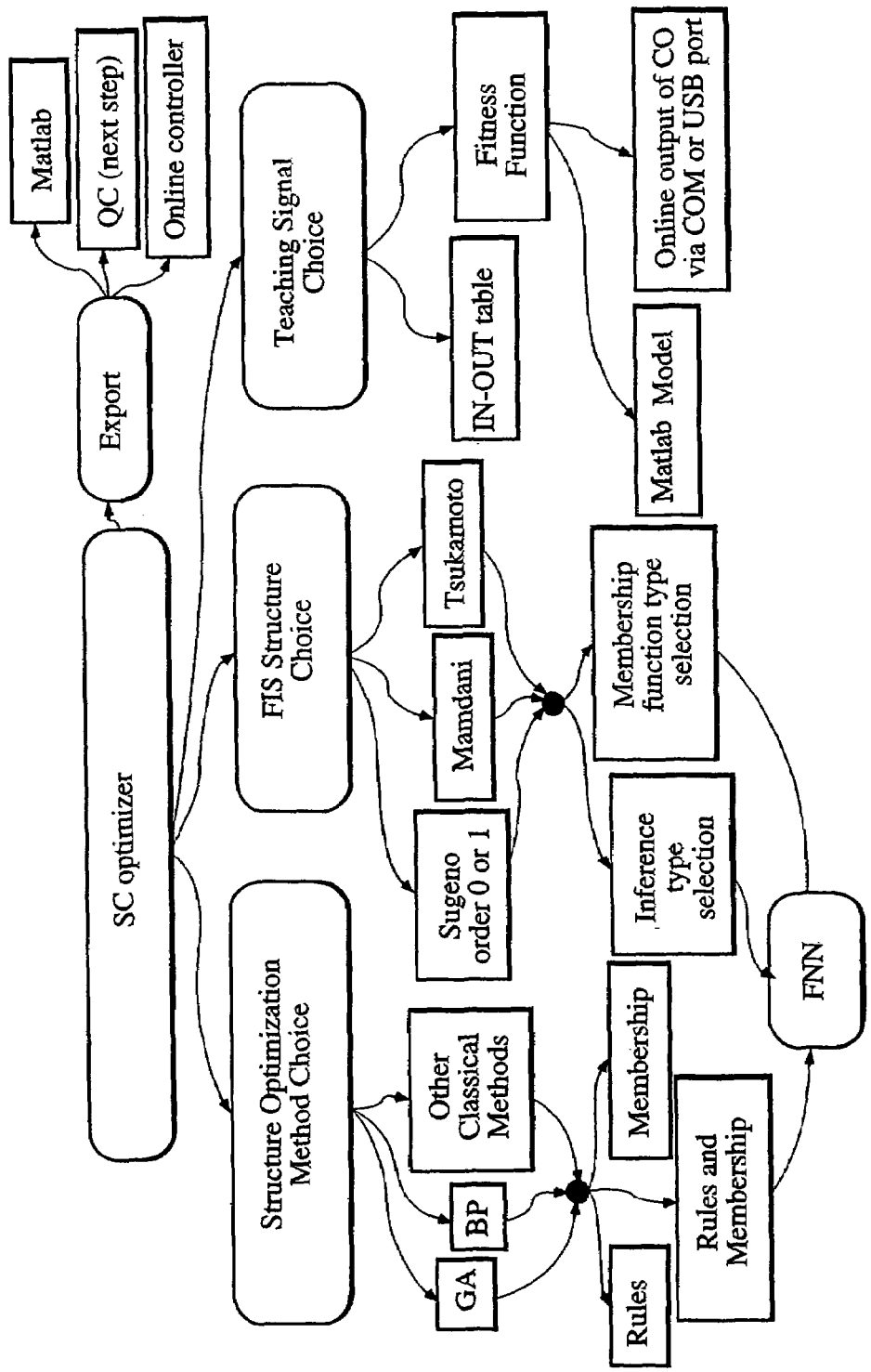
FIG. 3 shows information flow in the SC optimizer.

In one embodiment, the SC optimizer 242 includes (as shown in FIG. 3) a fuzzy inference engine in the form of a FNN. The SC optimizer also allows FIS structure selection using models, such as, for example, Sugeno FIS order 0 and 1, Mamdani FIS, Tsukamoto FIS, etc. The SC optimizer 242 also allows selection of the FIS structure optimization method including optimization of linguistic variables, and/or optimization of the rule base. The SC optimizer 242 also allows selection of the teaching signal source, including: the teaching signal as a look up table of input-output patterns; the teaching signal as a fitness function calculated as a dynamic system response; the teaching signal as a fitness function is calculated as a result of control of a real plant; etc.

In one embodiment, output from the SC optimizer 242 can be exported to other programs or systems for simulation or actual control of a plant 130. For example, output from the FC optimizer 242 can be exported to a simulation program for simulation of plant dynamic responses, to an online controller (to use in control of a real plant), etc.

The Structure of the SC Optimizer

Figure 4:
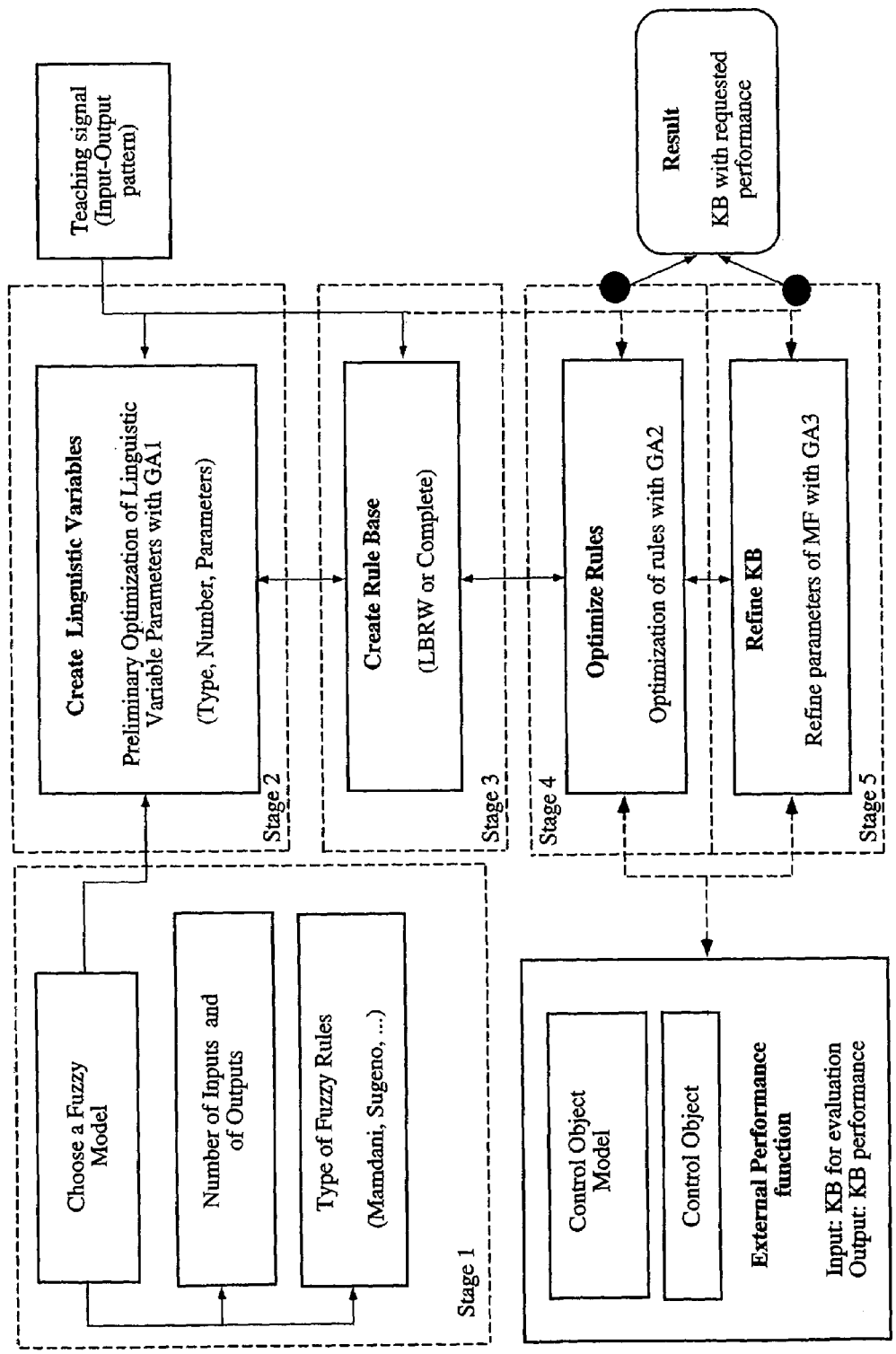
FIG. 4 is a flowchart of the SC optimizer.

FIG. 4 is a high-level flowchart 400 for the SC optimizer 242. By way of explanation, and not by way of limitation, the operation of the flowchart divides operation in to four stages, shown as Stages 1, 2, 3, 4, and 5.

In Stage 1, the user selects a fuzzy model by selecting one or parameters such as, for example, the number of input and output variables, the type of fuzzy inference model (Mamdani, Sugeno, Tsukamoto, etc.), and the source of the teaching signal.

In Stage 2, a first GA (GA1) optimizes linguistic variable parameters, using the information obtained in Stage 1 about the general system configuration, and the input-output training patterns, obtained from the training signal as an input-output table. In one embodiment, the teaching signal is obtained using structure presented in FIGS. 19 and 20.

In Stage 3 precedent part of the rule base is created and rules are ranked according to their firing strength. Rules with high firing strength are kept, whereas weak rules with small firing strength are eliminated.

In Stage 4, a second GA (GA2) optimizes a rule base, using the fuzzy model obtained in Stage 1, optimal linguistic variable parameters obtained in Stage 2, selected set of rules obtained in Stage 3 and the teaching signal.

In Stage 5, the structure of FNN is further optimized. In order to reach the optimal structure, the classical derivative-based optimization procedures can be used, with a combination of initial conditions for back propagation, obtained from previous optimization stages. The result of Stage 5 is a specification of fuzzy inference structure that is optimal for the plant 120. Stage 5 is optional and can be bypassed. If Stage 5 is bypassed, then the FIS structure obtained with the GAs of Stages 2 and 4 is used.

In one embodiment Stage 5 can be realized as a GA which further optimizes the structure of the linguistic variables, using set of rules obtained in the Stage 3 and 4. In this case only parameters of the membership functions is modified in order to reduce approximation error.

In one embodiment of Stage 4 and Stage 5, selected components of the KB are optimized. In one embodiment, if KB has more than one output signals, the consequent part of the rules may be optimized independently for each output in Stage 4. In one embodiment if KB has more than one input, membership functions of selected inputs are optimized in Stage 5.

In one embodiment, while Stage 4 and Stage 5 the actual plant response in form of the fitness function can be used as performance criteria of FIS structure while GA optimization.

In one embodiment, the SC optimizer 242 uses a GA approach to solve optimization problems related with choosing the number of membership functions, the types and parameters of the membership functions, optimization of fuzzy rules and refinement of KB.

GA optimizers are often computationally expensive because each chromosome created during genetic operations is evaluated according to a fitness function. For example a GA with a population size of 100 chromosomes evolved 100 generations, may require up to 10000 calculations of the fitness function. Usually this number is smaller, since it is possible to keep track of chromosomes and avoid re-evaluation. Nevertheless, the total number of calculations is typically much greater than the number of evaluations required by some sophisticated classical optimization algorithm. This computational complexity is a payback for the robustness obtained when a GA is used. The large number of evaluations acts as a practical constraint on applications using a GA. This practical constraint on the GA makes it worthwhile to develop simpler fitness functions by dividing the extraction of the KB of the FIS into several simpler tasks, such as: define the number and shape of membership functions; select optimal rules; fix optimal rules structure; and refine the KB structure. Each of these tasks is discussed in more detail below. In some sense SC optimizer 242 uses divide and conquer type of algorithm applied to the KB optimization problem.

Definition of the Numbers and of Shapes of the Membership Functions with GA

Figure 5:
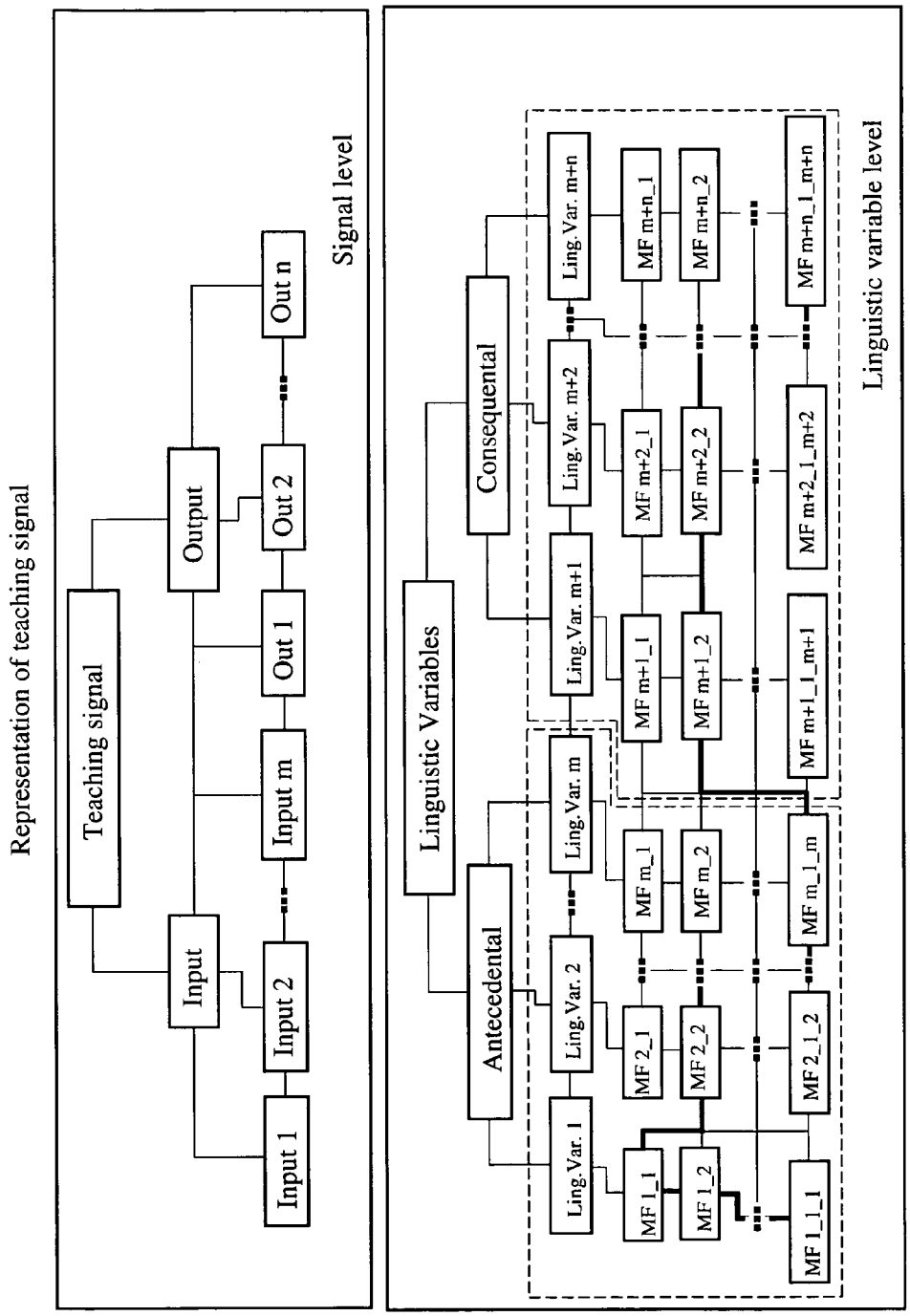
FIG. 5 shows information levels of the teaching signal and the linguistic variables.

In one embodiment the teaching signal, representing one or more input signals and one or more output signals, can be presented as shown in the FIG. 5. The teaching signal is divided into input and output parts. Each of the parts is divided into one or more signals. Thus, in each time point of the teaching signal there is a correspondence between the input and output parts, indicated as a horizontal line in FIG. 5.

Each component of the teaching signal (input or output) is assigned to a corresponding linguistic variable, in order to explain the signal characteristics using linguistic terms. Each linguistic variable is described by some unknown number of membership functions, like "Large", "Medium", "Small", etc. FIG. 5 shows various relationships between the membership functions and their parameters.

"Vertical relations" represent the explicitness of the linguistic representation of the concrete signal, e.g. how the membership functions is related to the concrete linguistic variable. Increasing the number of vertical relations will increase the number of membership functions, and as a result will increase the correspondence between possible states of the original signal, and its linguistic representation. An infinite number of vertical relations would provide an exact correspondence between signal and its linguistic representation, because to each possible value of the signal would be assigned a membership function, but in this case the situations as "over learning" may occur. Smaller number of vertical relations will increase the robustness, since some small variations of the signal will not affect much the linguistic representation. The balance between robustness and precision is a very important moment in design of the intelligent systems, and usually this task is solved by Human expert.

"Horizontal relations" represent the relationships between different linguistic variables. Selected horizontal relations can be used to form components of the linguistic rules.

To define the "horizontal" and "vertical" relations mathematically, consider a teaching signal:

[x(t),y(t)],

Where:

t=1, . . . , N—time stamps;
N—number of samples in the teaching signal;
x(t)=($x_1$(t), . . . , $x_m$(t))—input components;
y(t)=($y_1$(t), . . . $y_n$(t))—output components.

Define the linguistic variables for each of the components. A linguistic variable is usually defined as a quintuple: (x,T(x),U,G,M), where x is the name of the variable, T(x) is a term set of the x, that is the set of the names of the linguistic values of x, with a fuzzy set defined in U as a value, G is a syntax rule for the generation of the names of the values of the x and M is a semantic rule for the association of each value with its meaning. In the present case, x is associated with the signal name from x or y, term set T(x) is defined using vertical relations, U is a signal range. In some cases one can use normalized teaching signals, then the range of U is [0,1]. The syntax rule G in the linguistic variable optimization can be omitted, and replaced by indexing of the corresponding variables and their fuzzy sets.

Semantic rule M varies depending on the structure of the FIS, and on the choice of the fuzzy model. For the representation of all signals in the system, it is necessary to define m+n linguistic variables:

Let[X,Y], X=($X_1$, . . . , $X_m$), Y=($Y_1$, . . . , $Y_n$) be the set of the linguistic variables associated with the input and output signals correspondingly. Then for each linguistic variable one can define a certain number of fuzzy sets to represent the variable:

$$X_1: \{\mu_{X_1}^1, \ldots, \mu_{X_1}^{l_{X_1}}\}, \ldots, X_m: \{\mu_{X_m}^1, \ldots, \mu_{X_m}^{l_{X_m}}\};$$

$$Y_1: \{\mu_{Y_1}^1, \ldots, \mu_{Y_1}^{l_{Y_1}}\}, \ldots, Y_n: \{\mu_{Y_n}^1, \ldots, \mu_{Y_n}^{l_{Y_n}}\}$$

Where $\mu_{X_i}^{j_i}$, i=1, . . . , m, $j_i$=1, . . . , $l_{X_i}$ are membership functions of the i th component of the input variable; and $\mu_{Y_i}^{j_i}$, i=1, . . . , n, $j_i$=1, . . . , $l_{Y_i}$ are membership functions of the i th component of the output variable.

Usually, at this stage of the definition of the KB, the parameters of the fuzzy sets are unknown, and it may be difficult to judge how many membership functions are necessary to describe a signal. In this case, the number of membership functions $l_{X_i} \in [1, L_{MAX}]$, i=1, . . . , m can be considered as one of the parameters for the GA (GA1) search, where $L_{MAX}$ is the maximum number of membership functions allowed. In one embodiment, $L_{MAX}$ is specified by the user prior to the optimization, based on considerations such as the computational capacity of the available hardware system.

Knowing the number of membership functions, it is possible to introduce a constraint on the possibility of activation of each fuzzy set, denoted as $p_{X_i}^j$.

One of the possible constraints can be introduced as:

$$p_{X_i}^{j\prime} \geq \frac{1}{l_{X_i}}, i = 1, \ldots, m; j = 1, \ldots, l_{X_i}$$

This constraint will cluster the signal into the regions with equal probability, which is equal to division of the signal's histogram into curvilinear trapezoids of the same surface area. Supports of the fuzzy sets in this case are equal or greater to the base of the corresponding trapezoid. How much greater the support of the fuzzy set should be, can be defined from an overlap parameter. For example, the overlap parameter takes zero, when there is no overlap between two attached trapezoids. If it is greater than zero then there is some overlap. The areas with higher probability will have in this case "sharper" membership functions. Thus, the overlap parameter is another candidate for the GA1 search. The fuzzy sets obtained in this case will have uniform possibility of activation.

Modal values of the fuzzy sets can be selected as points of the highest possibility, if the membership function has unsymmetrical shape, and as a middle of the corresponding trapezoid base in the case of symmetric shape. Thus one can set the type of the membership functions for each signal as a third parameter for the GA1.

The relation between the possibility of the fuzzy set and its membership function shape can also be found. The possibility of activation of each membership function is calculated as follows:

$$p^j_{X_i} = p(x_i \mid x_i = \mu^j_{X_i}) = \frac{1}{N} \sum_{t=1}^{N} \mu^j_{X_i}(x_i(t)) \quad (1.1)$$

Mutual possibility of activation of different membership functions can be defined as:

$$p^{(j,l)}_{X_i \mid X_k} = p\left(x_i \mid_{x_i=\mu^j_{X_i}, x_k=\mu^l_{X_k}}\right) = \frac{1}{N} \sum_{t=1}^{N} \left[\mu^j_{X_i}(x_i(t)) * \mu^l_{X_k}(x_k(t))\right] \quad (1.2)$$

where * denotes selected T-norm (Fuzzy AND) operation; $j=1, \ldots, 1_{X_i}$, $l=1, \ldots, 1_{X_k}$ are indexes of the corresponding membership functions.

In fuzzy logic literature, T-norm, denoted as * is a two-place function from $[0,1]\times[0,1]$ to $[0,1]$. It represents a fuzzy intersection operation and can be interpreted as minimum operation, or algebraic product, or bounded product or drastic product. S-conorm, denoted by $\dotplus$, is a two-place function, from $[0,1]\times[0,1]$ to $[0,1]$. It represents a fuzzy union operation and can be interpreted as algebraic sum, or bounded sum and drastic sum. Typical T-norm and S-conorm operators are presented in the Table 1.

TABLE 1

| T-norms (fuzzy intersection) | S-conorms (fuzzy union) |
|---|---|
| min(x, y) – minimum operation | max(x, y) – maximum operation |
| xy – algebraic product | x + y – xy – algebraic sum |
| x * y = max[0, x + y – 1] – bounded product | x + y = min[1, x + y] – bounded sum |
| $x*y = \begin{cases} x, \text{ if } y=1 \\ y, \text{ if } x=1 \\ 0, \text{ if } x,y<1 \end{cases}$ –drastic product | $x \dotplus y = \begin{cases} x, \text{ if } y=0 \\ y, \text{ if } x=0 \\ 0, \text{ if } x,y>0 \end{cases}$ –drastic sum |

If $i=k$, and $j\neq l$, then equation (1.2) defines "vertical relations"; and if $i\neq k$, then equation (1.2) defines "horizontal relations". The measure of the "vertical" and of the "horizontal" relations is a mutual possibility of the occurrence of the membership functions, connected to the correspondent relation.

The set of the linguistic variables is considered as optimal, when the total measure of "horizontal relations" is maximized, subject to the minimum of the "vertical relations".

Hence, one can define a fitness function for the GA1 which will optimize the number and shape of membership functions as a maximum of the quantity, defined by equation (1.2), with minimum of the quantity, defined by equation (1.1).

The chromosomes of the GA1 for optimization of linguistic variables according to Equations (1.1) and (1.2) have the following structure:

$$\underbrace{[l_{X_1}, \ldots, l_{Y_n}]}_{m+n} \underbrace{[\alpha_{X_1}, \ldots, \alpha_{Y_n}]}_{m+n} \underbrace{[T_{X_1}, \ldots, T_{Y_N}]}_{m+n}$$

Where:

$l_{X(Y)_i} \in [1, L_{MAX}]$ are genes that code the number of membership functions for each linguistic variable $X_i(Y_i)$;

$\alpha_{X(Y)_i}$ are genes that code the overlap intervals between the membership functions of the corresponding linguistic variable $X_i(Y_i)$; and $T_{X(Y)_i}$ are genes that code the types of the membership functions for the corresponding linguistic variables.

Another approach to the fitness function calculation is based on the Shannon information entropy. In this case instead of the equations (1.1) and (1.2), for the fitness function representation one can use the following information quantity taken from the analogy with information theory:

$$H^j_{X_i} = -p^j_{X_i} \log(p^j_{X_i}) \quad (1.1a)$$

$$= -p(x_i \mid x_i = \mu^j_{X_i}) \log[p(x_i \mid x_i = \mu^j_{X_i})]$$

$$= -\frac{1}{N} \sum_{t=1}^{N} \mu^j_{X_i}(x_i(t)) \log[\mu^j_{X_i}(x_i(t))]$$

and $$H^{(j,l)}_{X_i \mid X_k} = H\left(x_i \mid_{x_i=\mu^j_{X_i}, x_k=\mu^l_{X_k}}\right) \quad (1.2a)$$

$$= -\frac{1}{N} \sum_{t=1}^{N} \left[\mu^j_{X_i}(x_i(t)) * \mu^l_{X_k}(x_k(t))\right]$$

$$\log[\mu^j_{X_i}(x_i(t)) * \mu^l_{X_k}(x_k(t))]$$

In this case, GA1 will maximize the quantity of mutual information (1.2a), subject to the minimum of the information about each signal (1.1a). In one embodiment the combination of information and probabilistic approach can also be used.

In case of the optimization of number and shapes of membership functions in Sugeno—type FIS, it is enough to include into GA chromosomes only the input linguistic variables. The detailed fitness functions for the different types of fuzzy models will be presented in the following sections, since it is more related with the optimization of the structure of the rules.

Figure 6:
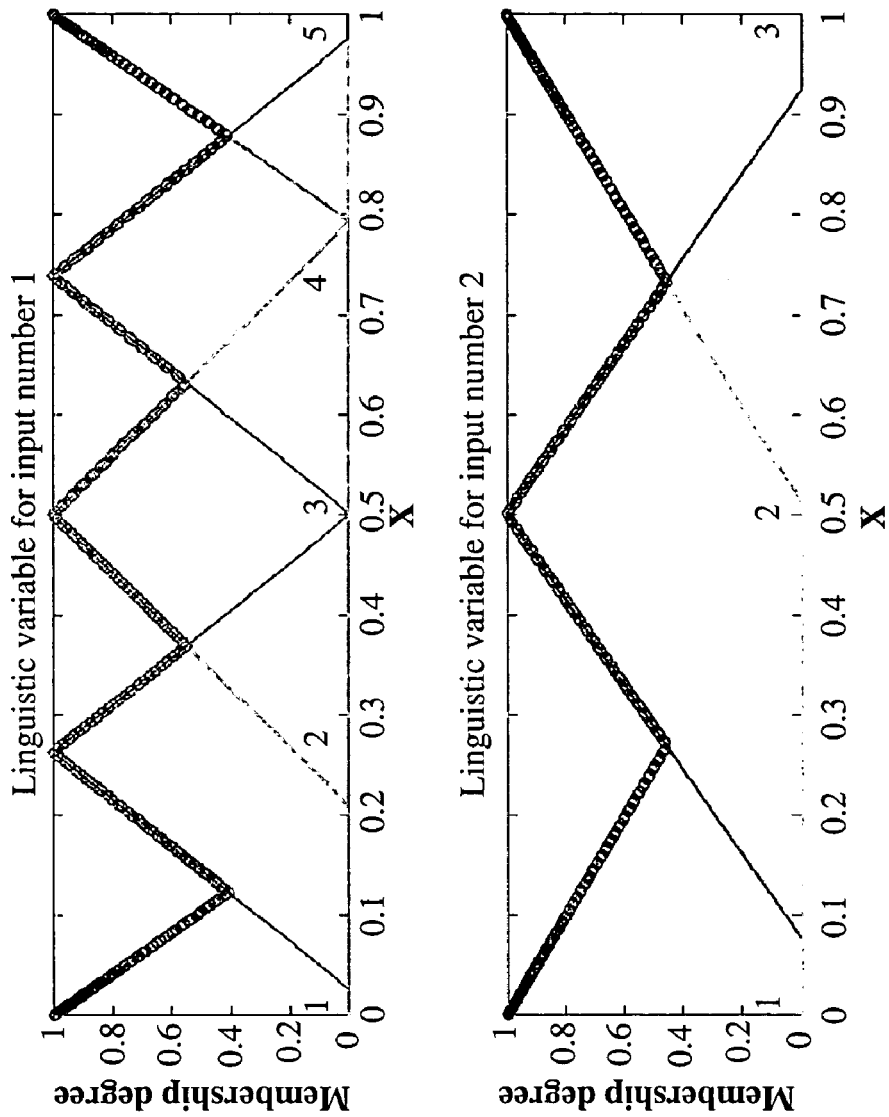
FIG. 6 shows inputs for linguistic variables 1 and 2.
Figure 7:
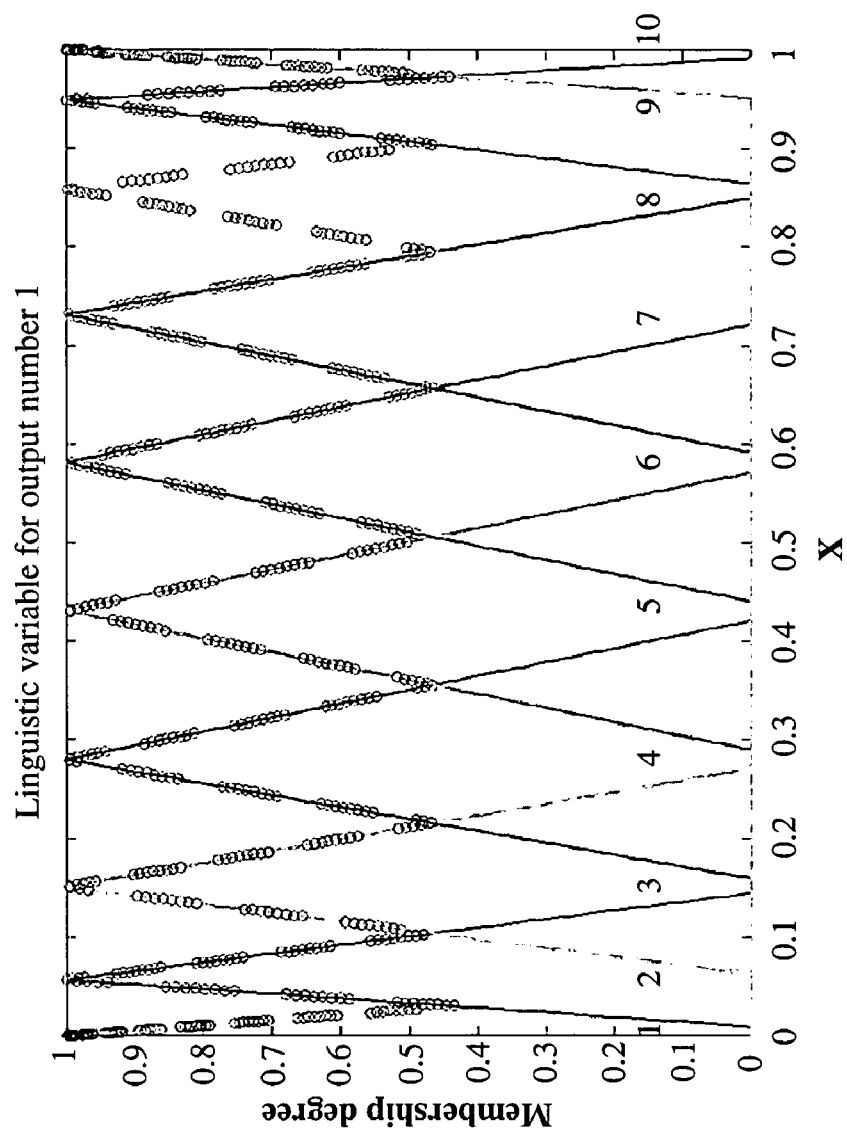
FIG. 7 shows outputs for linguistic variable 1.
Figure 8:
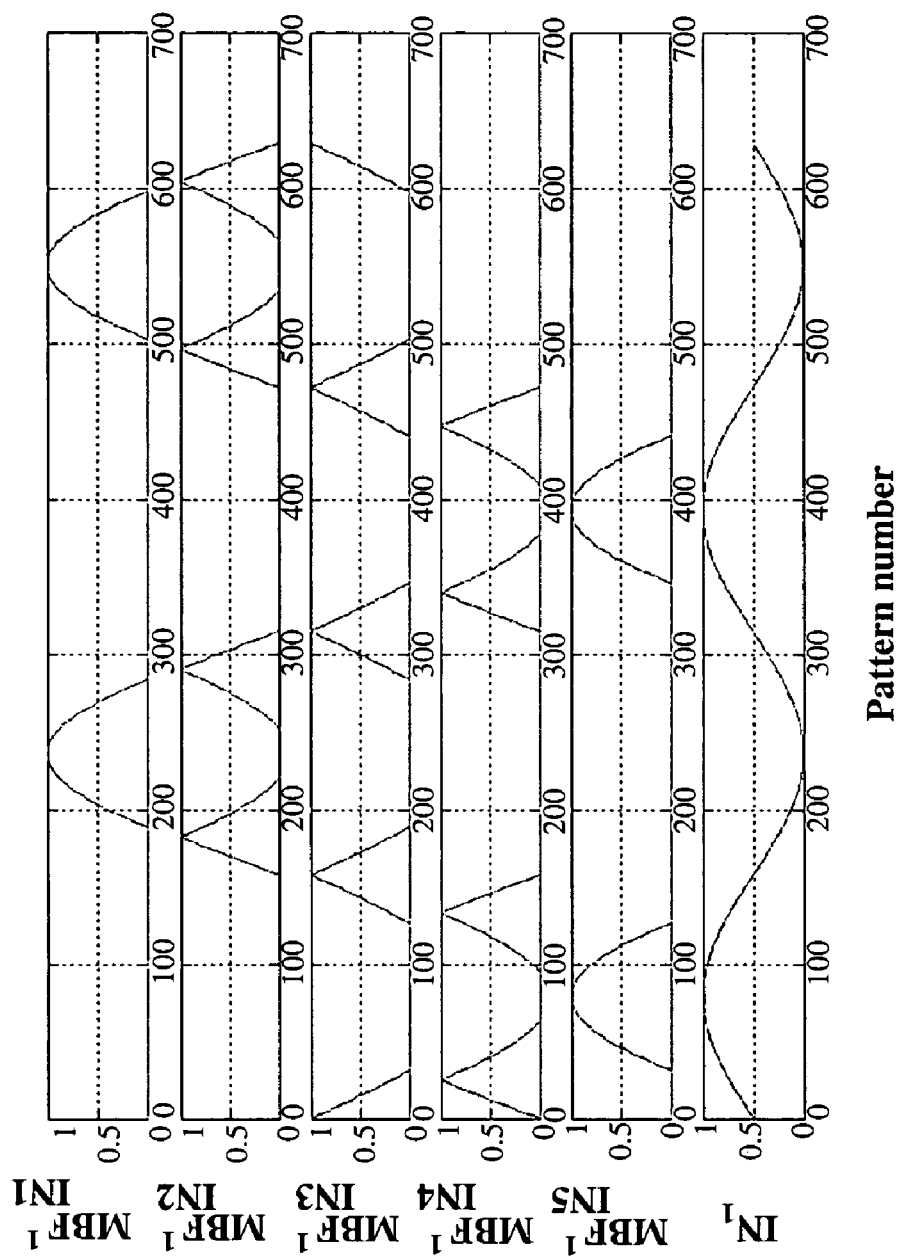
FIG. 8 shows the activation history of the membership functions presented in FIGS. 6 and 7.
Figure 9:
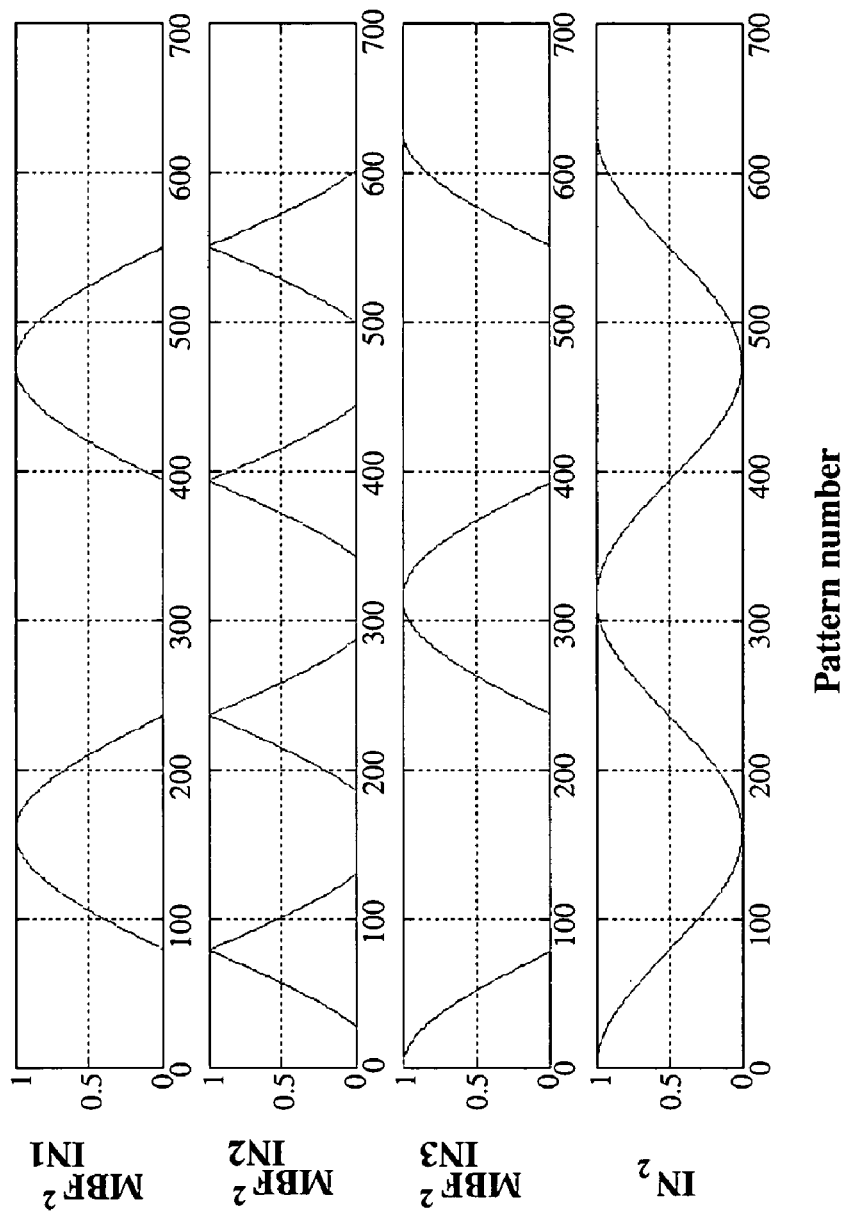
FIG. 9 shows the activation history of the membership functions presented in FIGS. 6 and 7.
Figure 10:
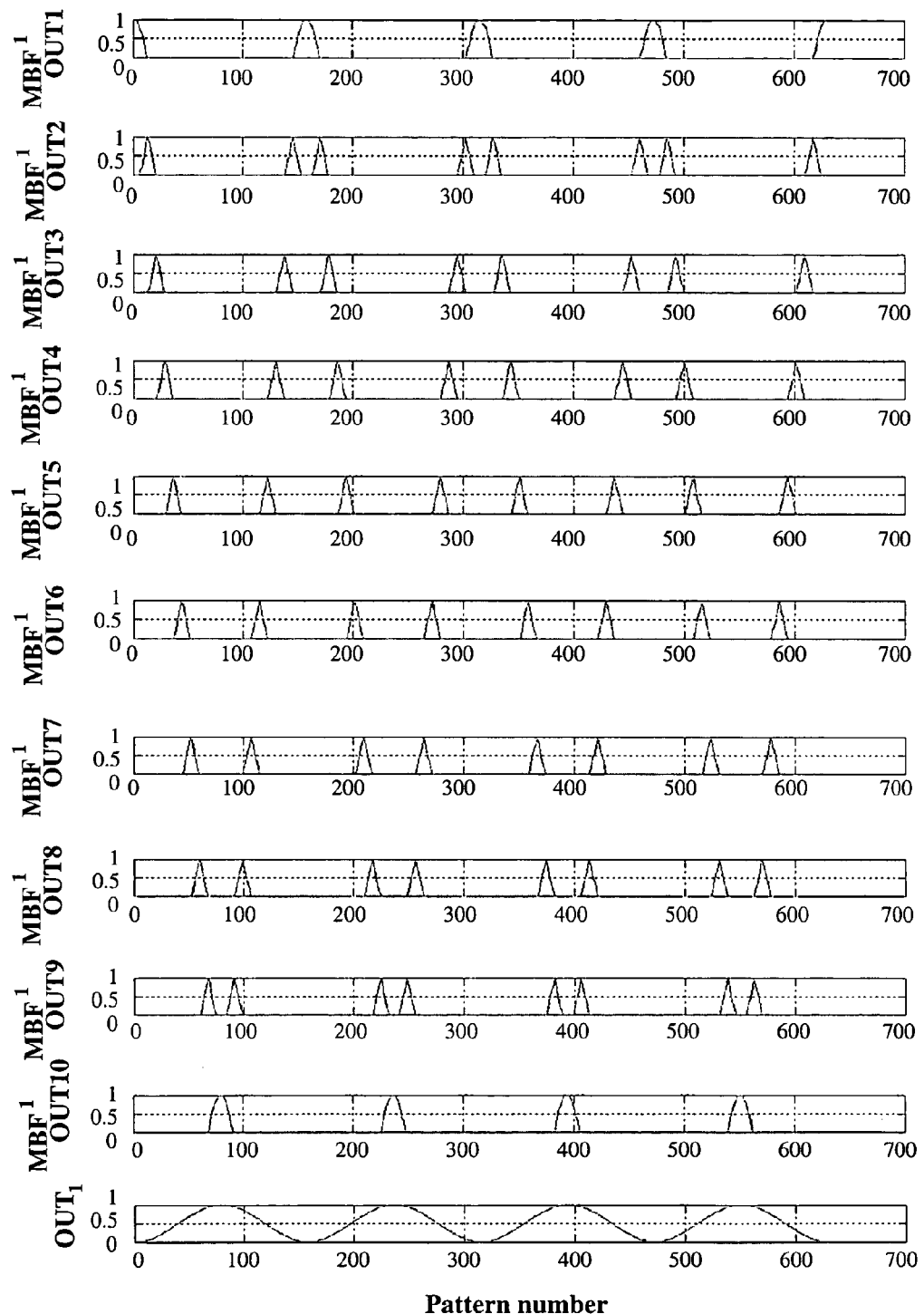
FIG. 10 shows the activation history of the membership functions presented in FIGS. 6 and 7.

Results of the membership function optimization GA1 are shown in FIGS. 6 and 7. FIG. 6 shows results for input variables. FIG. 7 shows results for output variables. FIGS. 8, 9, 10 show the activation history of the membership functions presented in FIGS. 6 and 7. The lower graphs of FIGS. 8, 9 and 10 are original signals, normalized into the interval [0, 1]

Optimal Rules Selection

Rule Pre-selection Algorithm

The pre-selection algorithm selects the number of optimal rules and their premise structure prior optimization of the consequent part.

Consider the structure of the first fuzzy rule of the rule base $$R^1(t) = \text{IF } x_1(t) \text{ is } \mu_1^1(x_1) \text{ AND } x_{l_2}(t) \text{ is } \mu_2^1(x_2) \text{ AND } \cdots \text{ AND } x_m(t) \text{ is } \mu_m^1(x_m)$$

THEN $y_1(t)$ is $\mu_{m+1}^{\{l_{m+1}\}}(y_1)$, $y_2(t)$ is $\mu_{m+2}^{\{l_{m+2}\}}(y_2)$, $\cdots$, $y_n(t)$ is $\mu_{m+n}^{\{l_{m+n}\}}(y_n)$, Where:
- m is the number of inputs;
- n is the number of outputs;
- $x_i(t)$, i=1, . . . , m are input signals;
- $y_j(t)$, j=1, . . . , n are output signals;
- $\mu_k^{l_k}$ are membership functions of linguistic variables;
- k=1, . . . , m+n are the indexes of linguistic variables;
- $l_k$=2, 3, . . . are the numbers of the membership functions of each linguistic variable;
- $\mu_k^{\{l_k\}}$—are membership functions of output linguistic variables, upper index;
- $\{l_k\}$ means the selection of one of the possible indexes; and
- t is a time stamp.

Consider the antecedent part of the rule:

$R_{IN}^1(t)$=IF $x_1(t)$ is $\mu_1^1(x_1)$ AND $x_{l_2}(t)$ is $\mu_2^1(x_2)$ AND . . . AND $x_m(t)$ is $\mu_m^1(x_m)$

The firing strength of the rule $R^1$ in the moment t is calculated as follows:

$$R_{fs}^1(t) = \min[\mu_1^1(x_1(t)), \mu_2^1(x_2(t)), \ldots, \mu_m^1(x_m(t))]$$

for the case of the min-max fuzzy inference, and as $$R_{fs}^1(t) = \Pi[\mu_1^1(x_1(t)), \Sigma_2^1(x_2(t)), \ldots, \mu_m^1(x_m(t))]$$

for the case of product-max fuzzy inference.

In general case, here can be used any of the T-norm operations.

The total firing strength $R_{\Theta s}^1$ of the rule, the quantity $R_{fs}^1(t)$ can be calculated as follows:

$$R_{fs}^1 = \frac{1}{T}\int_t R_{fs}^1(t)\,dt$$

for a continuous case, and:

$$R_{fs}^1 = \frac{1}{T}\sum_t R_{fs}^1(t)$$

for a discrete case.

In a similar manner the firing strength of each s-th rule is calculated as:

$$R_{fs}^s = \frac{1}{N}\int_t R_{fs}^s(t)\,dt, \text{ or } R_{fs}^s = \frac{1}{N}\sum_t R_{fs}^s(t), \quad (1.3)$$

where $s = 1, 2, \ldots, \prod_{i=1}^{m} l_i$ is a linear rule index

N—number of points in the teaching signal or maximum of t in continuous case.

In one embodiment the local firing strength of the rule can be calculated in this case instead of integration, the maximum operation is taken in Eq. (1.3):

$$R_{fs}^s = \max_t R_{fs}^s(t) \quad (1.4)$$

In this case, the total strength of all rules will be:

$$R_{fs} = \sum_{s=1}^{L_0} R_{fs}^s,$$

where:

$L_0 = \prod_{k=1}^{m} l_k$ - Number of rules in complete rule base

Number of rules in complete rule base

Quantity $R_{fs}$ is important since it shows in a single value the integral characteristic of the rule base. This value can be used as a fitness function which optimizes the shape parameters of the membership functions of the input linguistic variables, and its maximum guaranties that antecedent part of the KB describes well the mutual behavior of the input signals. Note that this quantity coincides with the "horizontal relations," introduced in the previous section, thus it is optimized automatically by GA1.

Alternatively, if the structure of the input membership functions is already fixed, the quantities $R_{fs}^s$ can be used for selection of the certain number of fuzzy rules. Many hardware implementations of FCs have limits that constrain, in one embodiment, the total possible number of rules. In this case, knowing the hardware limit L of a certain hardware implementation of the FC, the algorithm can select $L \leq L_0$ of rules according to a descending order of the quantities $R_{fs}^s$. Rules with zero firing strength can be omitted.

It is generally advantageous to calculate the history of membership functions activation prior to the calculation of the rule firing strength, since the same fuzzy sets are participating in different rules. In order to reduce the total computational complexity, the membership function calculation is called in the moment t only if its argument x(t) is within its support. For Gaussian-type membership functions, support can be taken as the square root of the variance value $\sigma^2$.

Figure 11:
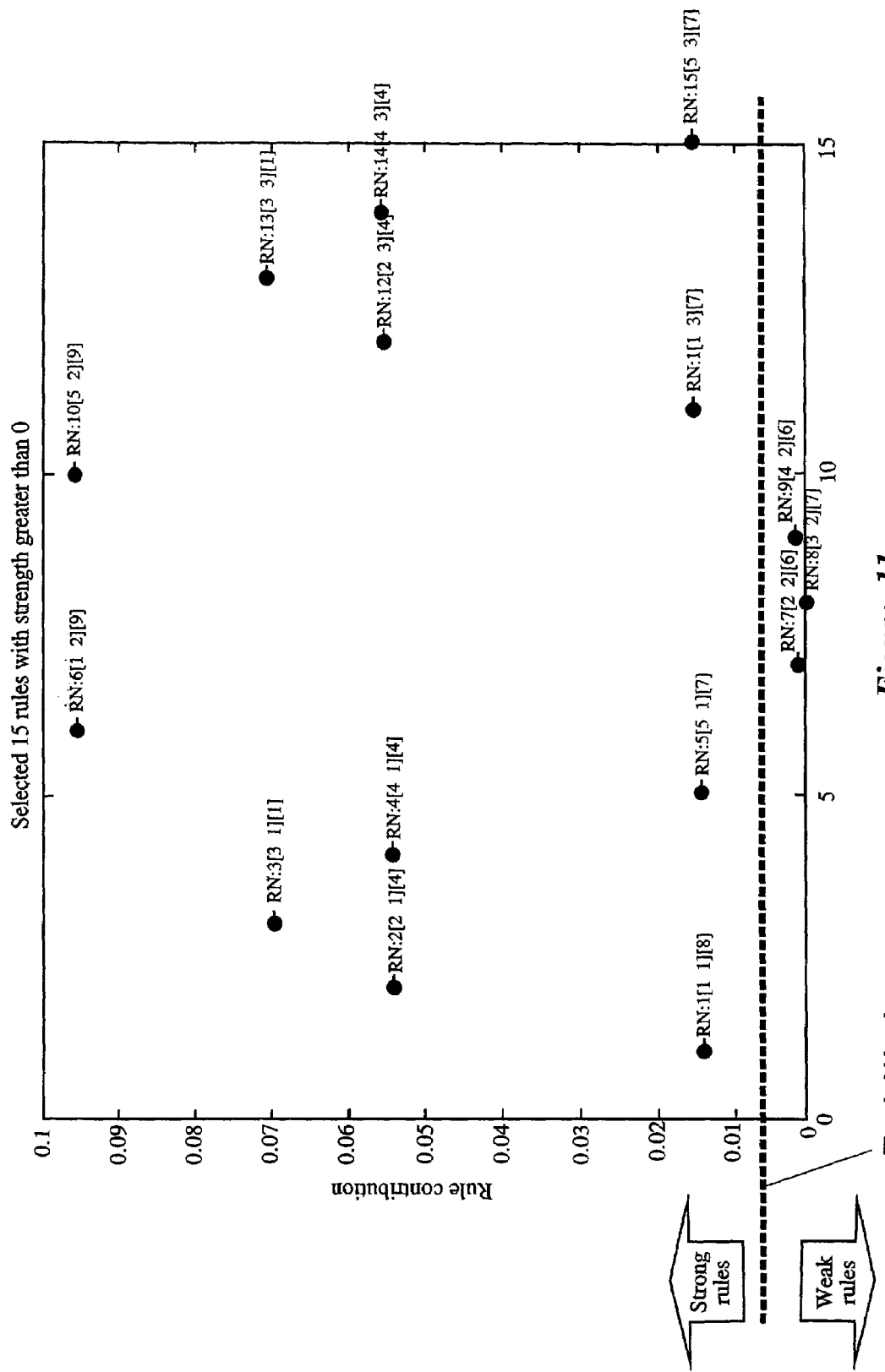
FIG. 11 is a diagram showing rule strength versus rule number for 15 rules

An example of the rule pre-selection algorithm is shown in the FIG. 11, where the abscissa axis is an index of the rules, and the ordinate axis is a firing strength of the rule $R_{fs}^s$. Each point represents one rule. In this example, the KB has 2 inputs and one output. A horizontal line shows the threshold level. The threshold level can be selected based on the maximum number of rules desired, based on user inputs, based on statistical data and/or based on other considerations. Rules with relatively high firing strength will be kept, and the remaining rules are eliminated. As is shown in FIG. 11, there are rules with zero firing strength. Such rules give no contributions to the control, but may occupy hardware resources and increase computational complexity. Rules with zero firing strength can be eliminated by default. In one embodiment, the presence of the rules with zero firing strength may indicate the explicitness of the linguistic variables (linguistic variables contain too many membership functions). The total number of the rules with zero firing strength can be reduced during membership functions construction of the input variables. This minimization is equal to the minimization of the "vertical relations."

This algorithm produces an optimal configuration of the antecedent part of the rules prior to the optimization of the rules. Optimization of the consequential part of KB can be applied directly to the optimal rules only, without unnecessary calculations of the "un-optimal rules". This process can also be used to define a search space for the GA (GA2), which finds the output (consequential) part of the rule.

Optimal Selection of Consequental Part of KB with GA2

A chromosome for the GA2 which specifies the structure of the output part of the rules can be defined as:

$$[I_1 \ldots I_M], I_i=[I_1, \ldots, I_n], I_k=\{1, \ldots, 1_{Y_k}\},$$
$$k=1, \ldots, n$$

where:

$I_i$ are groups of genes which code single rule;

$I_k$ are indexes of the membership functions of the output variables;

n is the number of outputs; and

M is the number of rules.

In one embodiment the history of the activation of the rules can be associated with the history of the activations of membership functions of output variables or with some intervals of the output signal in the Sugeno fuzzy inference case. Thus, it is possible to define which output membership functions can possibly be activated by the certain rule. This allows reduction of the alphabet for the indexes of the output variable membership functions from $\{\{1, \ldots, 1_{Y_1}\}, \ldots, \{1, \ldots, 1_{Y_n}\}\}^N$ to the exact definition of the search space of each rule:

$$\{1^{min}_{Y_1}, \ldots, 1^{max}_{Y_1}\}_1, \ldots, \{1^{min}_{Y_n}, \ldots, 1^{max}_{Y_n}\}_1, \ldots,$$
$$\{1^{min}_{Y_1}, \ldots, 1^{max}_{Y_1}\}_N, \ldots, \{1^{min}_{Y_n}, \ldots, 1^{max}_{Y_n}\}_N$$

Thus the total search space of the GA is reduced. In cases where only one output membership function is activated by some rule, such a rule can be defined automatically, without GA2 optimization.

In one embodiment in case of Sugeno 0 order FIS, instead of indexes of output membership functions, corresponding intervals of the output signals can be taken as a search space.

For some combinations of the input-output pairs of the teaching signal, the same rules and the same membership functions are activated. Such combinations are uninteresting from the rule optimization view point, and hence can be removed from the teaching signal, reducing the number of input-output pairs, and as a result total number of calculations. The total number of points in the teaching signal (t) in this case will be equal to the number of rules plus the number of conflicting points (points when the same inputs result in different output values).

Figure 12:
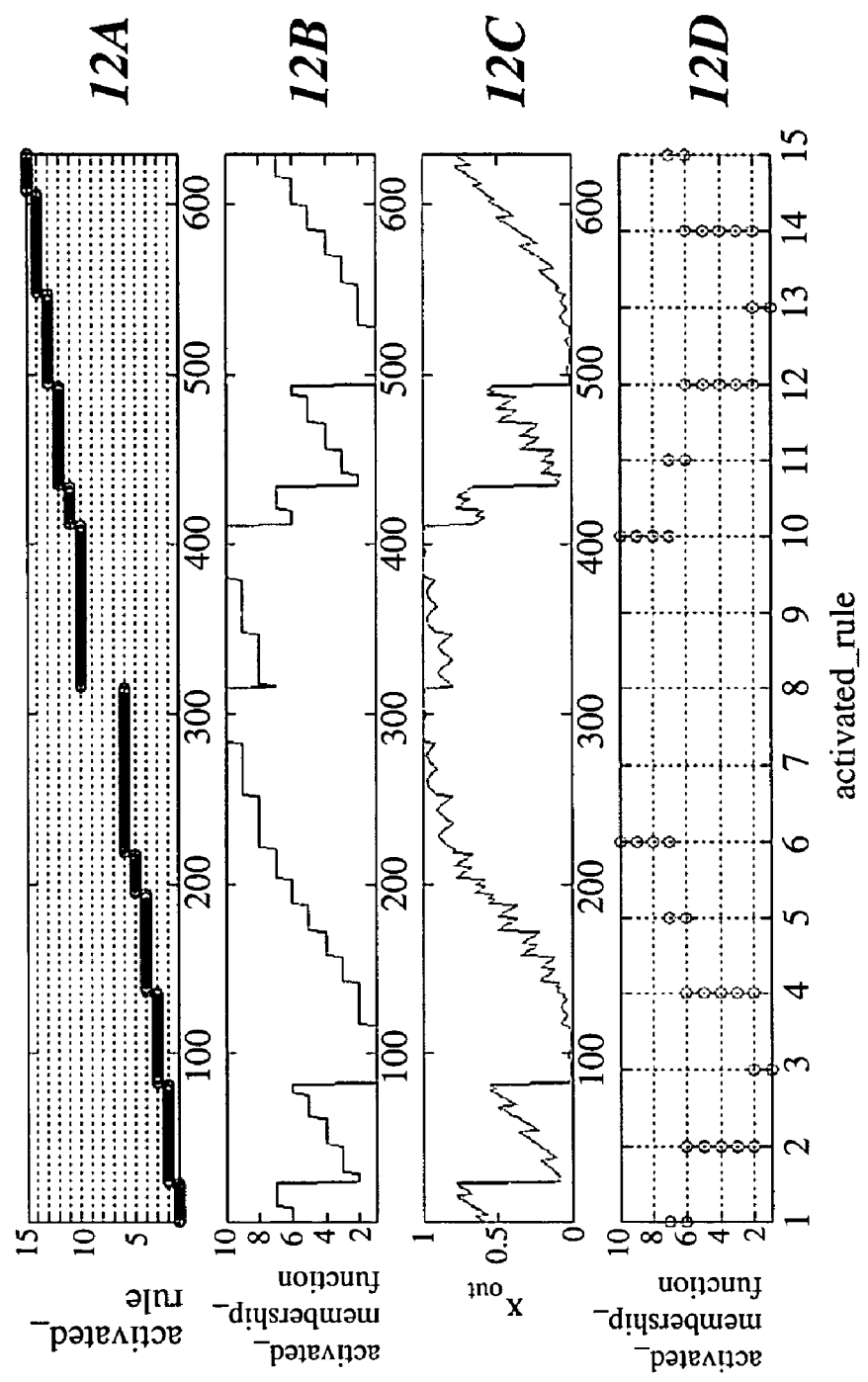
FIG. 12A shows the ordered history of the activations of the rules, where the Y-axis corresponds to the rule index, and the X-axis corresponds to the pattern number (t).
FIG. 12B shows the output membership functions, activated in the same points of the teaching signal, corresponding to the activated rules of FIG. 12A.
FIG. 12C shows the corresponding output teaching signal.
FIG. 12D shows the relation between rule index, and the index of the output membership functions it may activate.

FIG. 12A shows the ordered history of the activations of the rules, where the Y-axis corresponds to the rule index, and the X-axis corresponds to the pattern number (t). FIG. 12B shows the output membership functions, activated in the same points of the teaching signal, corresponding to the activated rules of FIG. 12A. Intervals when the same indexes are activated in FIG. 12B are uninteresting for rule optimization and can be removed. FIG. 12C shows the corresponding output teaching signal. FIG. 12D shows the relation between rule index, and the index of the output membership functions it may activate. From FIG. 12D one can obtain the intervals $[1^{min}_{Y_i}, 1^{max}_{Y_i}]^j$, $j=1, \ldots, N$ where j is the rule index, for example if $j=1$, $1^{min}_{Y_1}=6$, $1^{max}_{Y_1}=8$.

Figure 13:
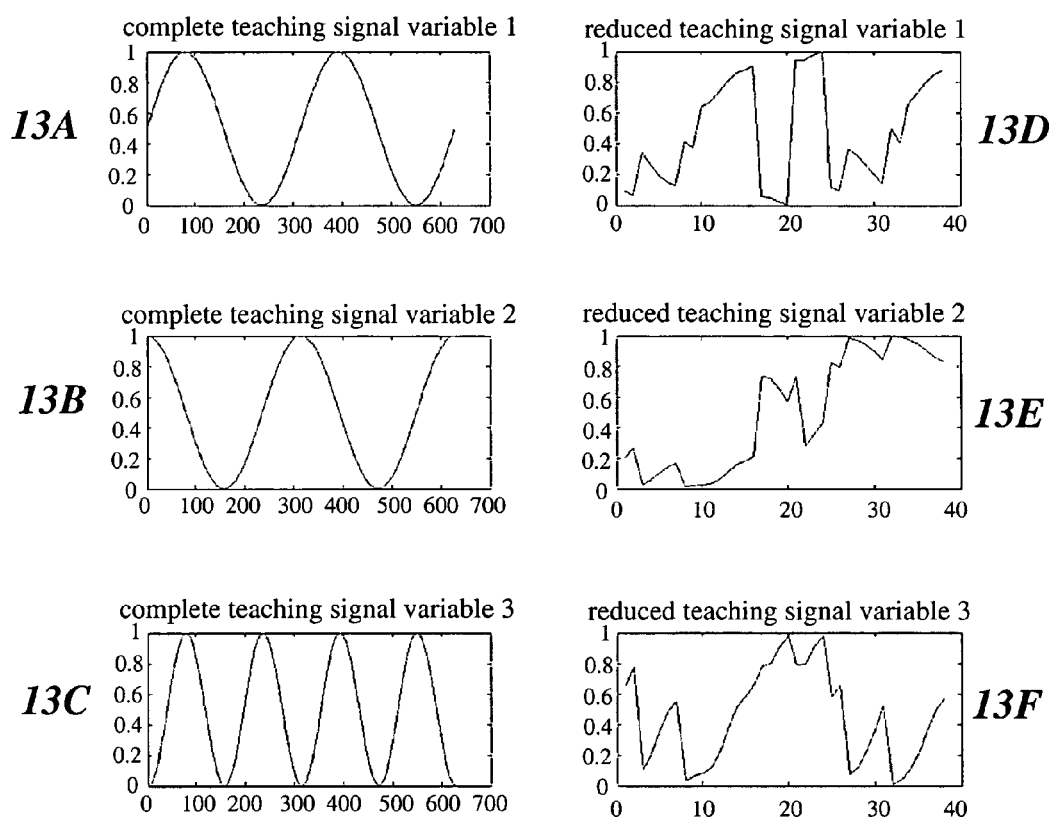
FIG. 13A shows an example of a first complete teaching signal variable.
FIG. 13B shows an example of a second complete teaching signal variable.
FIG. 13C shows an example of a third complete teaching signal variable.
FIG. 13D shows an example of a first reduced teaching signal variable.
FIG. 13E shows an example of a second reduced teaching signal variable.
FIG. 13F shows an example of a third reduced teaching signal variable.

FIGS. 13A–F show plots of the teaching signal reduction using analysis of the possible rule configuration for three signal variables. FIGS. 13A–C show the original signals. FIGS. 13D–F show the results of the teaching signal reduction using the rule activation history. The number of points in the original signal is about 600. The number of points in reduced teaching signal is about 40. Bifurcation points of the signal, as shown in FIG. 12B are kept.

Figure 14:
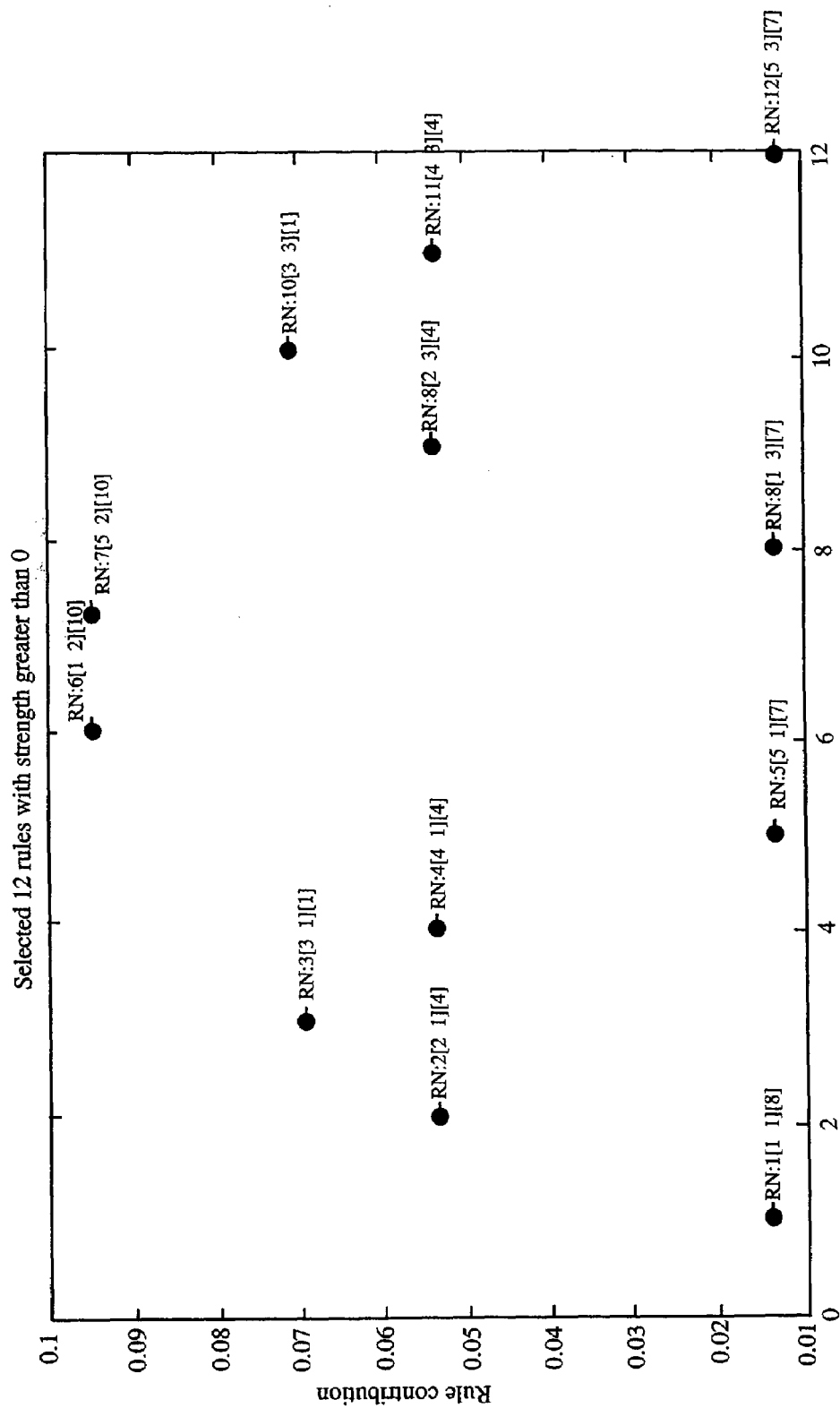
FIG. 14 is a diagram showing rule strength versus rule number for 15 selected rules after second GA optimization.
Figure 15:
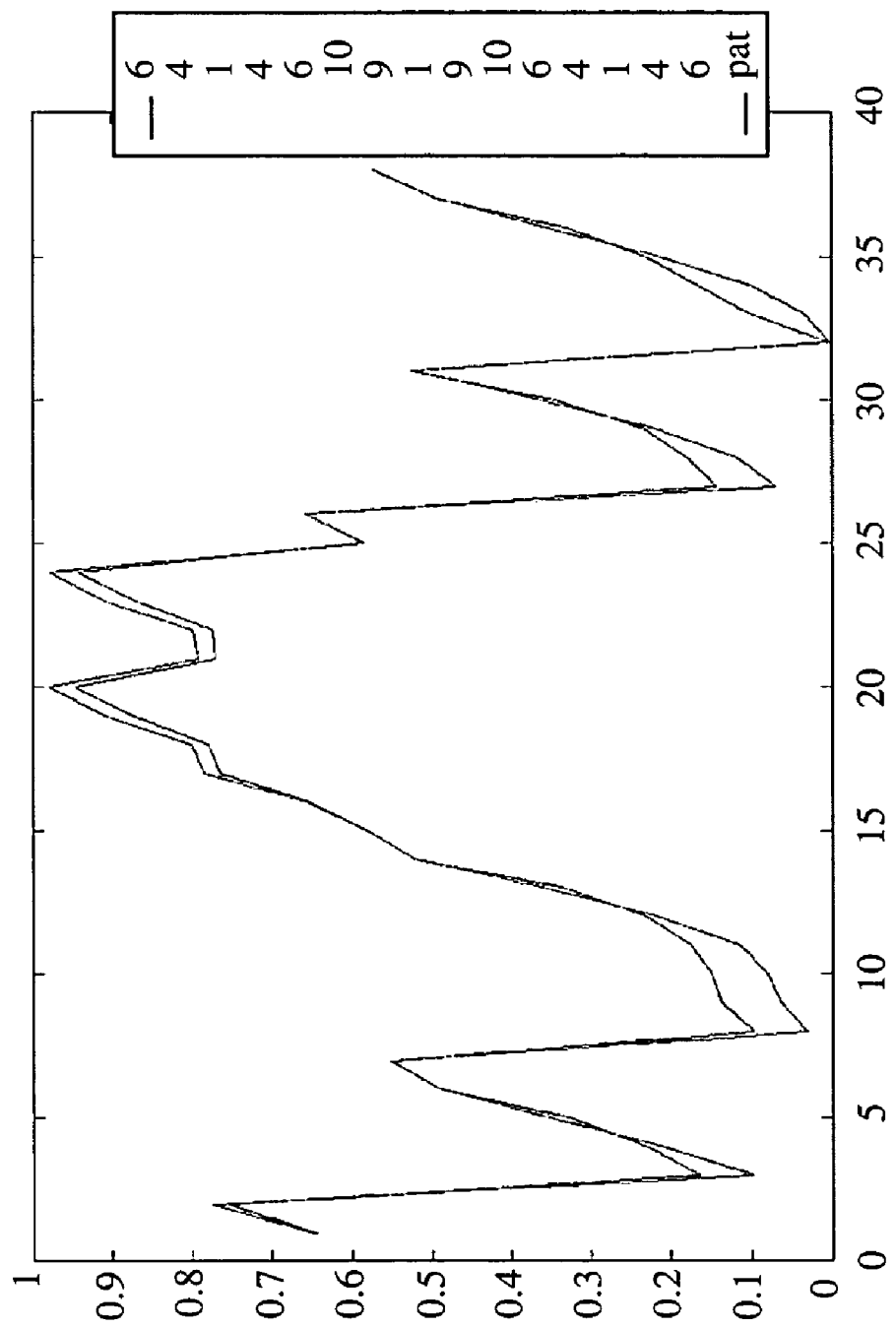
FIG. 15 shows approximation results using a reduced teaching signal corresponding to the rules from FIG. 14.
Figure 16:
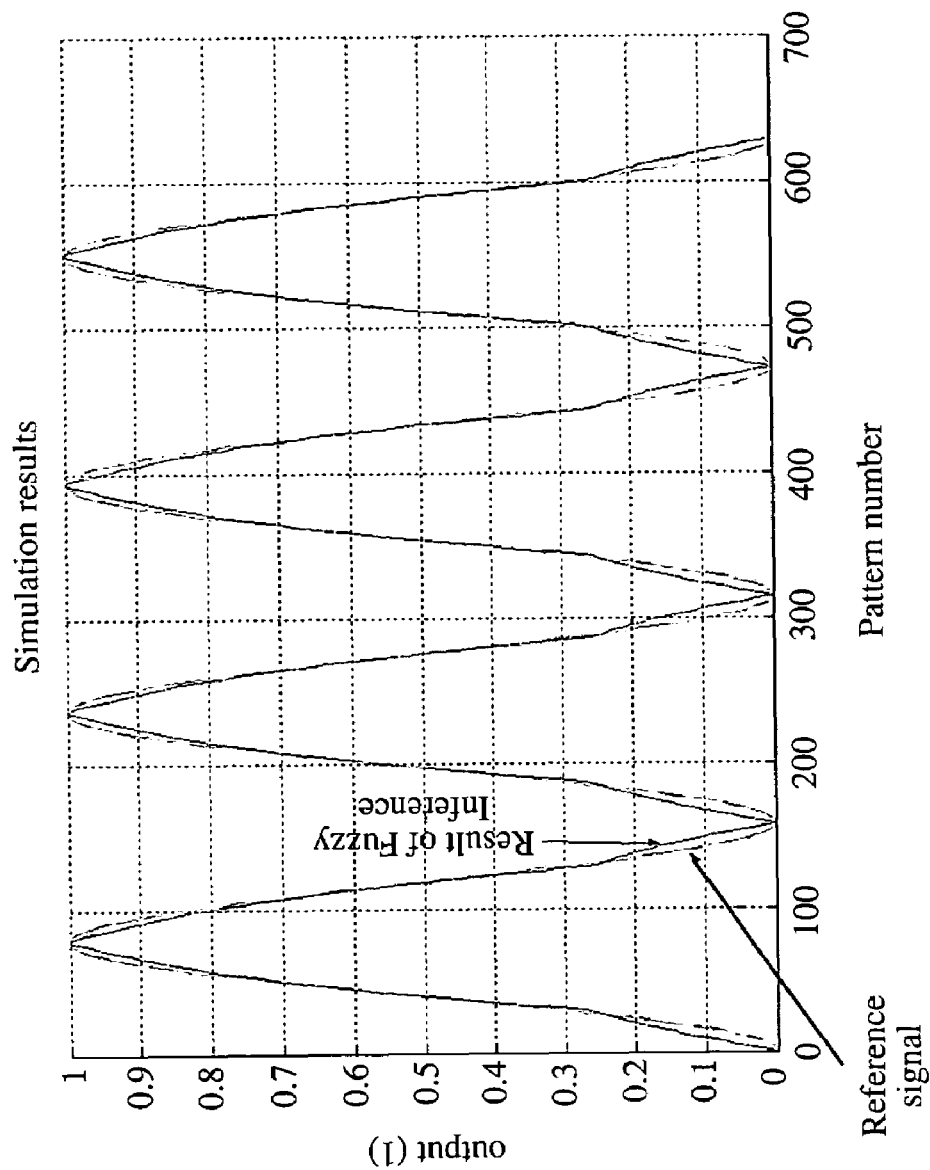
FIG. 16 shows the complete teaching signal corresponding to the rules from FIG. 14.

FIG. 14 is a diagram showing rule strength versus rule number for 12 selected rules after GA2 optimization. FIG. 15 shows approximation results using a reduced teaching signal corresponding to the rules from FIG. 14. FIG. 16 shows the complete teaching signal corresponding to the rules from FIG. 14.

Fitness Evaluation in GA2

The previous section described optimization of the FIS, without the details into the type of FIS selection. In one embodiment, the fitness function used in the GA2 depends, at least in part, on the type of the optimized FIS. Examples of fitness functions for the Mamdani, Sugeno and/or Tsukamoto FIS models are described herein. One of ordinary skill in the art will recognize that other fuzzy models can be used as well.

Define error $E^p$ as a difference between the output part of teaching signal and the FIS output as:

$$E^p = \frac{1}{2}(d^p - F(x_1^p, x_2^p, \ldots, x_n^p))^2 \text{ and } E = \sum_p E^p,$$

where $x_1^p, x_2^p, \ldots, x_n^p$ and $d^p$ are values of input and output variables in the p training pair, respectively. The function $F(x_1^p, x_2^p, \ldots, x_n^p)$ is defined according to the chosen FIS model.

Mamdani Model

For the Mamdani model, the function $F(x_1^p, x_2^p, \ldots, x_n^p)$ is defined as:

$$F(x_1, \ldots, x_n) = \frac{\sum_{l=1}^{M} \overline{y}^l \prod_{i=1}^{n} \mu_{j_i}^l(x_i)}{\sum_{l=1}^{M} \prod_{i=1}^{n} \mu_{j_i}^l(x_i)} = \frac{\sum_{l=1}^{M} \overline{y}^l z^l}{\sum_{l=1}^{M} z^l}, \quad (1.5)$$

where $$z^l = \prod_{i=1}^{n} \mu_{j_i}^l(x_i)$$

and $\overline{y}^l$ is the point of maximum value (called also as a central value) of $\mu_y^l(y)$, $\Pi$ denotes the selected T-norm operation.

Sugeno Model Generally

Typical rules in the Sugeno fuzzy model can be expressed as follows:

IF $x_1$ is $\mu^{(l)}_{j_1}(x_1)$ AND $x_2$ is $\mu^{(l)}_{j_2}(x_2)$ AND . . . AND $x_n$ is $\mu^{(l)}_{j_n}(x_n)$

THEN $y=f^l(x_1, \ldots, x_n)$, where $l=1, 2, \ldots, M$—the number of fuzzy rules M defined as {number of membership functions of $x_l$ input variable}×{number of membership functions of $x_2$ input variable}× . . . ×{number of membership functions of $x_n$ input variable}.

The output of Sugeno FIS is calculated as follows:

$$F(x_1, x_2, \ldots, x_n) = \frac{\sum_{l=1}^{M} f^l \prod_{i=1}^{n} \mu_{j_i}^l(x_i)}{\sum_{l=1}^{M} \prod_{i=1}^{n} \mu_{j_i}^l(x_i)}. \quad (1.6)$$

First-Order Sugeno Model

Typical rules in the first-order Sugeno fuzzy model can be expressed as follows:
IF $x_1$ is $\mu^{(l)}_{j_1}(x_1)$ AND $x_2$ is $\mu^{(l)}_{j_2}(x_2)$ AND . . . AND $x_n$ is $\mu^{(l)}_{j_n}(x_n)$
THEN $y = f^l(x_1, \ldots x_n) = p_1^{(l)} x_1 + p_2^{(l)} x_2 + \ldots p_n^{(l)} x_n + r^{(l)}$, (Output variables described by some polynomial functions.)

The output of Sugeno FIS is calculated according equation (1.6).

Zero-Order Sugeno Model

Typical rules in the zero-order Sugeno FIS can be expressed as follows:
IF $x_1$ is $\mu^{(l)}_{j_1}(x_1)$ AND $x_2$ is $\mu^{(l)}_{j_2}(x_2)$ AND . . . AND $x_n$ is $\mu^{(l)}_{j_n}(x_n)$
THEN $y = r^{(l)}$, The output of zero-order Sugeno FIS is calculated as follows $$F(x_1, x_2, \ldots, x_n) = \frac{\sum_{l=1}^{M} r^l \prod_{i=1}^{n} \mu_{j_i}^l(x_i)}{\sum_{l=1}^{M} \prod_{i=1}^{n} \mu_{j_i}^l(x_i)} \quad (1.7)$$

Tsukamoto Model

The typical rule in the Tsukamoto FIS is:
IF $x_1$ is $\mu^{(l)}_{j_1}(x_1)$ AND $x_2$ is $\mu^{(l)}_{j_2}(x_2)$ AND . . . AND $x_n$ is $\mu^{(l)}_{j_n}(x_n)$
THEN y is $\mu_k^{(l)}(y)$, where $j_1 \in I_{m_1}$ is the set of membership functions describing linguistic values of $x_1$ input variable; $j_2 \in I_{m_2}$ is the set of membership functions describing linguistic values of $x_2$ input variable; and so on, $j_m \in I_{m_n}$ is the set of membership functions describing linguistic values of $x_n$ input variable; and $k \in O$ is the set of monotonic membership functions describing linguistic values of y output variable.

The output of the Tsukamoto FIS is calculated as follows:

$$F(x_1, \ldots, x_n) = \frac{\sum_{l=1}^{M} y^l \prod_{i=1}^{n} \mu_{j_i}^l(x_i)}{\sum_{l=1}^{M} \prod_{i=1}^{n} \mu_{j_i}^l(x_i)} = \frac{\sum_{l=1}^{M} y^l z^l}{\sum_{l=1}^{M} z^l}, \quad (1.8)$$

where $z^l = \prod_{i=1}^{n} \mu_{j_i}^l(x_i)$ and $z^l = \mu_k^{(l)}(y^l)$

Refinement of the KB Structure with GA

Stage 4 described above generates a KB with required robustness and performance for many practical control system design applications. If performance of the KB generated in Stage 4 is, for some reasons, insufficient, then the KB refinement algorithm of Stage 5 can be applied.

In one embodiment, the Stage 5 refinement process of the KB structure is realized as another GA (GA3), with the search space from the parameters of the linguistic variables. In one embodiment the chromosome of GA3 can have the following structure:

$\{[\Delta_1, \Delta_2, \Delta_3]\}^L$; $\Delta_i \in [-\text{prm}_i^j, 1-\text{prm}_i^j]$; i=1,2,3; j=1,2, . . . , L, where L is the total number of the membership functions in the system In this case the quantities $\Delta_i$ are modifiers of the parameters of the corresponding fuzzy set, and the GA3 finds these modifiers according to the fitness function as a minimum of the fuzzy inference error. In such an embodiment, the refined KB has the parameters of the membership functions obtained from the original KB parameters by adding the modifiers $\text{prm}^{new}_i = \text{prm}_i + \Delta_i$.

Different fuzzy membership function can have the same number of parameters, for example Gaussian membership functions have two parameters, as a modal value and variance. Iso-scalene triangular membership functions also have two parameters. In this case, it is advantageous to introduce classification of the membership functions regarding the number of parameters, and to introduce to GA3 the possibility to modify not only parameters of the membership functions, but also the type of the membership functions, form the same class. Classification of the fuzzy membership functions regarding the number of parameters is presented in the Table 2.

TABLE 2

| Class | | | |
|---|---|---|---|
| One parametric | Two parametric | Three parametric | Four parametric |
| Crisp | Gaussian | Non symmetric Gaussian | Trapezoidal |
| | Isosceles triangular | Triangular | Bell |
| | Descending linear | | |
| | Ascending linear | | |
| | Descending Gaussian | | |
| | Ascending Gaussian | | |

GA3 improves fuzzy inference quality in terms of the approximation error, but may cause over learning, making the KB too sensitive to the input. In one embodiment a fitness function for rule base optimization is used. In one embodiment, an information-based fitness function is used. In another embodiment the fitness function used for membership function optimization in GA1 is used. To reduce the search space, the refinement algorithm can be applied only to some selected parameters of the KB. In one embodiment refinement algorithm can be applied to selected linguistic variables only.

Figure 17:
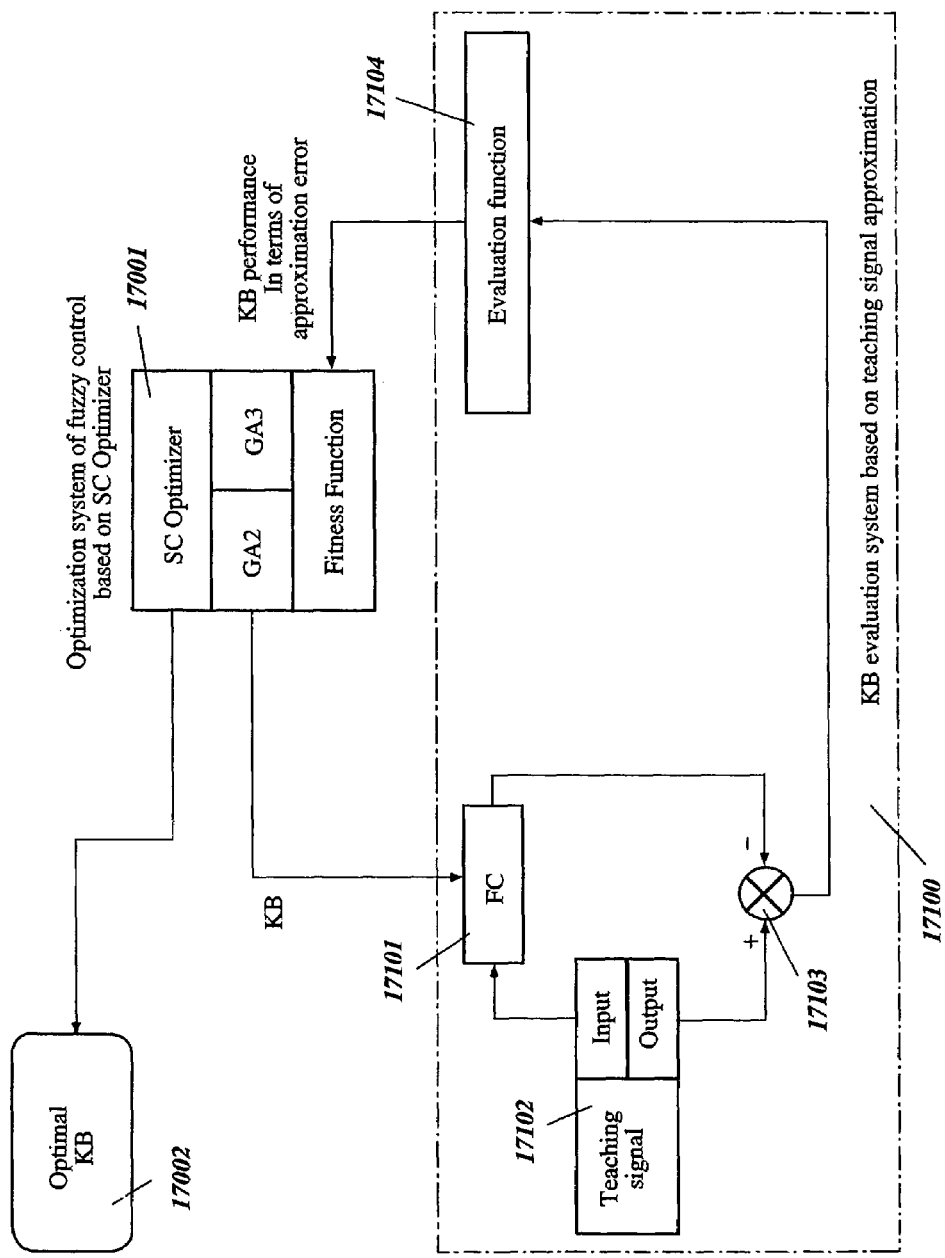
FIG. 17 shows embodiment with KB evaluation based on approximation error.

The structure realizing evaluation procedure of GA2 or GA3 is shown in FIG. 17. In FIG. 17, the SC optimizer 17001 sends the KB structure presented in the current chromosome of GA2 or of GA3 to FC 17101. An input part of the teaching signal 17102 is provided to the input of the FC 17101. The output part of the teaching signal is provided to the positive input of adder 17103. An output of the FC 17101 is provided to the negative input of adder 17103. The output of adder 17103 is provided to the evaluation function calculation block 17104. Output of evaluation function calculation block 17104 is provided to a fitness function input of the SC optimizer 17001, where an evaluation value is assigned to the current chromosome.

In one embodiment evaluation function calculation block 17104 calculates approximation error as a weighted sum of the outputs of the adder 17103.

In one embodiment evaluation function calculation block 17104 calculates the information entropy of the normalized approximation error.

Optimization of KB Based on Plant Response

In one embodiment of Stages 4 and 5 the fitness function of GA can be represented as some external function Fitness=$f$(KB), which accepts as a parameter the KB and as output provides KB performance. In one embodiment, the function $f$ includes the model of an actual plant controlled by the system with FC. In this embodiment, the plant model in addition to plant dynamics provides for the evaluation function.

In one embodiment function $f$ might be an actual plant controlled by an adaptive P(I)D controller with coefficient gains scheduled by FC and measurement system provides as an output some performance index of the KB.

In one embodiment the output of the plant provides data for calculation of the entropy production rate of the plant and of the control system while the plant is controlled by the FC with the structure from the the KB.

In one embodiment, the evaluation function is not necessarily related to the mechanical characteristics of the motion of the plant (such as, for example, in one embodiment control error) but it may reflect requirements from the other viewpoints such as, for example, entropy produced by the system, or harshness and or bad feelings of the operator expressed in terms of the frequency characteristics of the plant dynamic motion and so on.

Figure 18:
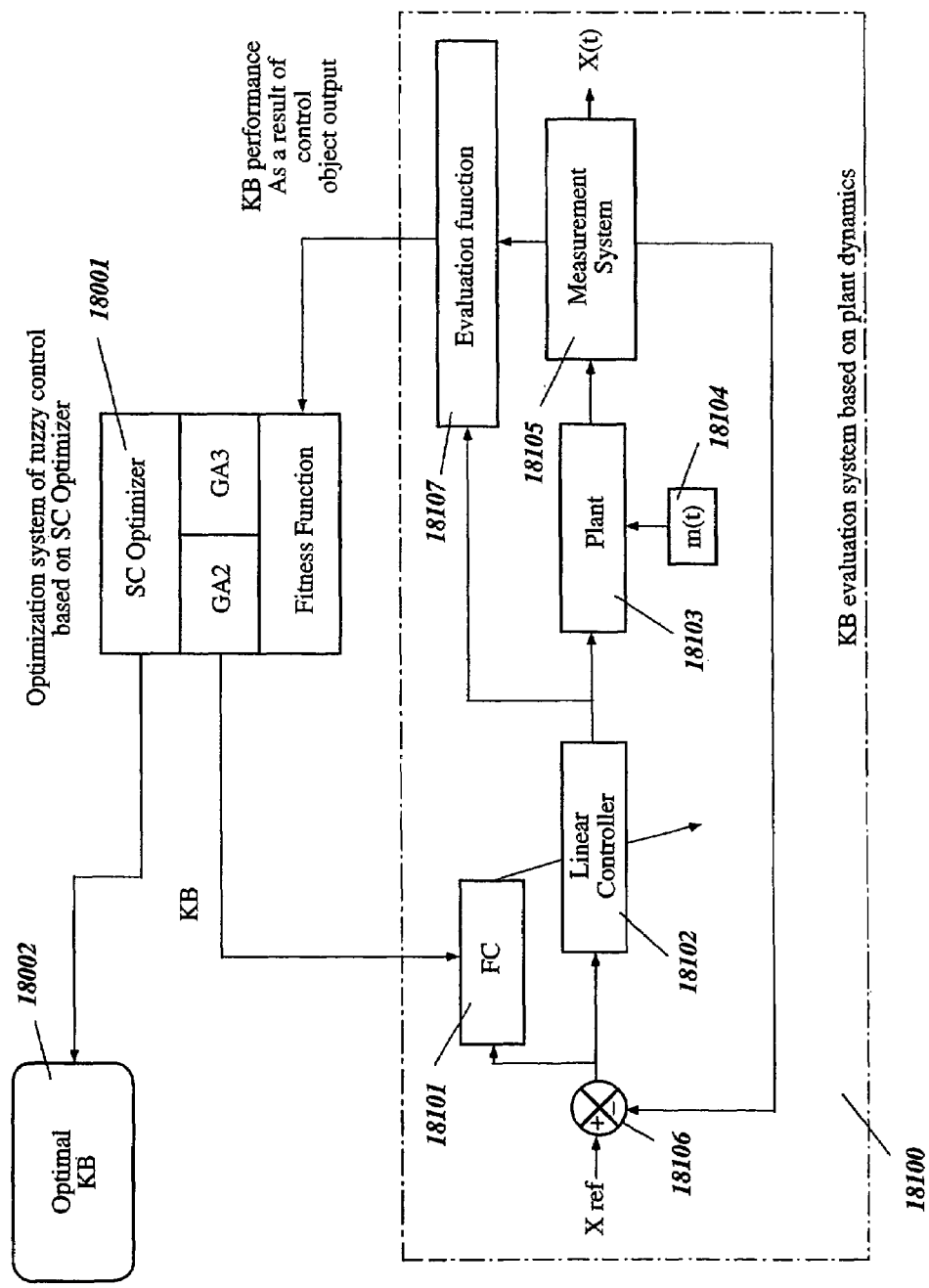
FIG. 18 shows embodiment with KB evaluation based on plant dynamics.

FIG. 18 shows one embodiment the structure-realizing KB evaluation system based on plant dynamics. In FIG. 18, and SC optimizer 18001 provides the KB structure presented in the current chromosome of the GA2 or of the GA3 to an FC 18101. the FC is embedded into the KB evaluation system based on plant dynamics 18100. The KB evaluation system based on plant dynamics 18100 includes the FC 18101, an adaptive P(I)D controller 18102 which uses the FC 18101 as a scheduler of the coefficient gains, a plant 18103, a stochastic excitation generation system 18104, a measurement system 18105, an adder 18106, and an evaluation function calculation block 18107. An output of the P(I)D controller 18102 is provided as a control force to the plant 18103 and as a first input to the evaluation function calculation block 18107. Output of the excitation generation system 18104 is provided to the Plant 18103 to simulate an operational environment. An output of the Plant 18103 is provided to the measurement system 18105. An output of the measurement system 18105 is provided to the negative input of the adder 18106 and together with the reference input Xref forms in adder 18106 control error which is provided as an input to the P(I)D controller 18102 and to the FC 18101. An output of the measurement system 18105 is provided as a second input of the evaluation function calculation block 18107. The evaluation function calculation block 18107 forms the evaluation function of the KB and provides it to the fitness function input of SC optimizer 18001. Fitness function block of SC optimizer 18001 ranks the evaluation value of the KB presented in the current chromosome into the fitness scale according to the current parameters of the GA2 or of the GA3.

In one embodiment, the evaluation function calculation block 18107 forms evaluation function as a minimum of the entropy production rate of the plant 18103 and of the P(I)D controller 18102.

In one embodiment, the evaluation function calculation block 18107 applies Fast Fourier Transformation on one or more outputs of the measurement system 18105, to extract one or more frequency characteristics of the plant output for the evaluation.

In one embodiment, the KB evaluation system based on plant dynamics 18100 uses a nonlinear model of the plant 18103.

In one embodiment, the KB evaluation system based on plant dynamics 18100 is realized as an actual plant with one or more parameters controlled by the adaptive P(I)D controller 18102 with control gains scheduled by the FC 18101.

In one embodiment plant 18103 is a stable plant.

In one embodiment plant 18103 is an unstable plant.

The output of the SC optimizer 18001 is an optimal KB 18002.

Teaching Signal Acquisition

In the previous sections it was stated that the SC optimizer 242 uses as an input the teaching signal which contains the plant response for the optimal control signal.

Figure 19:
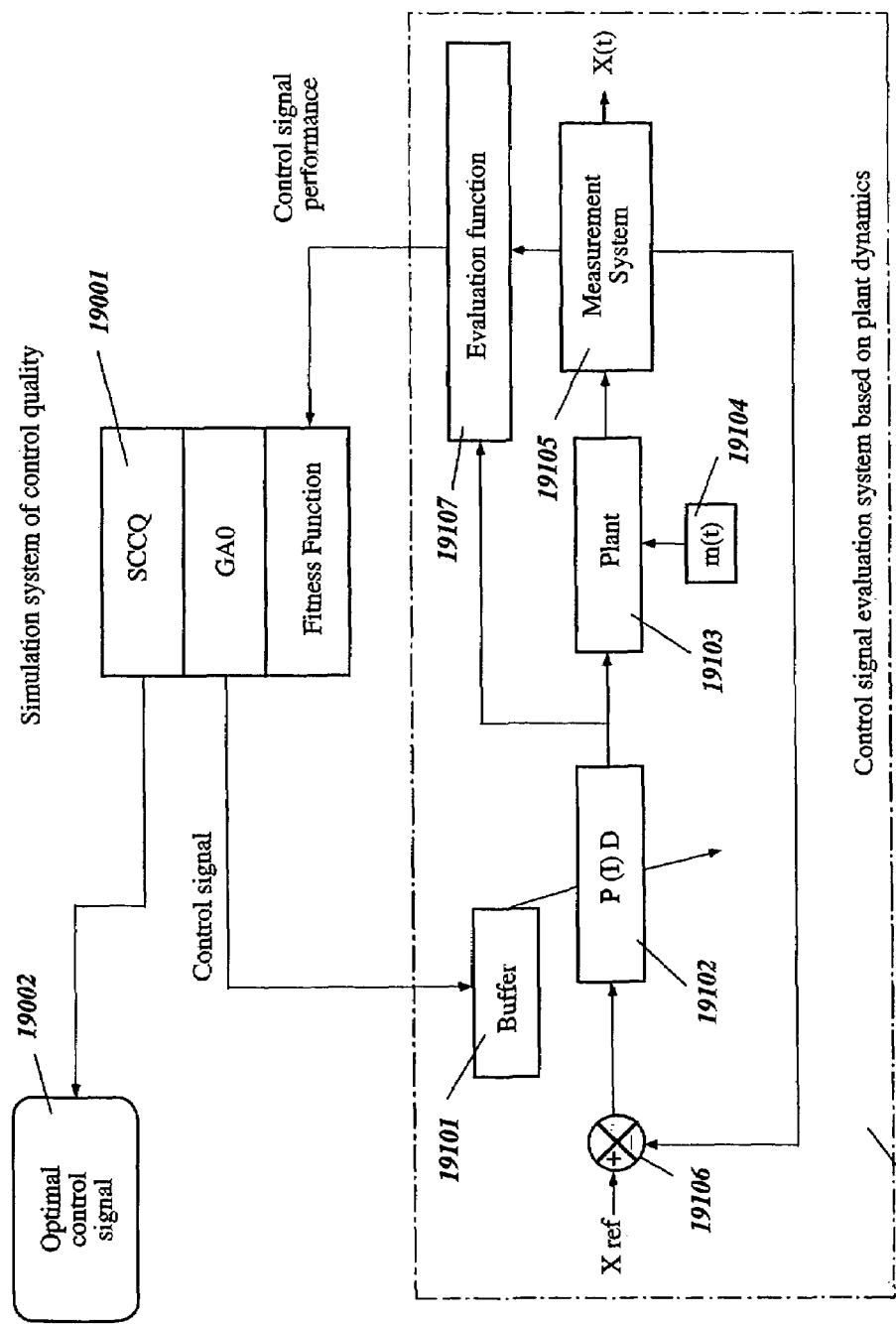
FIG. 19 shows optimal control signal acquisition.

FIG. 19 shows optimal control signal acquisition. FIG. 19 is an embodiment of the system presented in the FIGS. 1 and 2, where the FLCS 140 is omitted and plant 120 is controlled by the P(I)D controller 150 with coefficient gains scheduled directly by the SSCQ 130.

The structure presented in FIG. 19 contains an SSCQ 19001, which contains an GA (GA0). The chromosomes in the GA0 contain the samples of coefficient gains as $\{k_P, k_D, k_I\}^N$. The number of samples N corresponds with the number of lines in the future teaching signal. Each chromosome of the GA0 is provided to a Buffer 19101 which schedules the P(I)D controller 19102 embedded into the control signal evaluation system based on plant dynamics 19100.

The control signal evaluation system based on plant dynamics 19100 includes the buffer 19101, the adaptive P(I)D controller 19102 which uses Buffer 19101 as a scheduler of the coefficient gains, the plant 19103, the stochastic excitation generation system 19104, the measurement system 19105, the adder 19106, and the evaluation function calculation block 19107. Output of the P(I)D controller 19102 is provided as a control force to the plant 19103 and as a first input to the evaluation function calculation block 19107. Output of the excitation generation system 19104 is provided to the Plant 19103 to simulate an operational environment. An output of Plant 19103 is provided to the measurement system 19105. An output of the measurement system 19105 is provided to the negative input of the adder 19106 and together with the reference input Xref forms in adder 19106 control error which is provided as an input to P(I)D controller 19102. An output of the measurement system 19105 is provided as a second input of the evaluation function calculation block 19107. The evaluation function calculation block 19107 forms the evaluation function of the control signal and provides it to the fitness function input of the SSCQ 19001. The fitness function block of the SSCQ 19001 ranks the evaluation value of the control signal presented in the current chromosome into the fitness scale according to the current parameters of the GA0.

An output of the SSCQ 19001 is the optimal control signal 19002.

Figure 20:
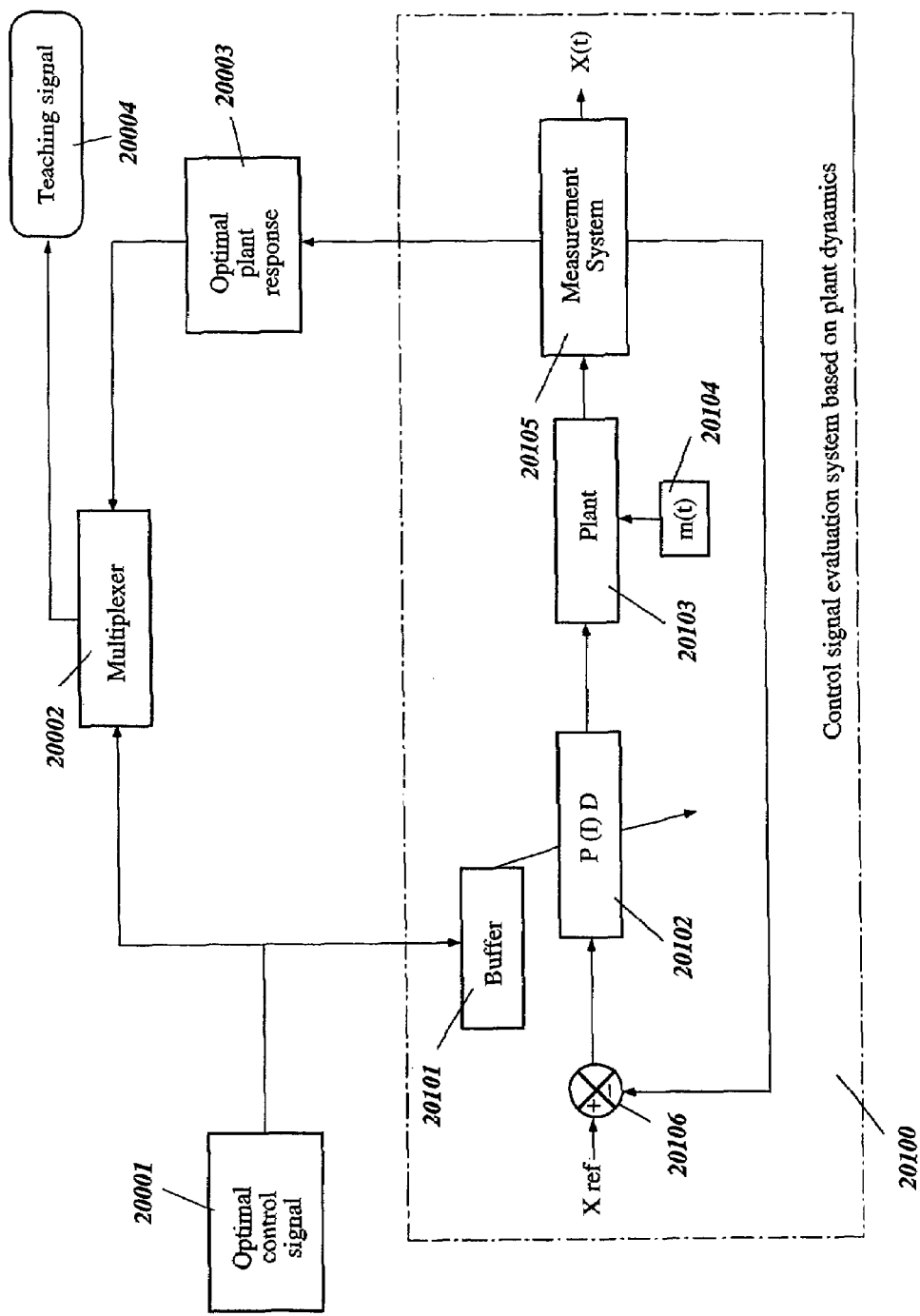
FIG. 20 shows teaching signal acquisition form an optimal control signal.

In one embodiment, the teaching for the SC optimizer 242 is obtained from the optimal control signal 19002 as shown in FIG. 20. In FIG. 20, the optimal control signal 20001 is provided to the buffer 20101 embedded into the control signal evaluation system based on plant dynamics 20100 and as a first input of the multiplexer 20001. Control signal evaluation system based on plant dynamics 20100 includes a buffer 20101, an adaptive P(I)D controller 20102 which uses the buffer 20101 as a scheduler of the coefficient gains, a plant 20103, a stochastic excitation generation system 20104, a measurement system 20105 and an adder 20106. On output of the P(I)D controller 20102 is provided as a control force to the plant 20103. An output of the excitation generation system 20104 is provided to the plant 20103 to simulate an operational environment. An output of plant 20103 is provided to the measurement system 29105. An output of the measurement system 20105 is provided to the negative input of the adder 20106 and together with the reference input Xref forms in adder 20106 control error which is provided as an input to P(I)D controller 20102. An output of the measurement system 20105 is the optimal plant response 20003. The optimal plant response 20003 is provided to the multiplexer 20002. The multiplexer 20002 forms the teaching signal by combining the optimal plant response 20003 with the optimal control signal 20001. The output of the multiplexer 20002 is the optimal teaching signal 20004 which is provided as an input to SC optimizer 242.

In one embodiment optimal plant response 20003 can be transformed in a manner that provides better performance of the final FIS.

In one embodiment high and/or low and/or band pass filter is applied to the measured optimal plant response 20003 prior to optimal teaching signal 20004 formation.

In one embodiment detrending and/or differentiation and/or integration operation is applied to the measured optimal plant response 20003 prior to optimal teaching signal 20004 formation.

In one embodiment other operations which the person skill of art may provide is applied to the measured optimal plant response 20003 prior to optimal teaching signal 20004 formation.

Simulation Results

FIGS. 21–37 shows results of fuzzy control of nonlinear dynamic system under stochastic excitation as an illustration of the example of teaching signal approximation with the optimal FC.

The dynamic system used for the results in FIGS. 21–37 is described by the equations of motion of a coupled nonlinear oscillator:

$$\begin{cases} \ddot{x} + 2\beta_1 \dot{x} + \omega_1^2 (1-ky)x = 0 \\ \ddot{y} + 2\beta_2 \dot{y} + \omega_2^2 y + \frac{\pi^2}{2l}(x\ddot{x}+\dot{x}^2) = \frac{1}{M}u(t)+\xi(t) \end{cases},$$

where:

$u(t)=k_p e+k_d \dot{e}+k_i \int_0 e(t)dt$ ($e=y_{ref}-y$) is a controlling force; and $\xi(t)$ is a stochastic excitation.

The entropy production rate of the dynamic system is:

$$\frac{dS_x}{dt}=2\beta_1\dot{x}\cdot\dot{x},\ \frac{dS_y}{dt}=2\beta_2\dot{y}\cdot\dot{y};$$

The kinetic energy is:

$$T=\frac{\dot{x}^2}{2}+\frac{\dot{y}^2}{2},$$

The potential energy is:

$$U=U_x+U_y,\ U_x=\frac{1}{2}\omega_1^2 x^2(1-ky),\ U_y=\frac{1}{2}\omega_2^2 y^2,$$

The total energy is: T+U.
The control system's entropy production rate is:

$$\frac{dS_c}{dt}=k_d\dot{e}^2.$$

Model parameters used for simulation are:

| | |
|---|---|
| $\beta_1$ | 0.3 |
| $\omega_1$ | 1.5 |
| k | 4 |
| $\beta_2$ | 0.3 |
| $\omega_2$ | 4 |
| l | 0.5 |
| M | 5 |

Initial conditions are taken as:
[$x_0=1;\ y_0=0;\ \dot{x}_0=0;\ \dot{y}_0=0$]

Stochastic excitation used for the simulations is Raleigh noise, obtained using a stochastic filter. A time history and the histogram of such a noise is shown in FIG. 21.

The GA parameters used in the SSCQ 130 for the simulation results are: PS: 200; GN: 100; Pcr=0.9; Pmut=0.006; and two point crossover was used. The results of the stochastic simulations under different types of control are presented in the FIGS. 22–37.

Figure 21:
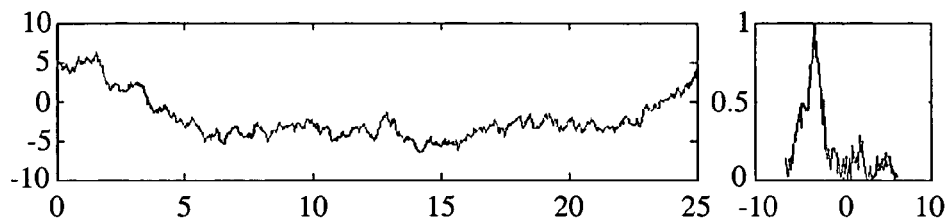
FIG. 21 shows the stochastic excitation as a left subplot showing time history, and a right subplot showing the normalized histogram.

FIG. 21 shows the stochastic excitation as a left subplot showing time history, and a right subplot showing the normalized histogram.

Figure 22:
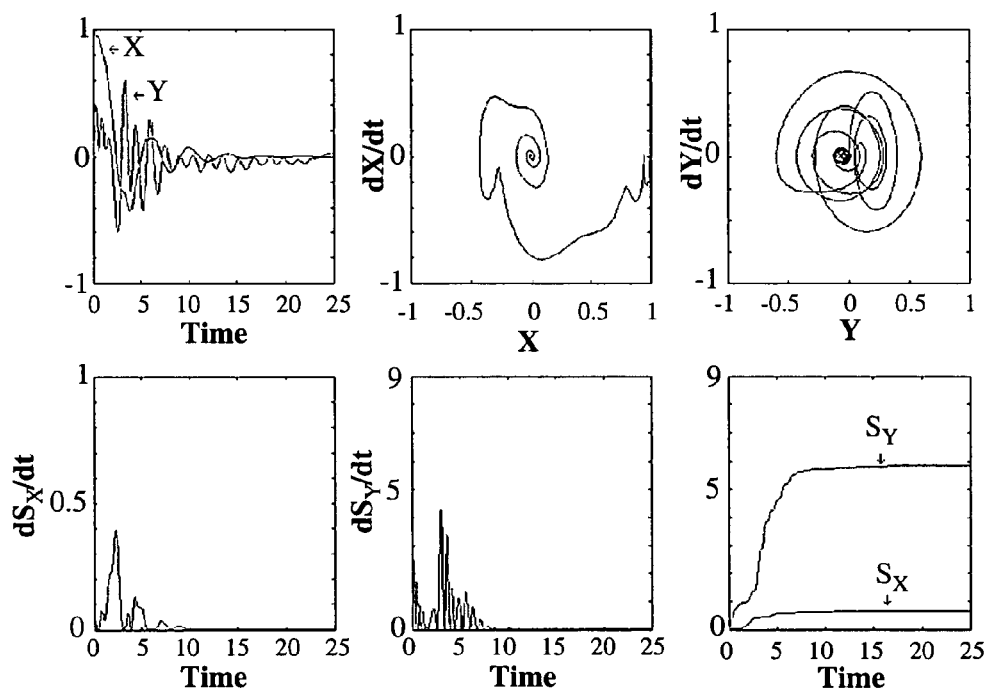
FIG. 22 shows the free oscillations under stochastic excitation.

FIG. 22 shows the free oscillations under stochastic excitation

Figure 23:
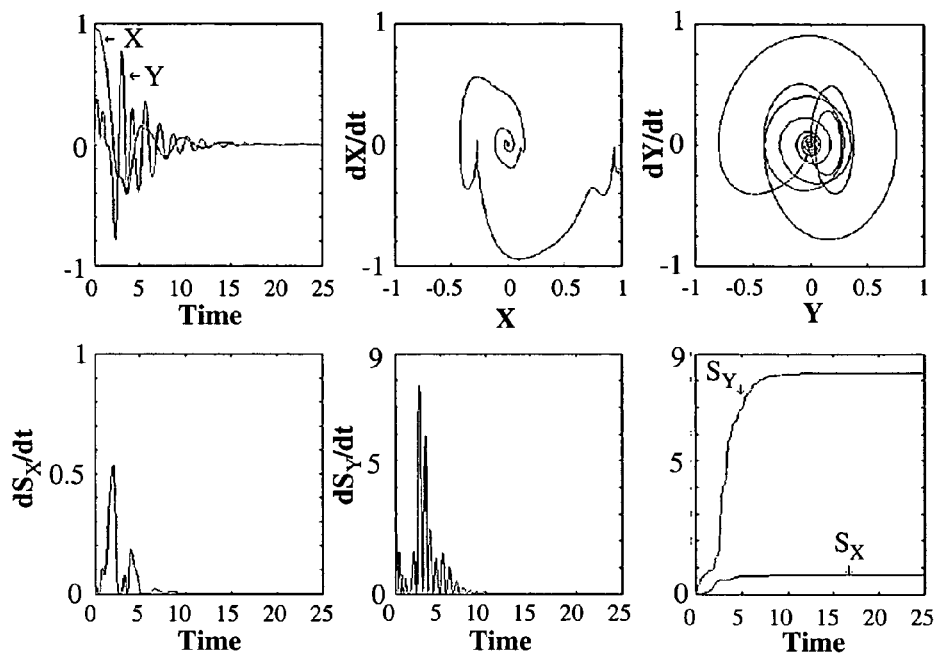
FIG. 23 shows the free oscillations without excitation.

FIG. 23 shows the free oscillations without excitation

Figure 24:
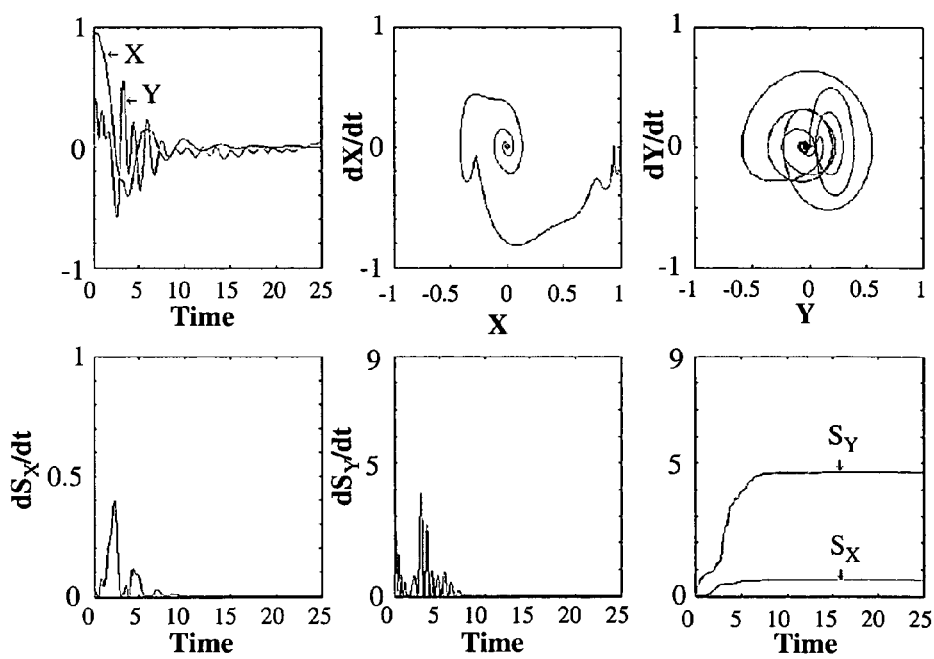
FIG. 24 shows the P(I)D control under stochastic excitation.

FIG. 24 shows the P(I)D control under stochastic excitation

Figure 25:
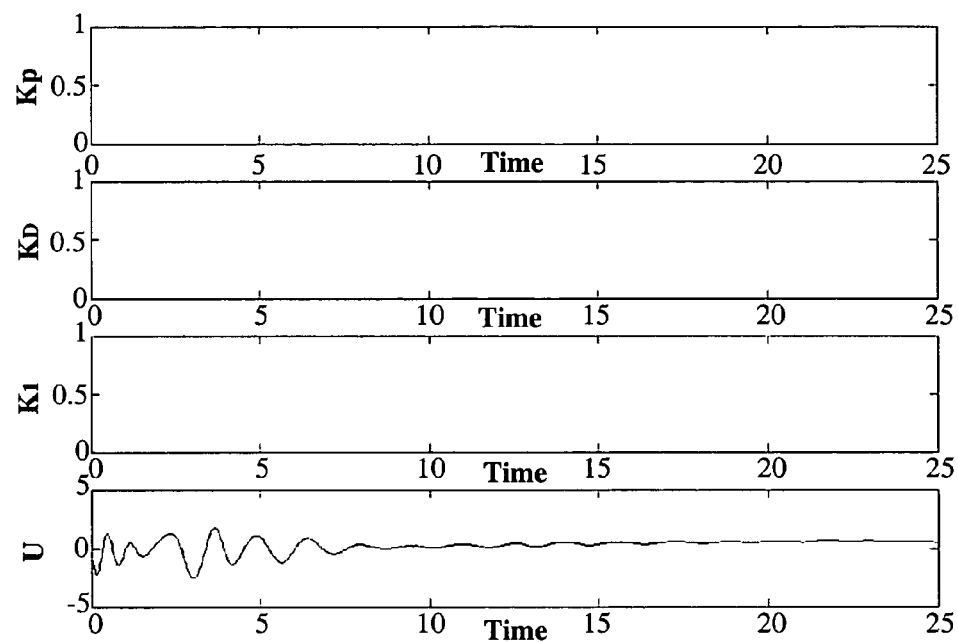
FIG. 25 shows the P(I)D gains and control force, obtained with P(I)D control under stochastic excitation.
Figure 26:
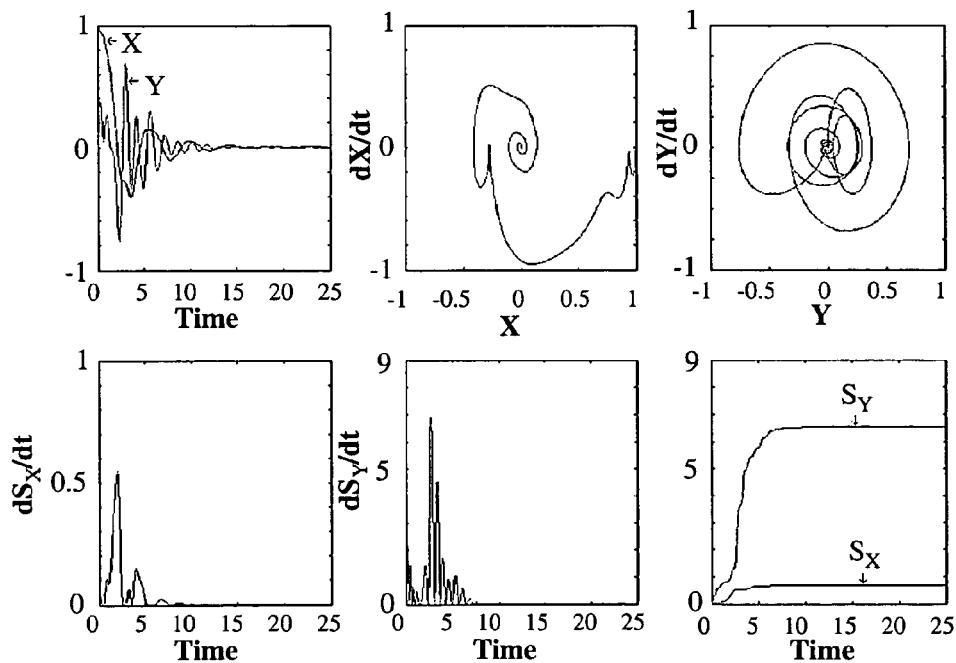
FIG. 26 shows the P(I)D control without excitations.
Figure 27:
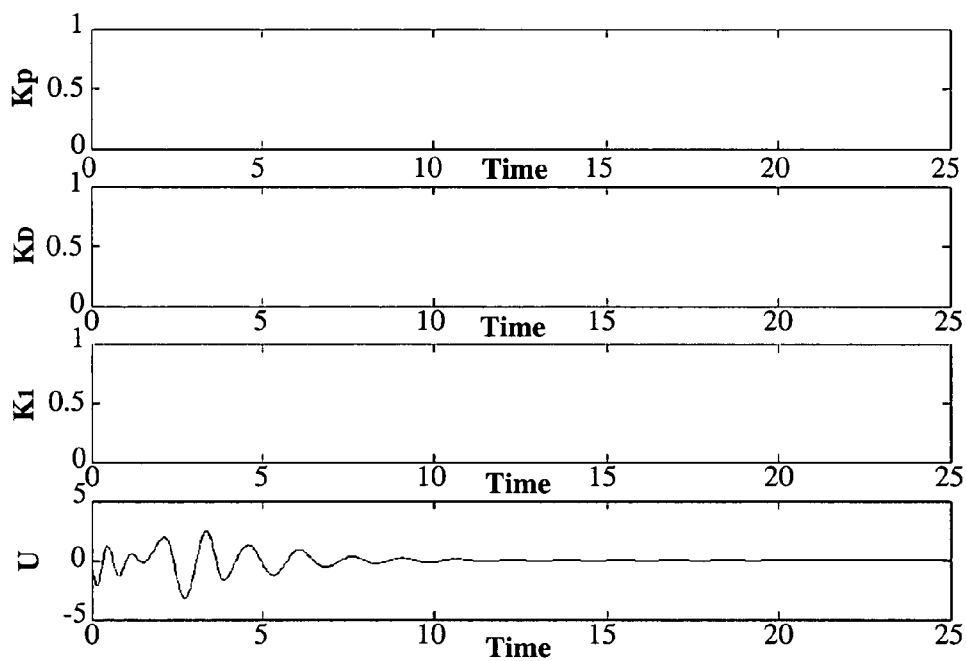
FIG. 27 shows the P(I)D gains and control force, obtained with P(I)D control without excitation.
Figure 28:
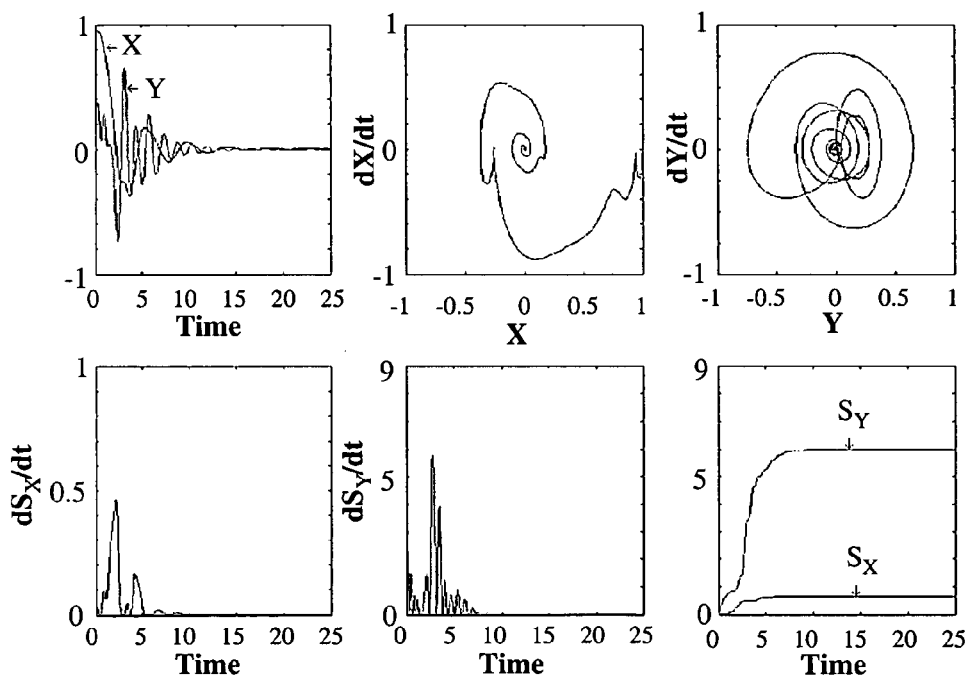
FIG. 28 shows the output of plant controlled by P(I)D controller with gains scheduled with SSCQ with minimum of plant entropy production.
Figure 29:
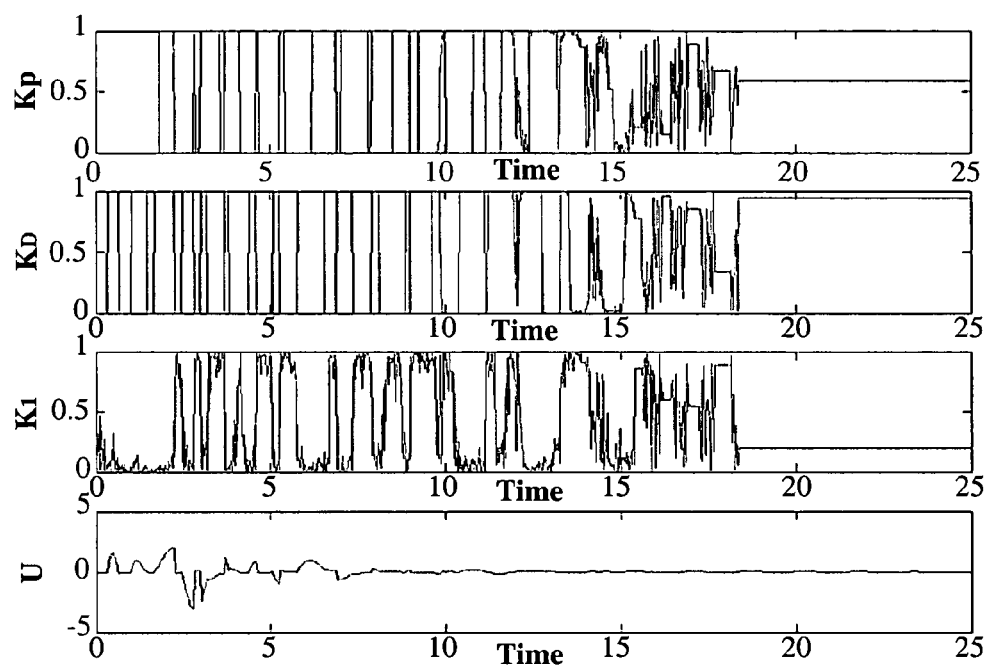
FIG. 29 shows the P(I)D gains adjusted with SSCQ with minimum of plant entropy production, and corresponding control force.
Figure 30:
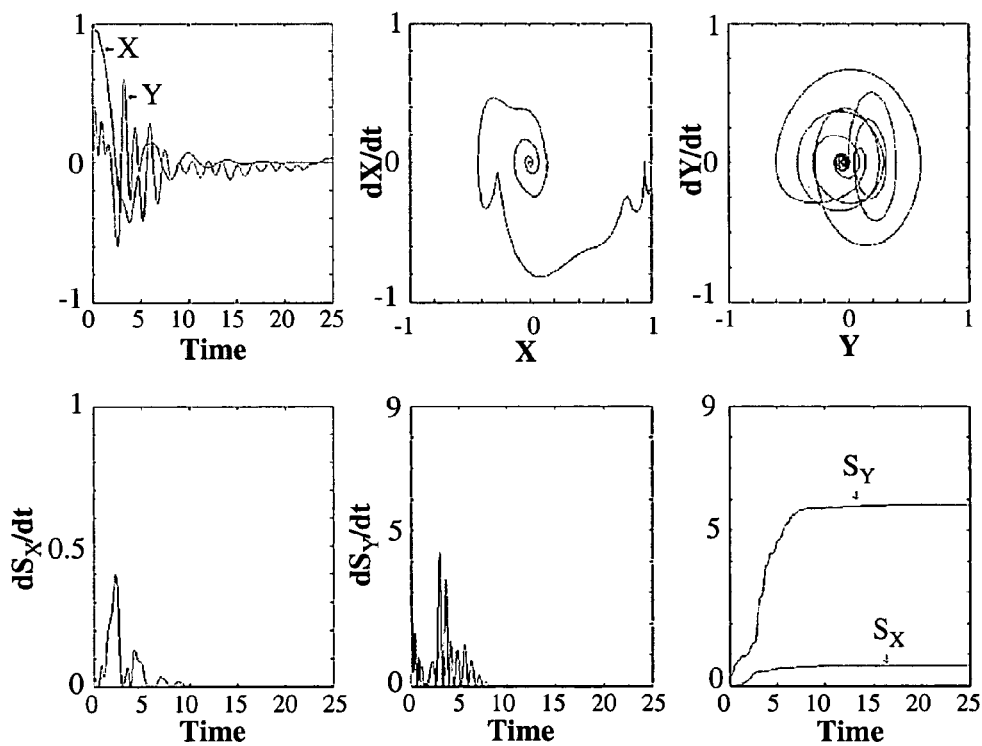
FIG. 30 shows the output of plant with P(I)D gains adjusted with FC obtained using AFM, and as a teaching signals the results of SSCQ with minimum of plant entropy production.
Figure 31:
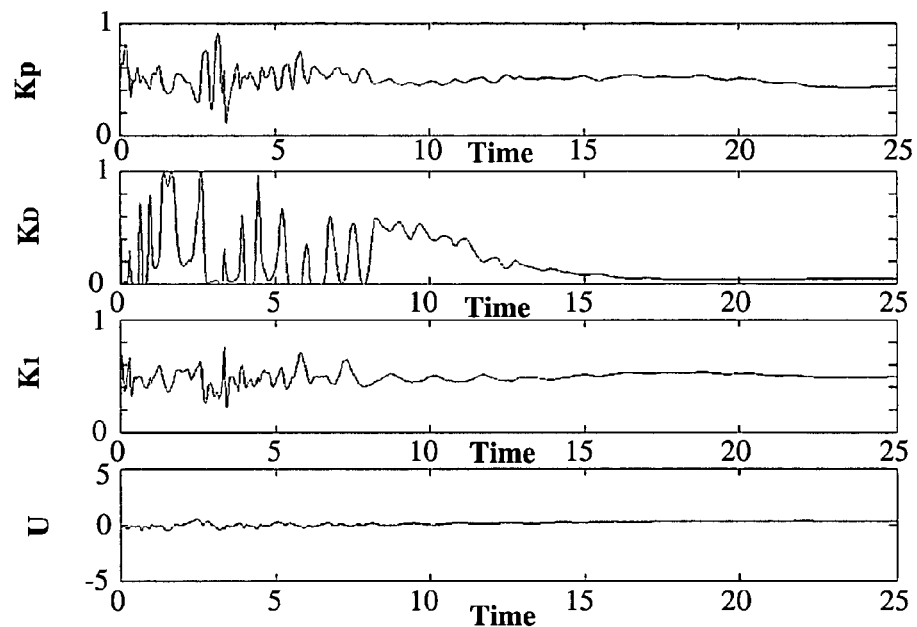
FIG. 31 shows the control gains and control force obtained with AFM.
Figure 32:
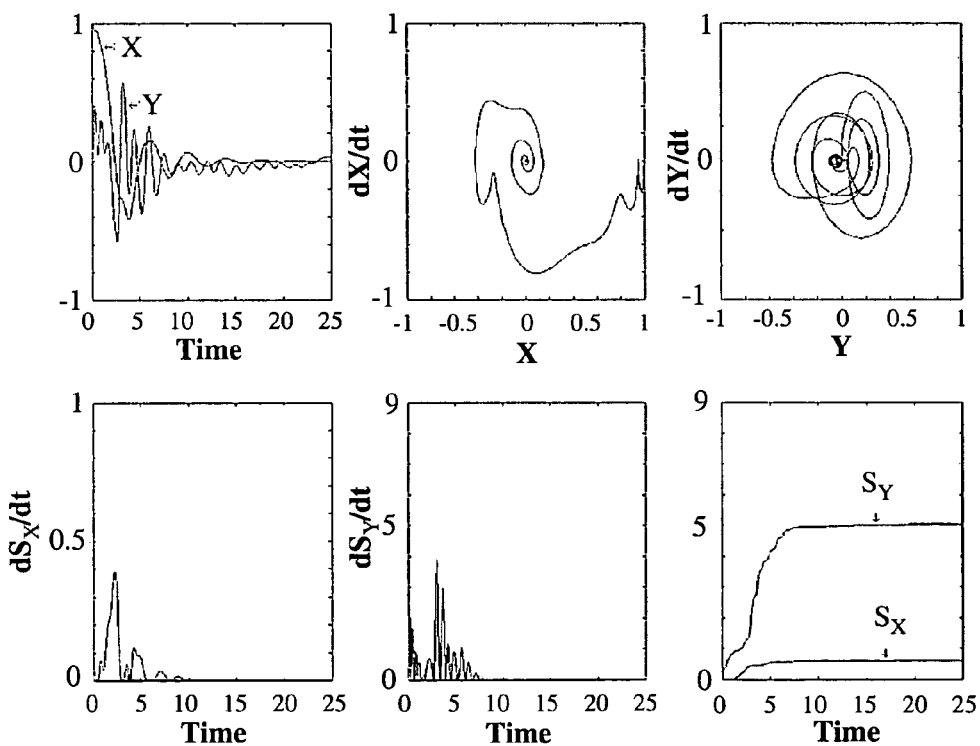
FIG. 32 shows the output of plant with P(I)D gains adjusted with FC obtained using SC optimizer, and as a teaching signals the results of SSCQ with minimum of plant entropy production.
Figure 33:
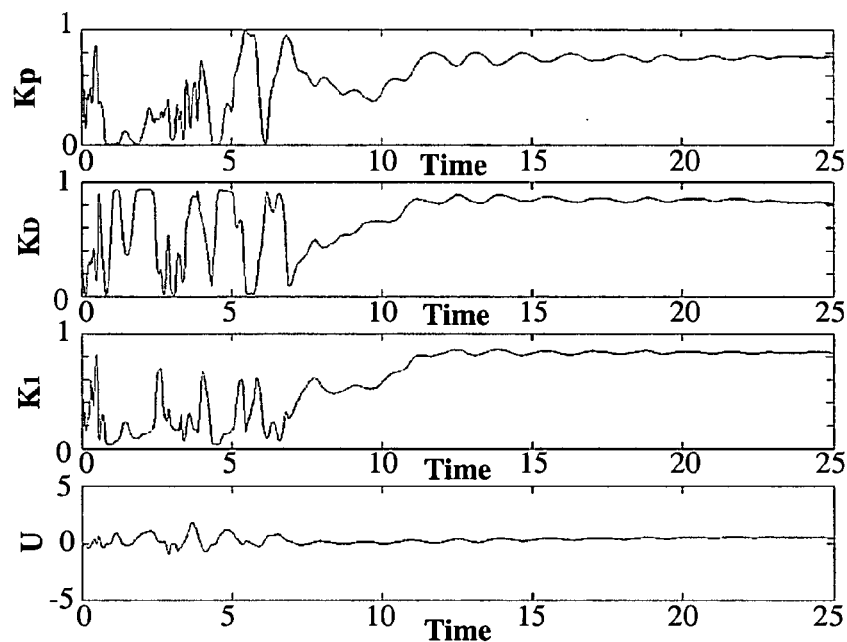
FIG. 33 shows the control gains and control force obtained with SC optimizer.
Figure 34:
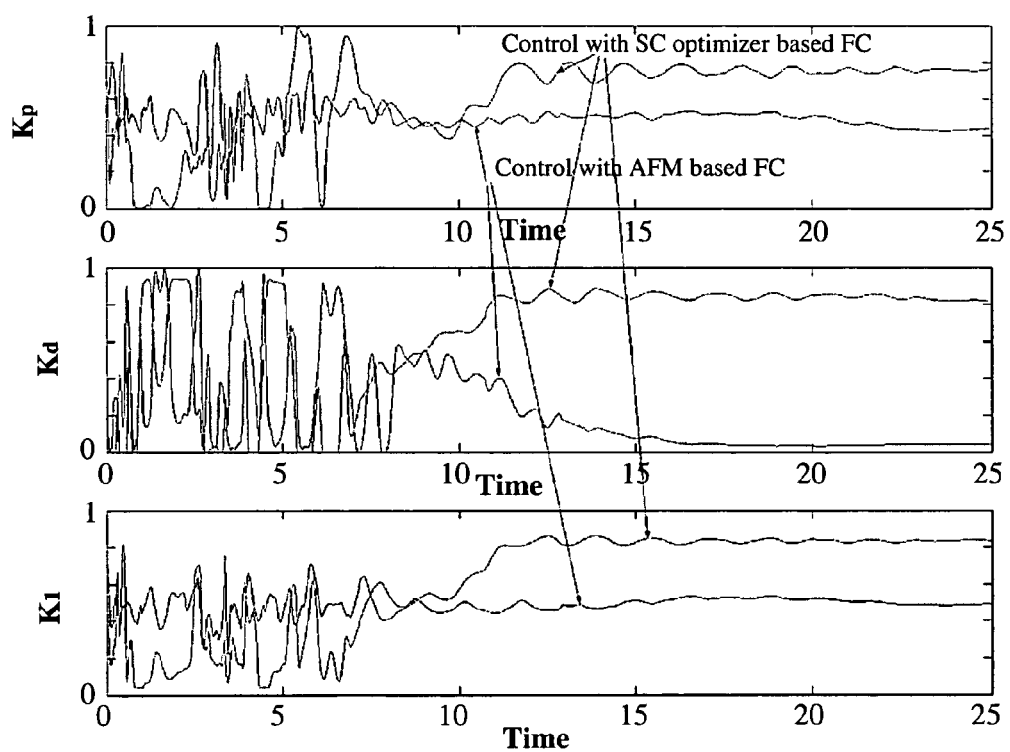
FIG. 34 shows a comparison of the control gains obtained with SC optimizer and with AFM.
Figure 35:
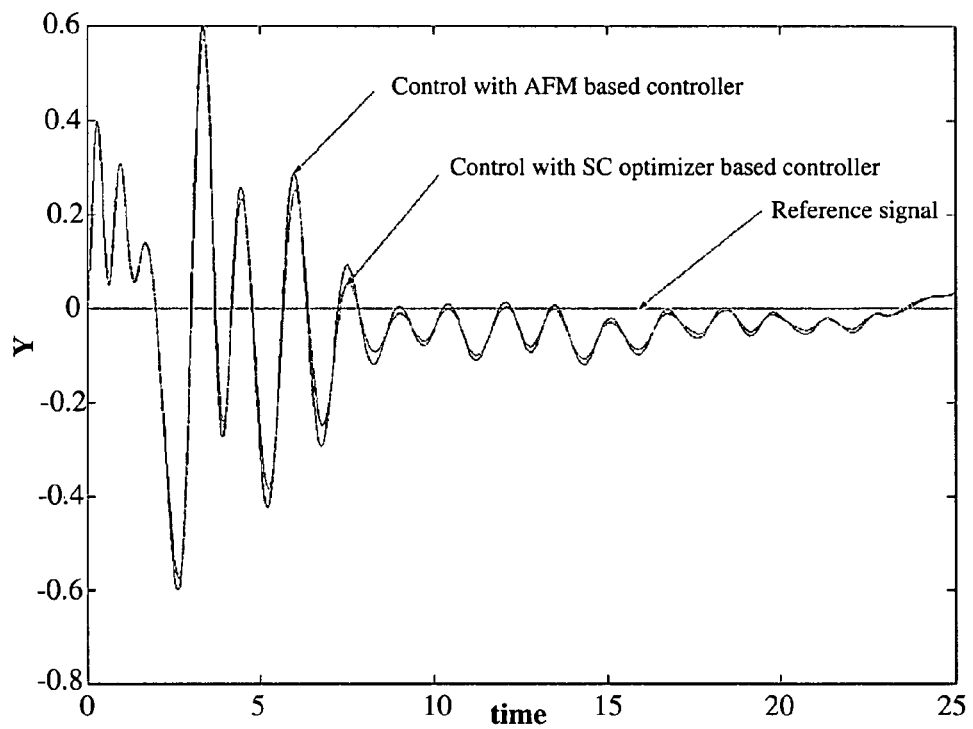
FIG. 35 shows a comparison of the plant controlled variable obtained with SC optimizer and with AFM controller.
Figure 36:
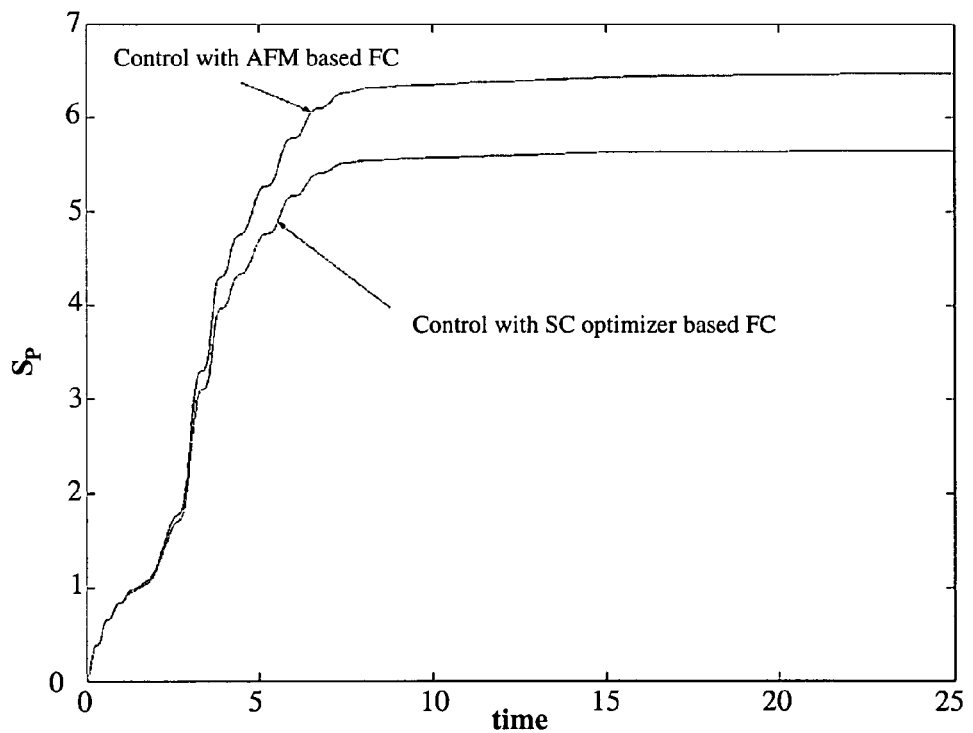
FIG. 36 shows the plant entropy obtained with AFM based FC and with SC optimizer based FC.
Figure 37:
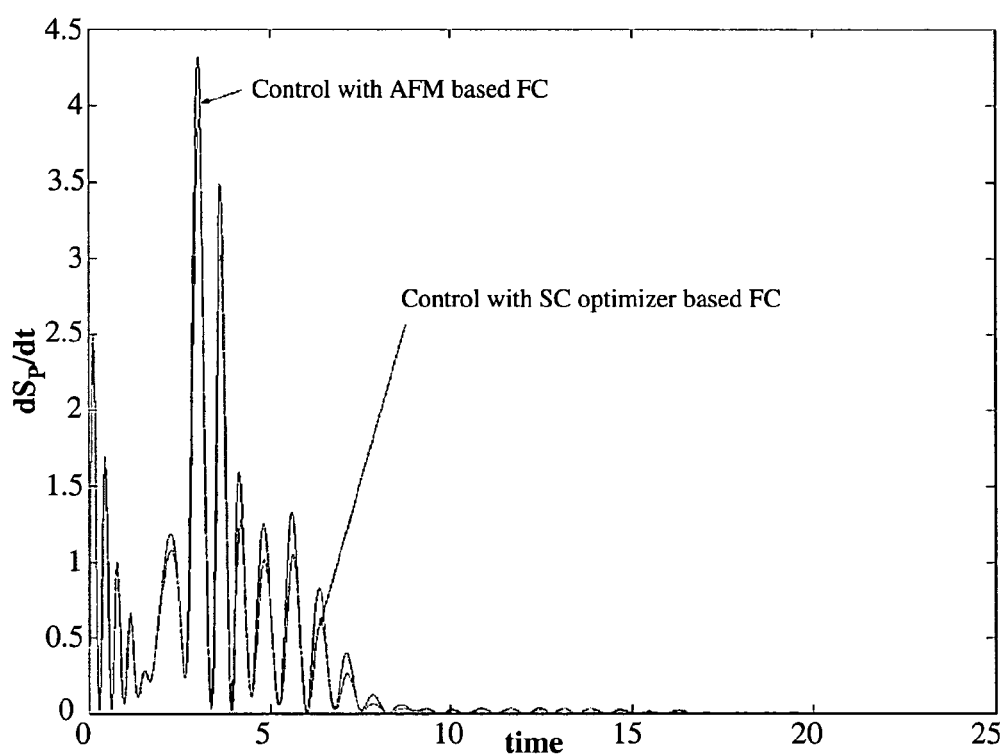
FIG. 37 shows the plant entropy production obtained with AFM based FC and with SC optimizer based FC.

FIG. 25 shows the P(I)D gains and control force, obtained with P(I)D control under stochastic excitation FIG. 26 shows the P(I)D control without excitations FIG. 27 shows the P(I)D gains and control force, obtained with P(I)D control without excitation FIG. 28 shows the output of plant with P(I)D gains adjusted with SSCQ with minimum of plant entropy production FIG. 29 shows the P(I)D gains adjusted with SSCQ with minimum of plant entropy production, and corresponding control force FIG. 30 shows the output of plant with P(I)D gains adjusted with FC obtained using AFM, and as a teaching signals the results of SSCQ with minimum of plant entropy production FIG. 31 shows the control gains and control force obtained with AFM FIG. 32 shows the output of plant with P(I)D gains adjusted with FC obtained using SC optimizer, and as a teaching signals the results of SSCQ with minimum of plant entropy production FIG. 33 shows the control gains and control force obtained with SC optimizer FIG. 34 shows a comparison of the control gains obtained with SC optimizer and with AFM FIG. 35 shows a comparison of the plant controlled variable obtained with the SC optimizer and with the AFM controller FIG. 36 shows the plant entropy obtained with AFM based FC and with the SC optimizer based FC FIG. 37 shows the plant entropy production obtained with AFM based FC and with SC optimizer based FC SC optimizer 242 in the simulation results corresponding to FIGS. 21–C17 uses the Mamdani type fuzzy model with 4 membership functions for the first input, 4 membership functions for the second input, 5 membership functions for the third input, 3 membership functions for the first and second outputs, and 6 membership functions for the third output. The number of membership functions as, well as their types, were obtained by genetic optimization. For the AFM, the number of membership functions for the inputs was specified manually (7 membership functions per each input). The numbers of the membership functions for outputs is simply equal to the number of rules, e.g. 51 membership functions for each output.

FIGS. 37 and 36 show that the intended fitness function (plant entropy) with the SC optimizer-based control is reduced better than with AFM-based control.

Swing dynamic system simulation results, Motion under fuzzy control with one P(I)D Controller. Comparison between back propagation FNN and SC optimizer control results The previous example showed simulated control of a stable plant. The SC optimizer 242 can also be used to optimize a KB for an unstable object as, for in one embodiment, a nonlinear swing dynamic system. The nonlinear equations of motion of the swing dynamic system are:

$$\begin{cases} \ddot{\theta} + 2\frac{\dot{l}}{l}\dot{\theta} + \frac{g}{l}\sin\theta = 0 \\ \ddot{l} + 2k\dot{l} - l\dot{\theta}^2 - g\cos\theta = \frac{1}{m}\left(k_p \cdot e_l + k_d \cdot \dot{e}_l + k_i \cdot \int e_l dt + \xi(t)\right) \end{cases} \quad (38)$$

Here $\xi(t)$ is the given stochastic excitation (a white noise). Equations of entropy production are the following:

$$\frac{dS_\theta}{dt} = 2\frac{\dot{l}}{l}\dot{\theta}\cdot\dot{\theta}; \quad \frac{dS_l}{dt} = 2k\dot{l}\cdot\dot{l}; \quad (39)$$

The system (38) is a globally unstable system (in Lyapunov sense).

In this example only the second state variable (the length l) is controlled, and behavior of the first state variable (the rotation angle θ) is considered only for the reference.

The fitness function for the unstable swing is configured to minimize the entropy production rate in the plant and to minimize the entropy production rate in the control system. The final form of the fitness function of control in this case is:

$$f = (S_P - S_C)\left(\frac{dS_P}{dt} - \frac{dS_C}{dt}\right) \quad (40)$$

For the simulation, initial conditions and system parameters were specified as shown in Table 3 below.

TABLE 3

| $l_0$ | $\dot{l}_0$ | $\theta_0$ | $\dot{\theta}_0$ | k | m | Rs |
|---|---|---|---|---|---|---|
| 2 | 0 | π/4 | 0 | 1 | 1 | 1 = 5 |

Figure 38:
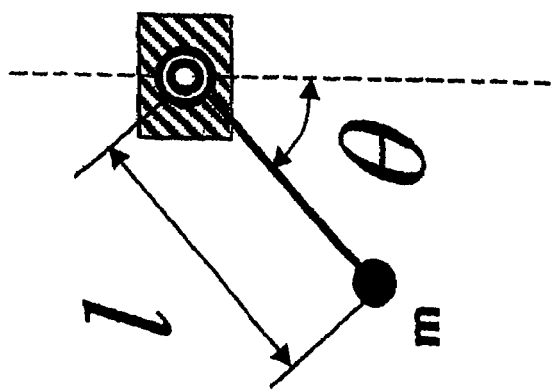
FIG. 38 shows the swing dynamic system.
Figure 39:
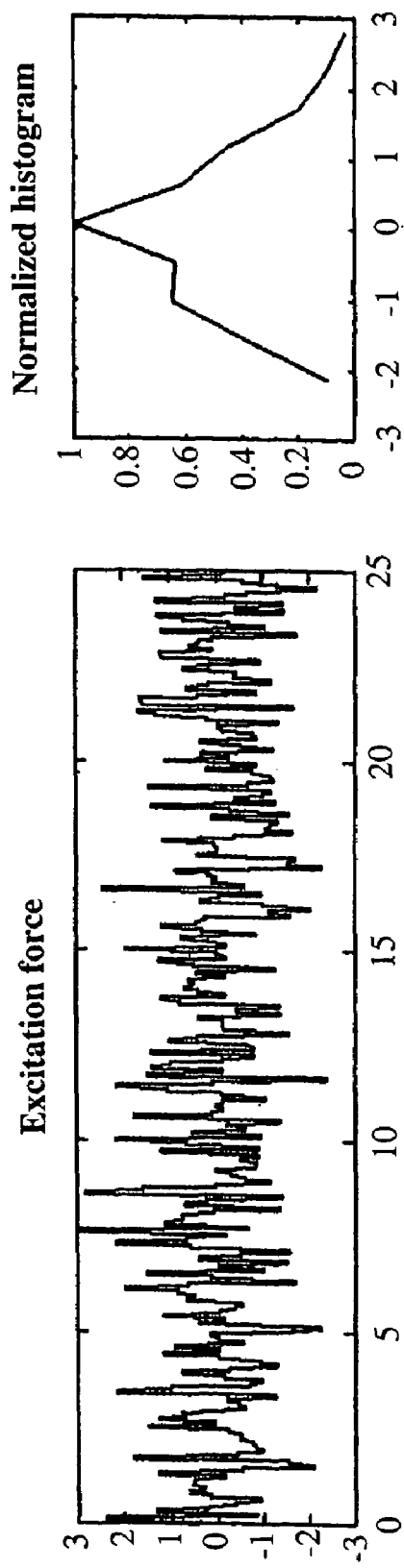
FIG. 39 shows the stochastic excitation used for teaching signal acquisition.
Figure 40:
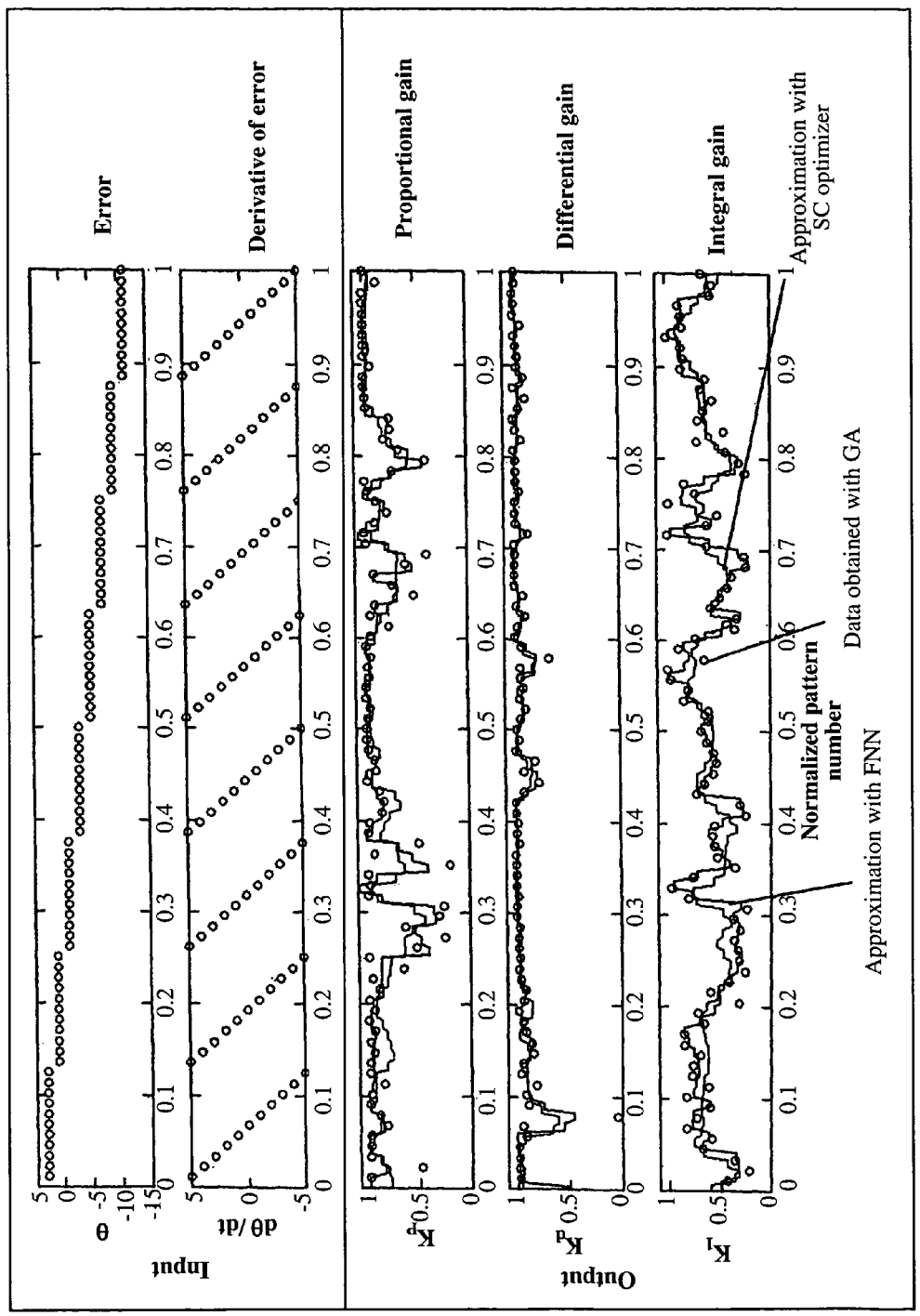
FIG. 40 shows the teaching signal obtained with GA and Approximated with FNN and with SC optimizer.
Figure 41:
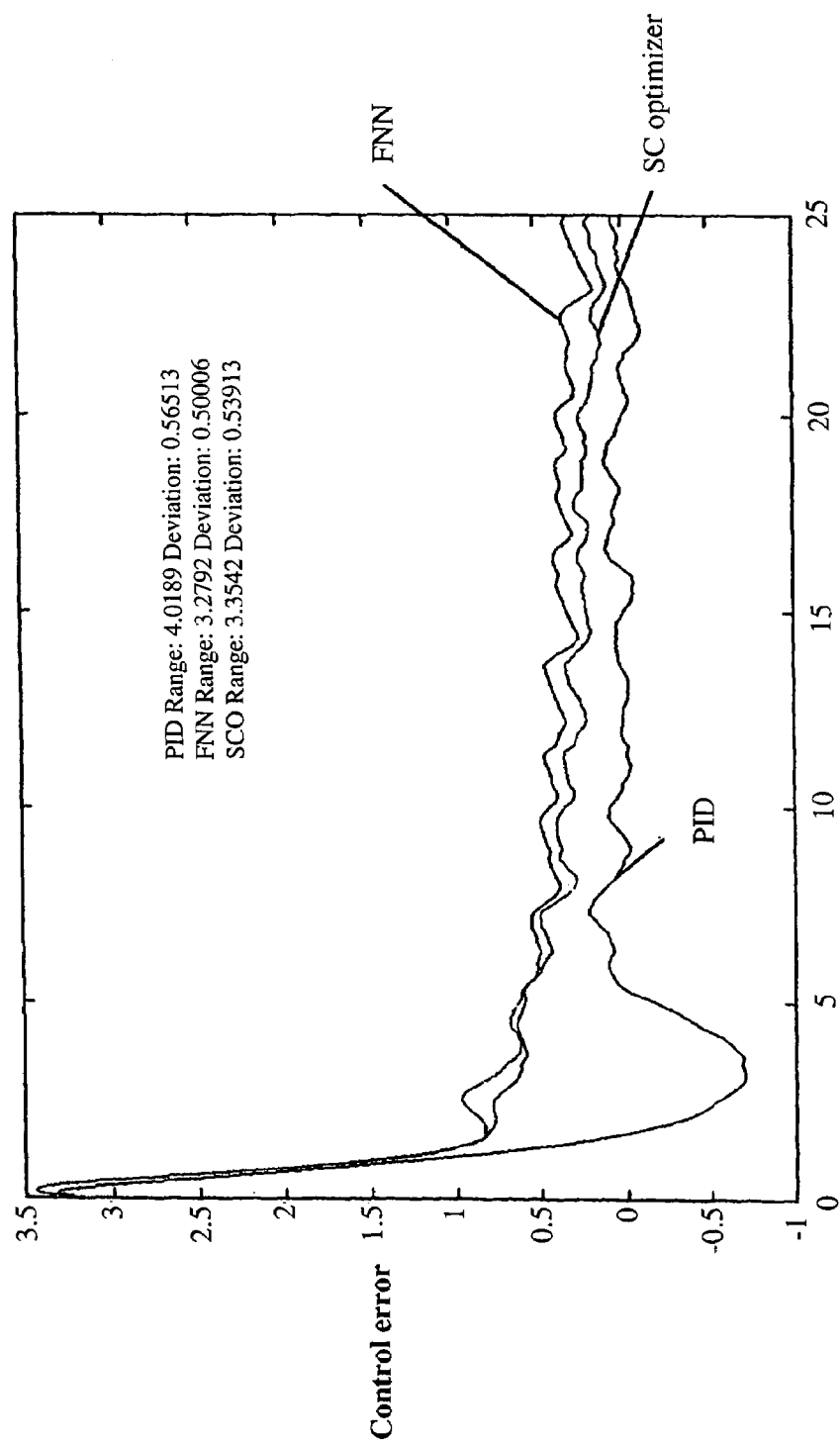
FIG. 41 shows the control error obtained with different controllers, simulation conditions are the same as was set for teaching signal acquisition.
Figure 42:
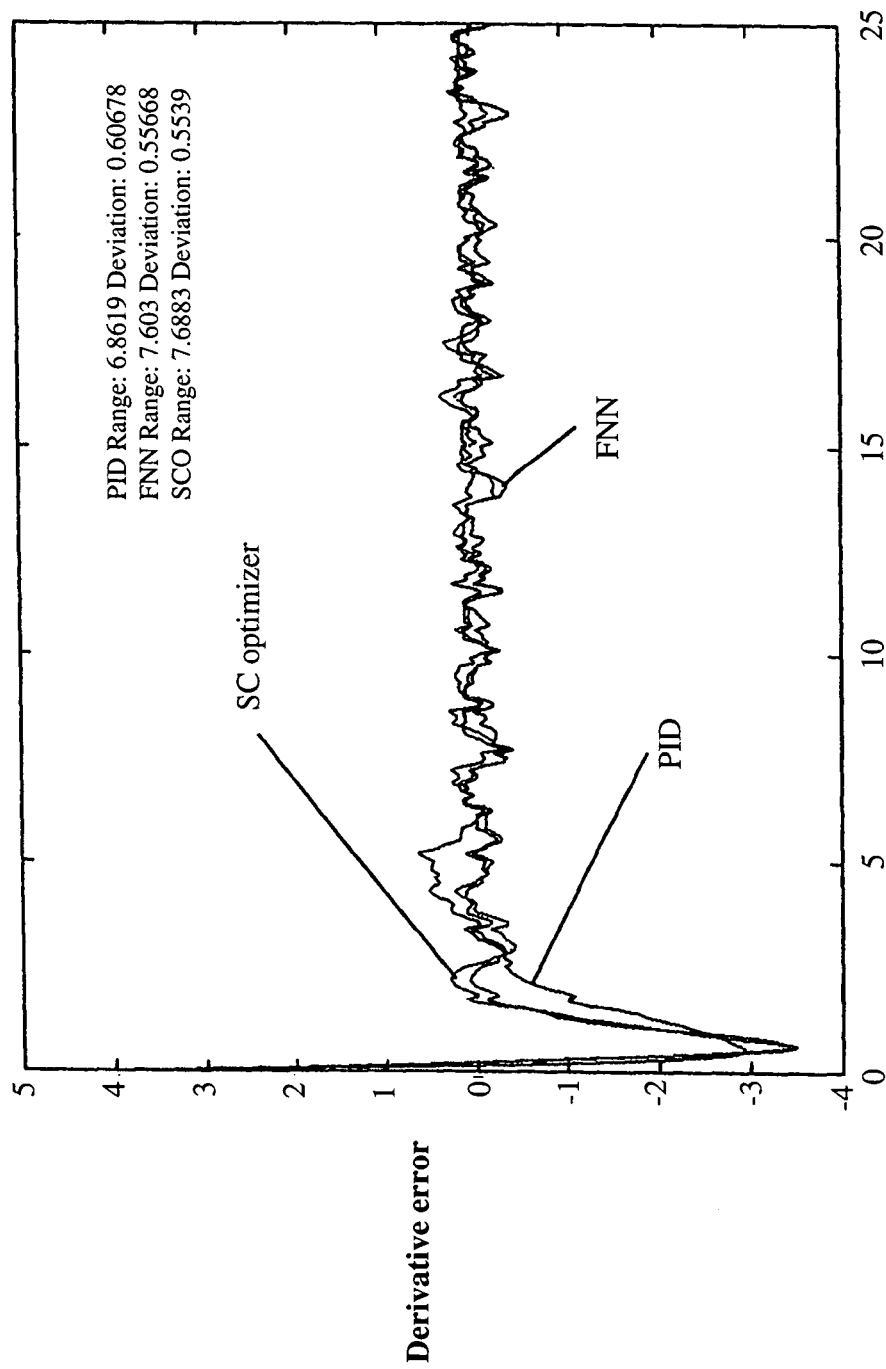
FIG. 42 shows the control error derivative obtained with different controllers, simulation conditions are the same as was set for teaching signal acquisition.
Figure 43:
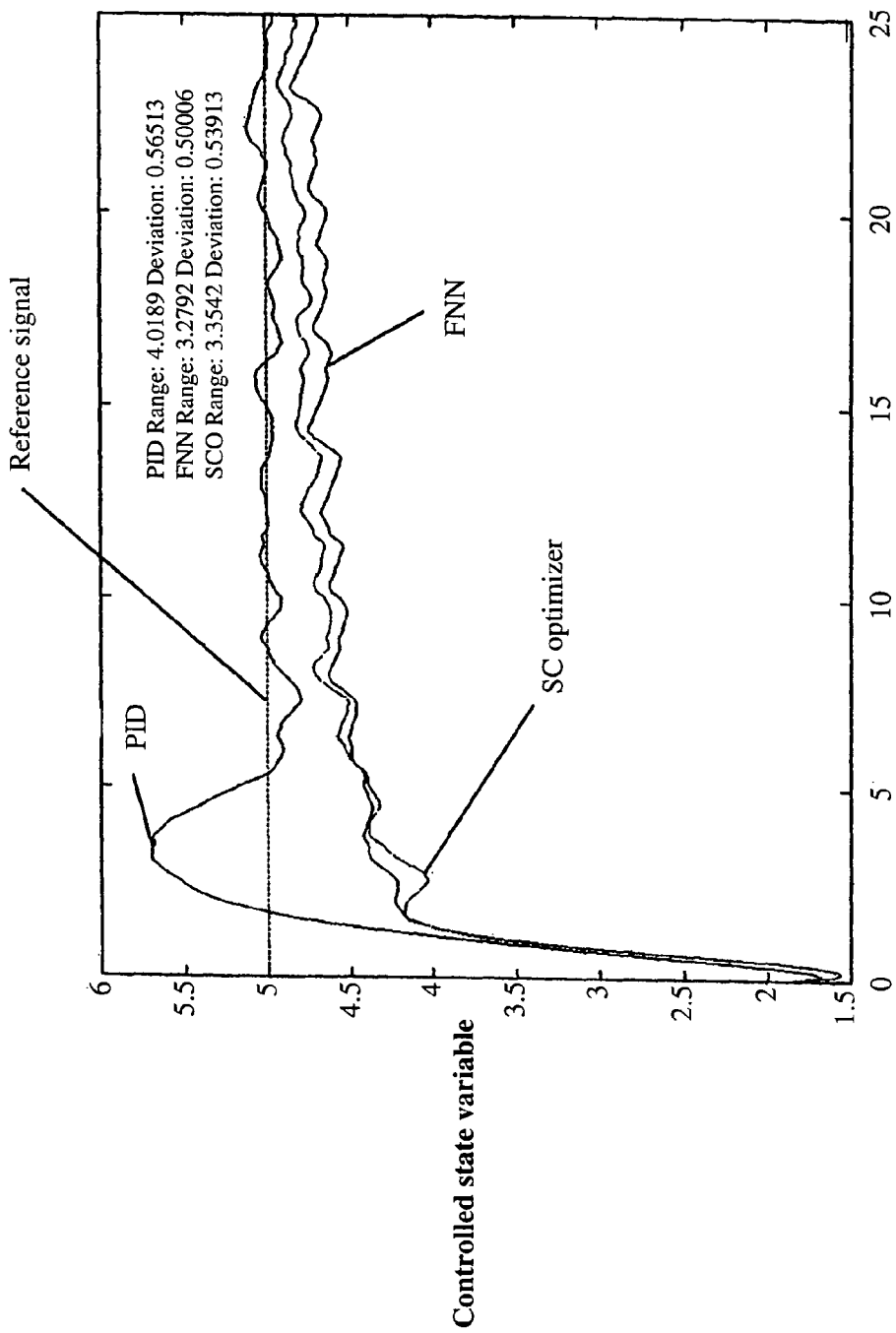
FIG. 43 shows the controlled state variable dynamics obtained with different controllers, simulation conditions are the same as was set for teaching signal acquisition.
Figure 44:
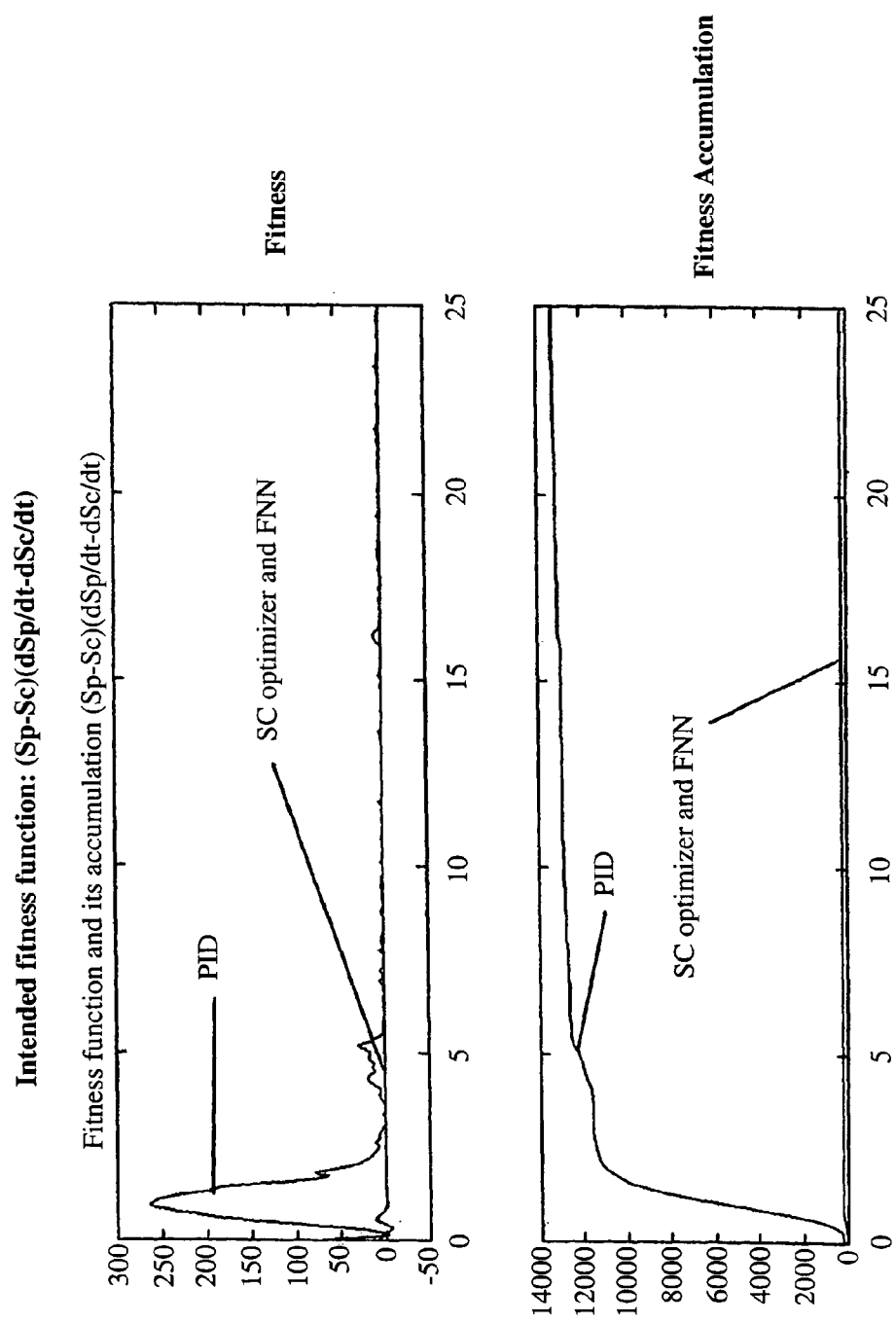
FIG. 44 shows the intended fitness function of the control obtained with different controllers, simulation conditions are the same as was set for teaching signal acquisition.
Figure 45:
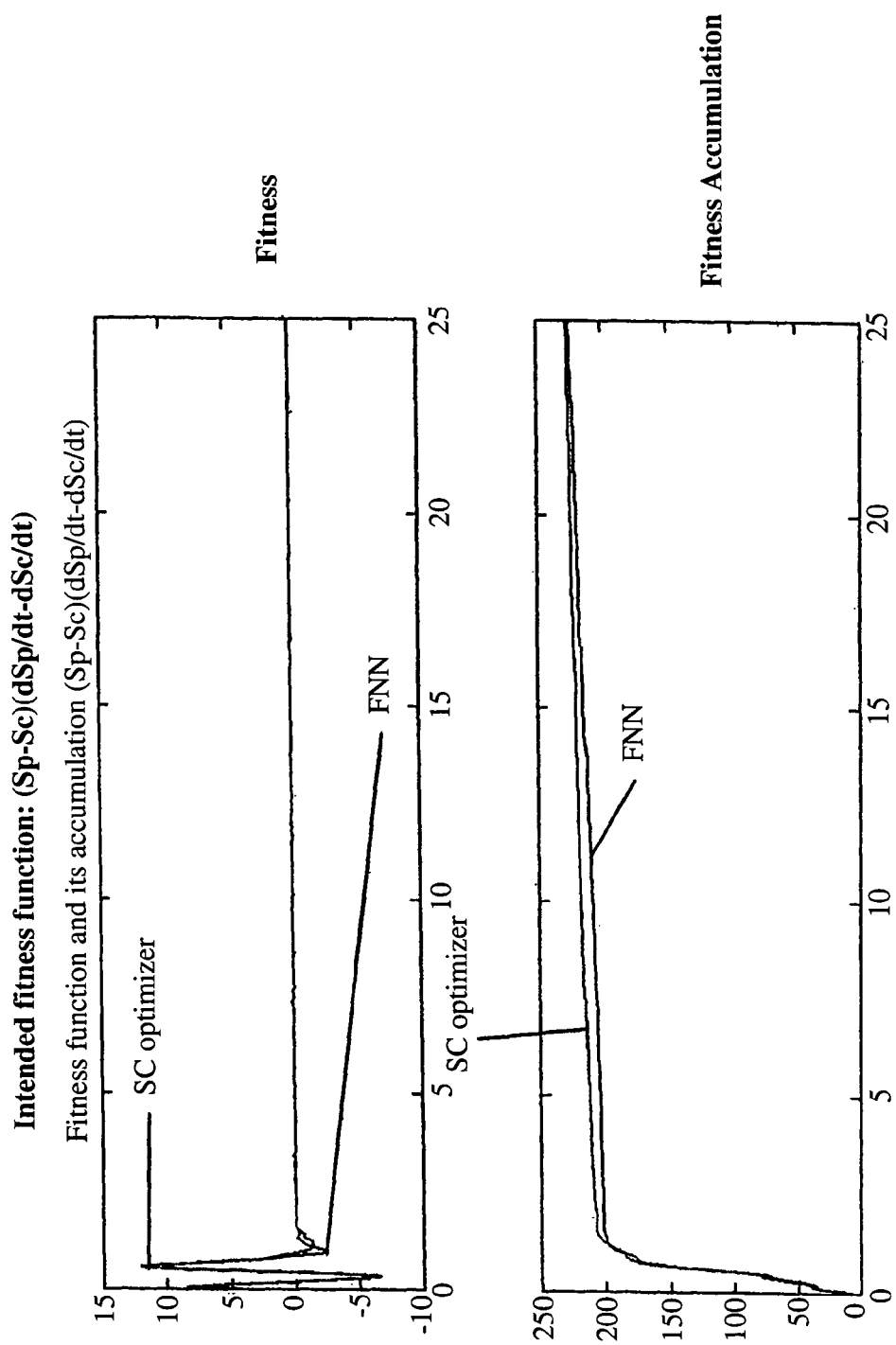
FIG. 45 shows the intended fitness function of the control obtained with different controllers, simulation conditions are the same as was set for teaching signal. Comparison only between FNN and SC optimizer based control.
Figure 46:
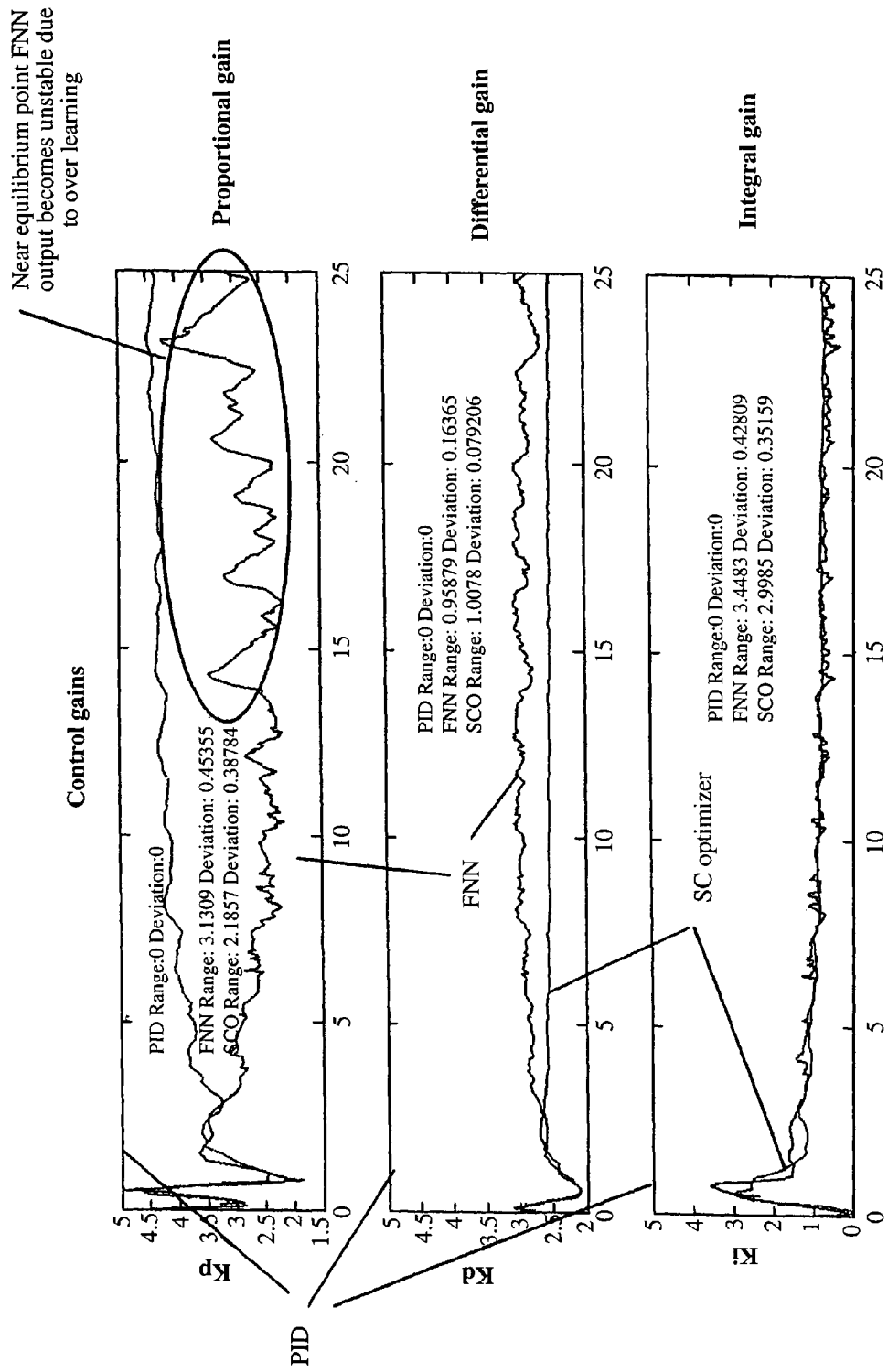
FIG. 46 shows the control gains obtained with different controllers, simulation conditions are the same as was set for teaching signal. P(I)D was set up to the constant gains [5 5 5].

FIG. 38 shows the swing system and its equations of motion. FIG. 39 shows the excitation as a band limited white noise. This excitation was used for the teaching signal acquisition. FIG. 40 shows the results of the approximation of the teaching signal for different values of the control error and for derivative of the control error. The "o" symbols in FIG. 40 demonstrate the teaching signal. The solid line is a result of the approximation of the signal with back propagation-based FNN. The thin line in FIG. 40 is the result of the approximation of the teaching signal with the SC optimizer 242. The results of the approximation can be summarized in the following Table 4:

TABLE 4

| Parameter | FNN | Scoptimizer |
|---|---|---|
| FIS type | Sugeno zero order | |
| Number of inputs | Two inputs: control error, derivative of control error | |
| Number of outputs | Three outputs: $K_P$, $K_D$, $K_I$ | |
| Number of membership functions for inputs | [8 × 8], Manual setting | [4 × 6], Numbers obtained automatically |
| Type of membership functions | Triangular | |
| Fuzzy And operator | Product | |
| Number of rules | 64 | 24 |
| Approximation error (Sufficient value for control quality is 0.1) | 0.01 (<0.1) | 0.05 (<0.1) |

FIGS. 41, 42, 43, 44, 45, 46 show the simulation results. The simulation results can be summarized as follows. Approximation error of the FNN is smaller than approximation error of the SC optimizer, but both values are sufficient. For the FNN, it is necessary to manually define number of membership functions for each input variable. The number of rules obtained with the FNN is greater than number of rules obtained with the SC optimizer. The stochastic excitation acting on the system in this case is the same as was used for the preparation of the teaching signal as well as a reference signal. The results are summarized in Table 5 below

TABLE 5

| | P(I)D | | FNN | | SCoptimizer | |
|---|---|---|---|---|---|---|
| | Range | Deviation | Range | Deviation | Range | Deviation |
| 'e' | 4.025 | 0.57 | 3.503 | 0.5 | 3.513 | 0.54 |
| 'de' | 6.972 | 0.61 | 7.743 | 0.56 | 7.834 | 0.55 |
| 'θ' | 2.136 | 0.42 | 2.091 | 0.38 | 2.093 | 0.37 |
| 'l' | 4.025 | 0.57 | 3.503 | 0.5 | 3.513 | 0.54 |
| 'i' | 8.026 | 0.63 | 8.534 | 0.58 | 8.620 | 0.57 |
| 'dSp' | 50.028 | 3.92 | 50.419 | 4.41 | 50.535 | 4.38 |
| 'Sp' | 25.453 | 3.34 | 29.829 | 2.8 | 23.253 | 2.81 |
| 'dSc' | 78.148 | 7.33 | 43.373 | 3.67 | 47.306 | 3.6 |
| 'Sc' | 53.396 | 7.04 | 29.899 | 2.44 | 21.075 | 2.42 |
| 'U' | 30.231 | 1.8 | 24.313 | 1.45 | 21.374 | 1.28 |
| 'Kp' | 0.000 | 0 | 2.993 | 0.45 | 2.251 | 0.39 |
| 'Kd' | 0.000 | 0 | 0.960 | 0.16 | 1.016 | 0.08 |
| 'Ki' | 0.000 | 0 | 3.628 | 0.43 | 3.052 | 0.35 |
| $(S_p - S_c)^* *(\dot{S}_p - \dot{S}_c)$ | 266.58 | 44.51 | 16.99 | 1.12 | 18.35 | 1.17 |

Figure 47:
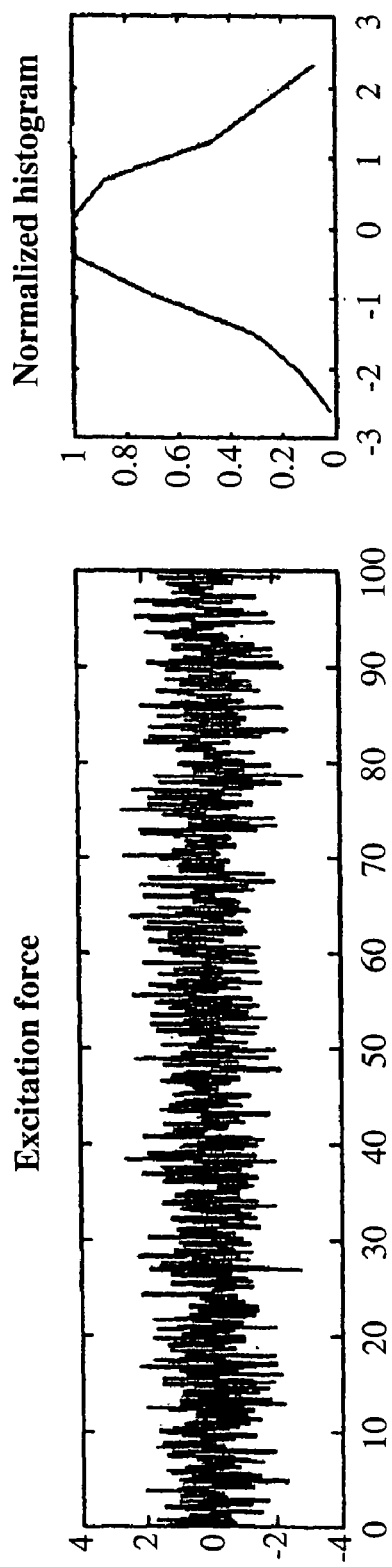
FIG. 47 shows the stochastic excitation used for check of the robustness of the obtained KB.

Both the FNN controller and the SC optimizer-based controller are better than the P(I)D controller. The FNN approximates the teaching signal with redundant accuracy, and, as a result, better performance with the same conditions as used for teaching signal acquisition, but control signals are unstable near equilibrium points. The SC optimizer control has better performance with respect to entropy production, and control gains have simpler physical realization. The output of the SC optimizer-based controller is stable near equilibrium points. The KB prepared with the SC optimizer uses 24 rules, and has almost the same performance (according to the selected fitness function) as the FNN based FC with 64 rules For analysis of the robustness of the simulated FC, the simulations were repeated with a new excitation signal, having longer duration, and different trajectory using the same distribution as was used for the teaching signal acquisition. The excitation used in this case is shown in FIG. 47.

Figure 48:
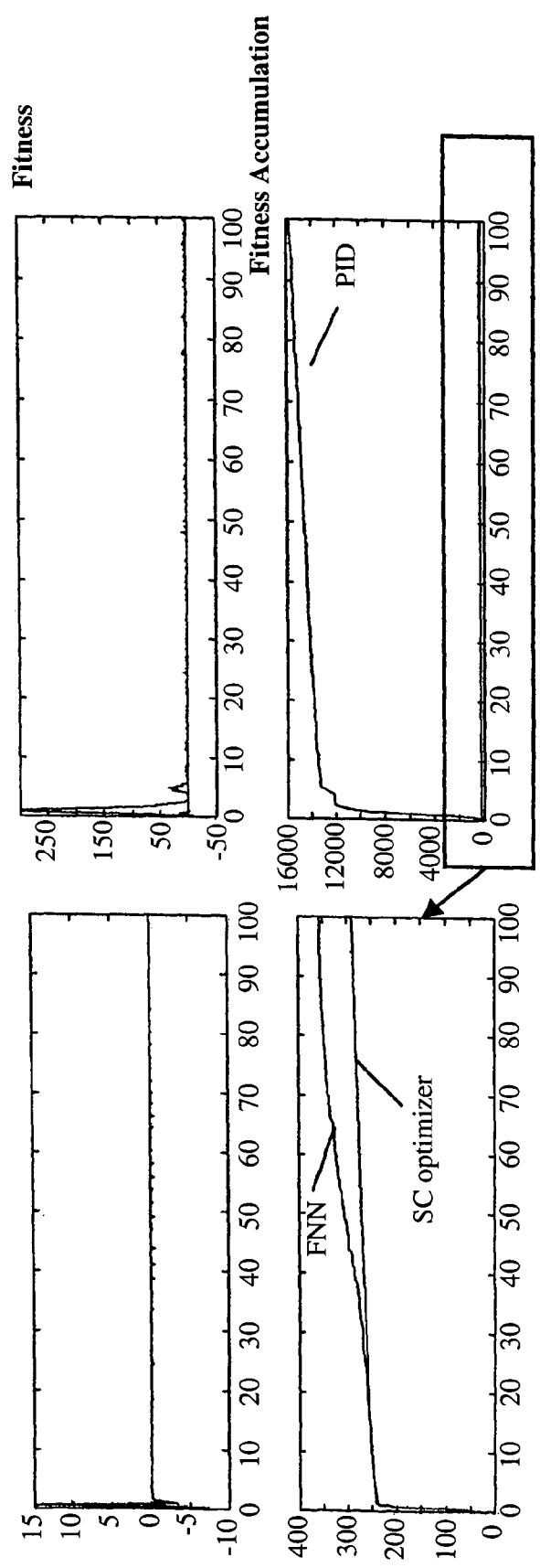
FIG. 48 shows the different realization of the stochastic excitation from the same distribution as for teaching signal.
Figure 49:
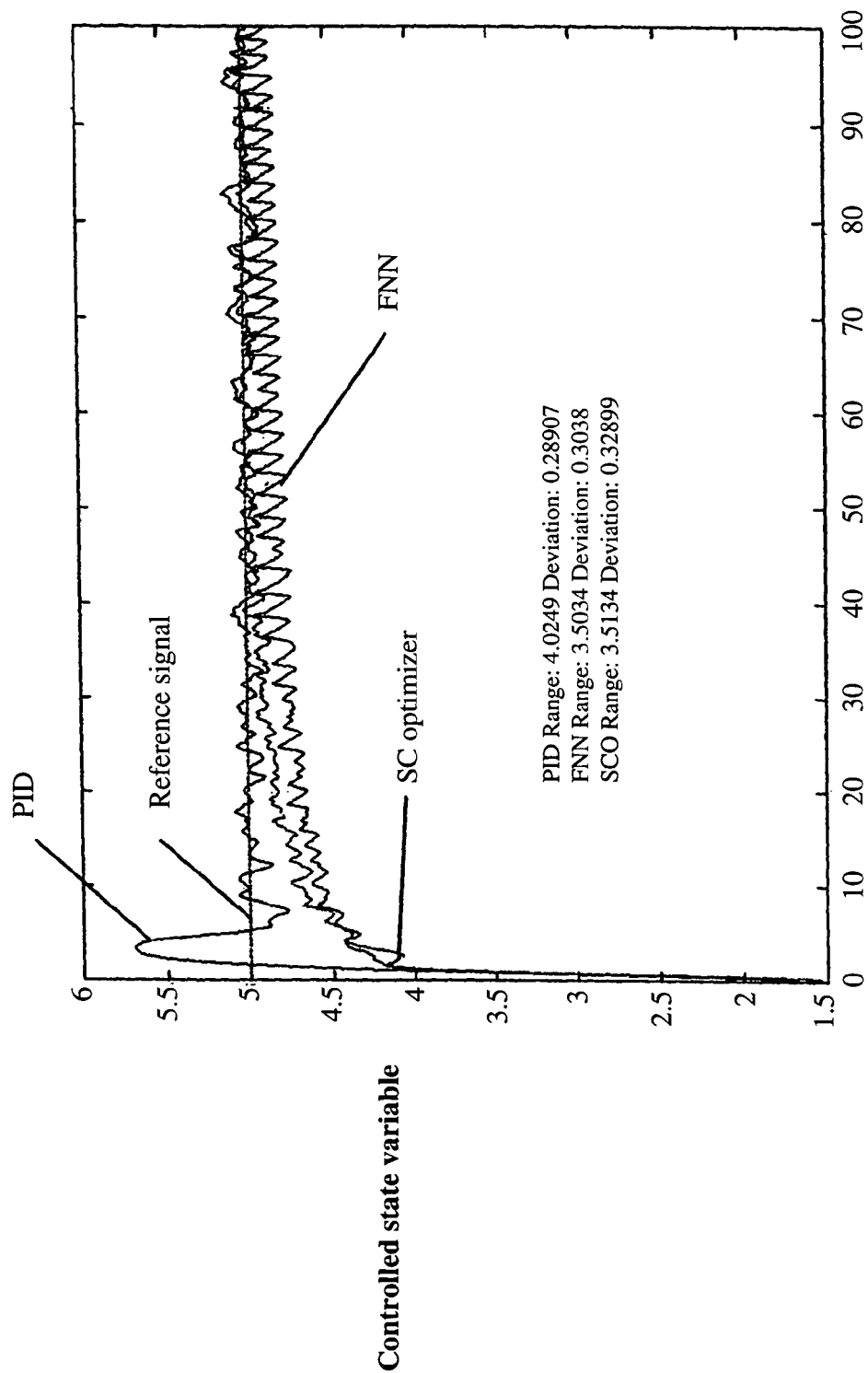
FIG. 49 shows the controlled variable for a new excitation signal.
Figure 50:
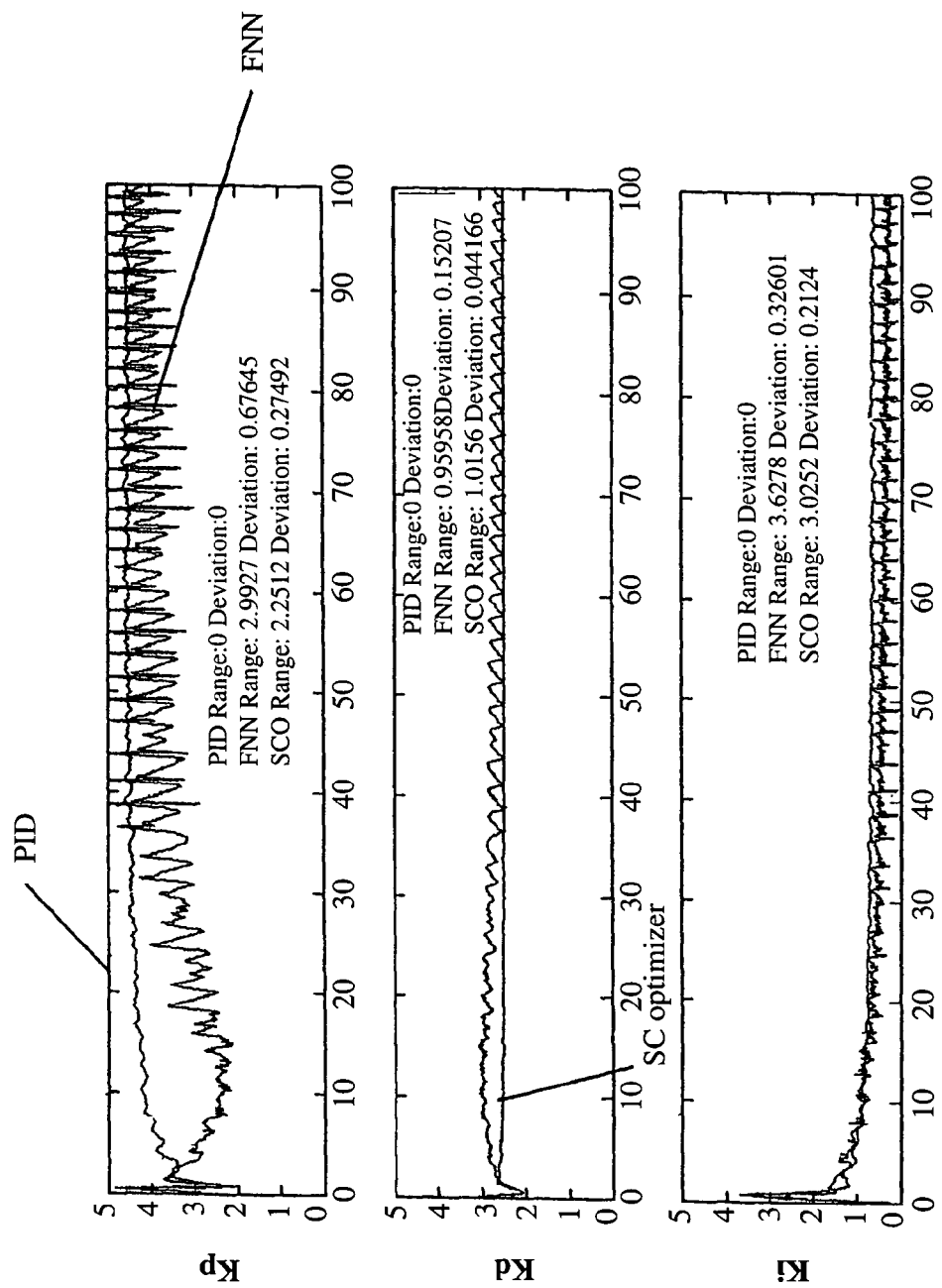
FIG. 50 shows the coefficient gains for the new excitation signal.

The results of the intended fitness function are shown in FIG. 48. FIG. 48 shows that the fitness function performance of the SC optimizer is better than the fitness function performance of the FNN-based approach. FIG. 49 shows the controlled state variable dynamics. The Output of the SC optimizer in this case has a smaller deviation from the set point. Figure SW 13 shows the coefficient gain scheduler dynamics. The behavior of the coefficient gains obtained with the SC optimizer shows smaller deviation, especially around equilibrium points. Controller output is stable in case of SC optimizer control. The other control parameters are summarized in the following Table 6:

TABLE 6

|  | P(I)D | | FNN | | SCoptimizer | |
| --- | --- | --- | --- | --- | --- | --- |
|  | Range | Deviation | Range | Deviation | Range | Deviation |
| 'e' | 4.65 | 0.44 | 4.76 | 0.5 | 4.83 | 0.5 |
| 'de' | 12.13 | 1.64 | 13.73 | 2.15 | 13.82 | 2.14 |
| 'θ' | 3.01 | 0.46 | 2.58 | 0.39 | 2.58 | 0.36 |
| 'l' | 8.78 | 2.87 | 8.61 | 2.81 | 8.59 | 2.77 |
| 'i' | 9.68 | 1.43 | 8.38 | 1.37 | 8.44 | 1.23 |
| 'dSp' | 293.81 | 11.16 | 81.55 | 5.14 | 68.97 | 4.19 |
| 'Sp' | 410.96 | 111.83 | 380.81 | 105.09 | 307.81 | 84.96 |
| 'dSc' | 269.01 | 12.54 | 146.54 | 9 | 142.06 | 8.38 |
| 'Sc' | 1346.37 | 370.21 | 1103.19 | 310.01 | 1046.69 | 293.11 |
| 'U' | 65.32 | 8.92 | 40.61 | 8.89 | 42.37 | 7.77 |
| 'Kp' | 0.00 | 0 | 4.64 | 0.86 | 2.74 | 0.48 |
| 'Kd' | 0.00 | 0 | 0.99 | 0.16 | 1.07 | 0.12 |
| 'Ki' | 0.00 | 0 | 3.65 | 0.7 | 3.74 | 0.42 |
| $(S_p - S_c)^* *(\dot{S}_p - \dot{S}_c)$ | 124838.92 | 6974.98 | 33307.25 | 4022.85 | 24103.82 | 3709.82 |

Table 6 shows that both the FNN controller and the SC optimizer-based controller are better than the P(I)D controller regarding fitness function performance. Due to over learning, the FNN controller becomes unstable with unknown excitation, and asymptotically looses control under the intended fitness function. The SC optimizer control works better under unknown conditions, thus the FC prepared with a KB produced by the SC optimizer 242 is more robust regarding variations of the excitation signal from the same distribution.

In the following example in addition to unknown excitation, a new reference signal in introduced as a harmonic signal obtained by the following equation:

$$Rs(t) = 5 + 4\sin\left(\frac{2\pi}{50}t\right) + 0.5\sin(2\pi t) \quad (41)$$

Figure 51:
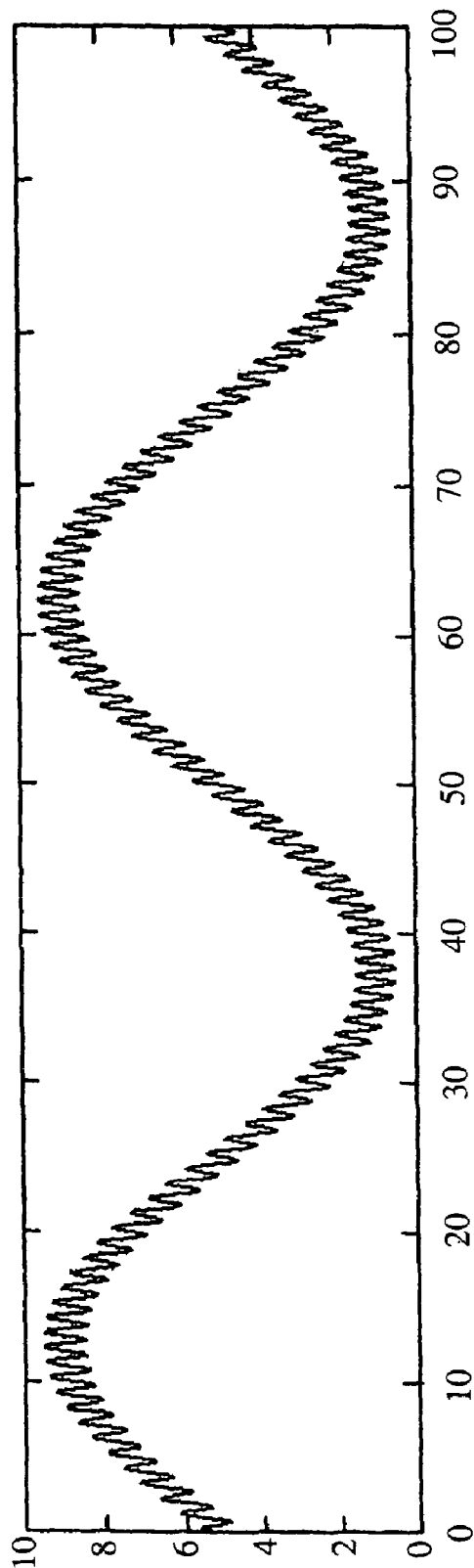
FIG. 51 shows the different reference signal.
Figure 52:
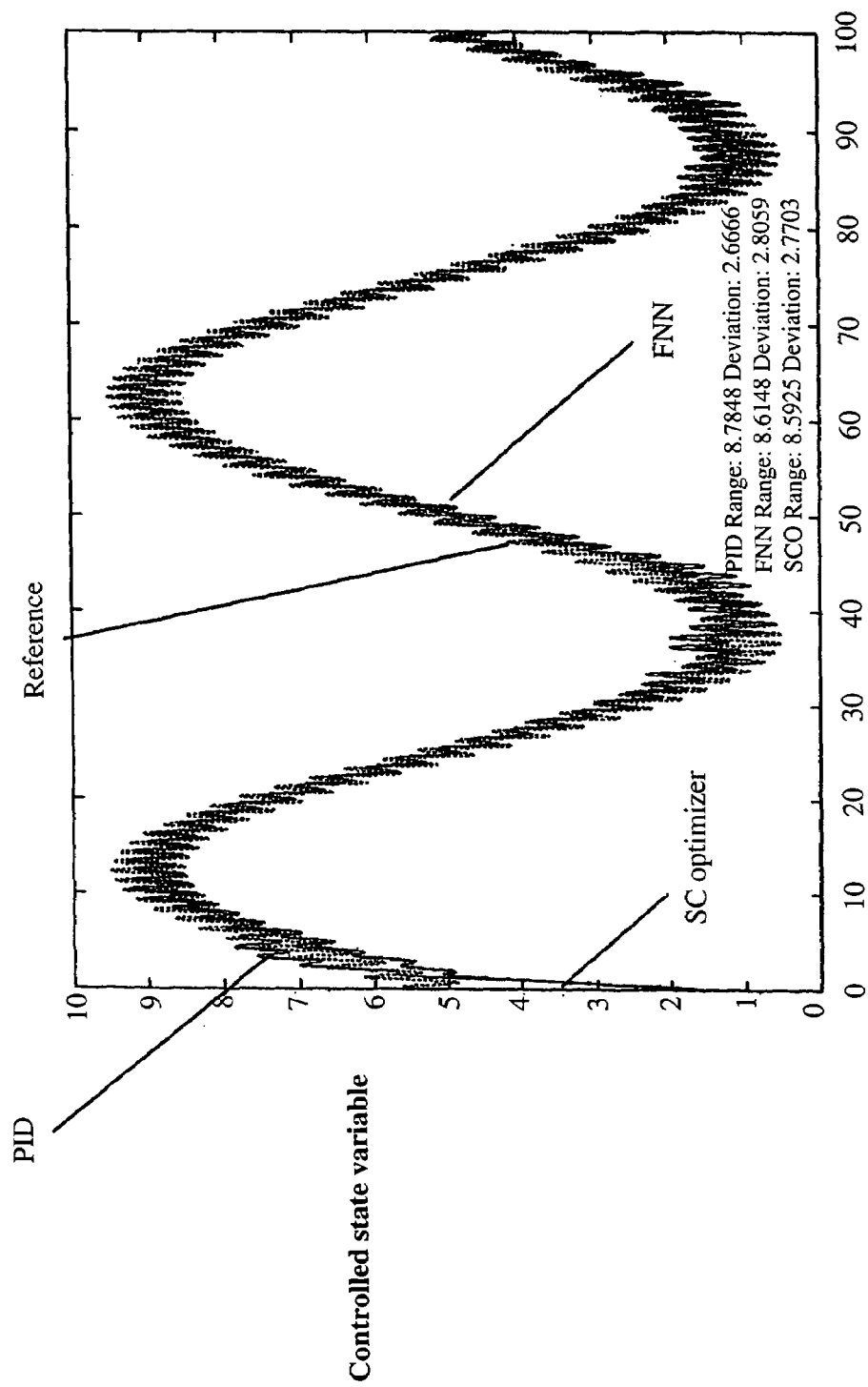
FIG. 52 shows the simulation results.
Figure 53:
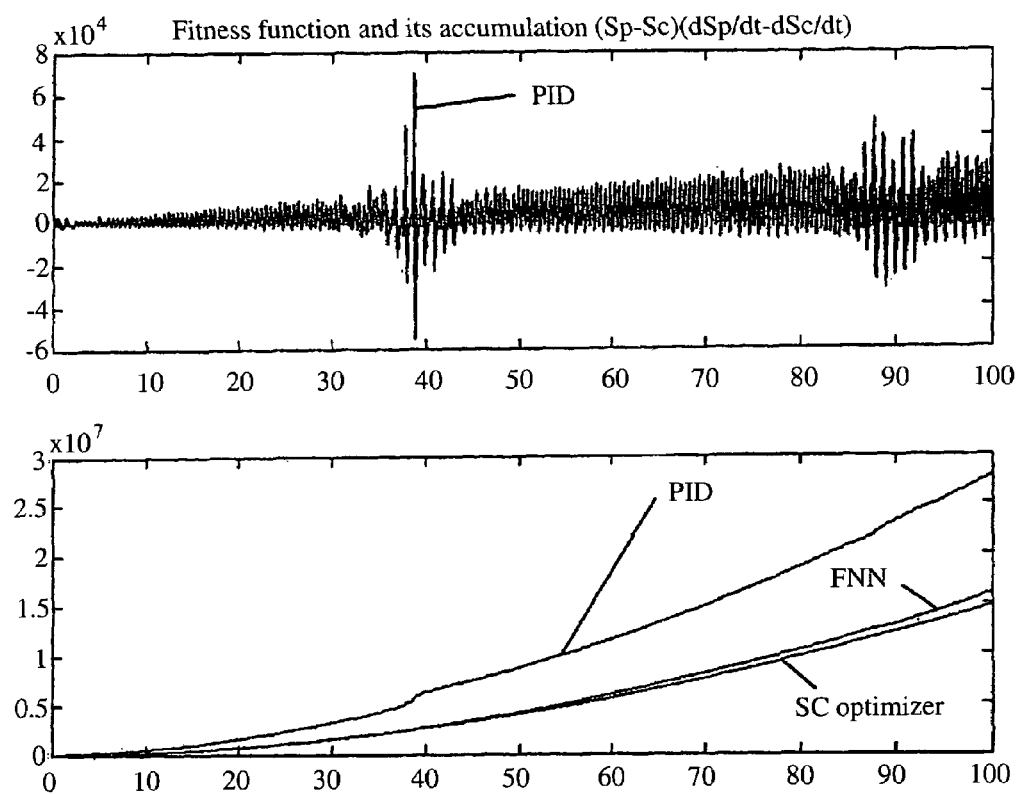
FIG. 53 shows the fitness functions.
Figure 54:
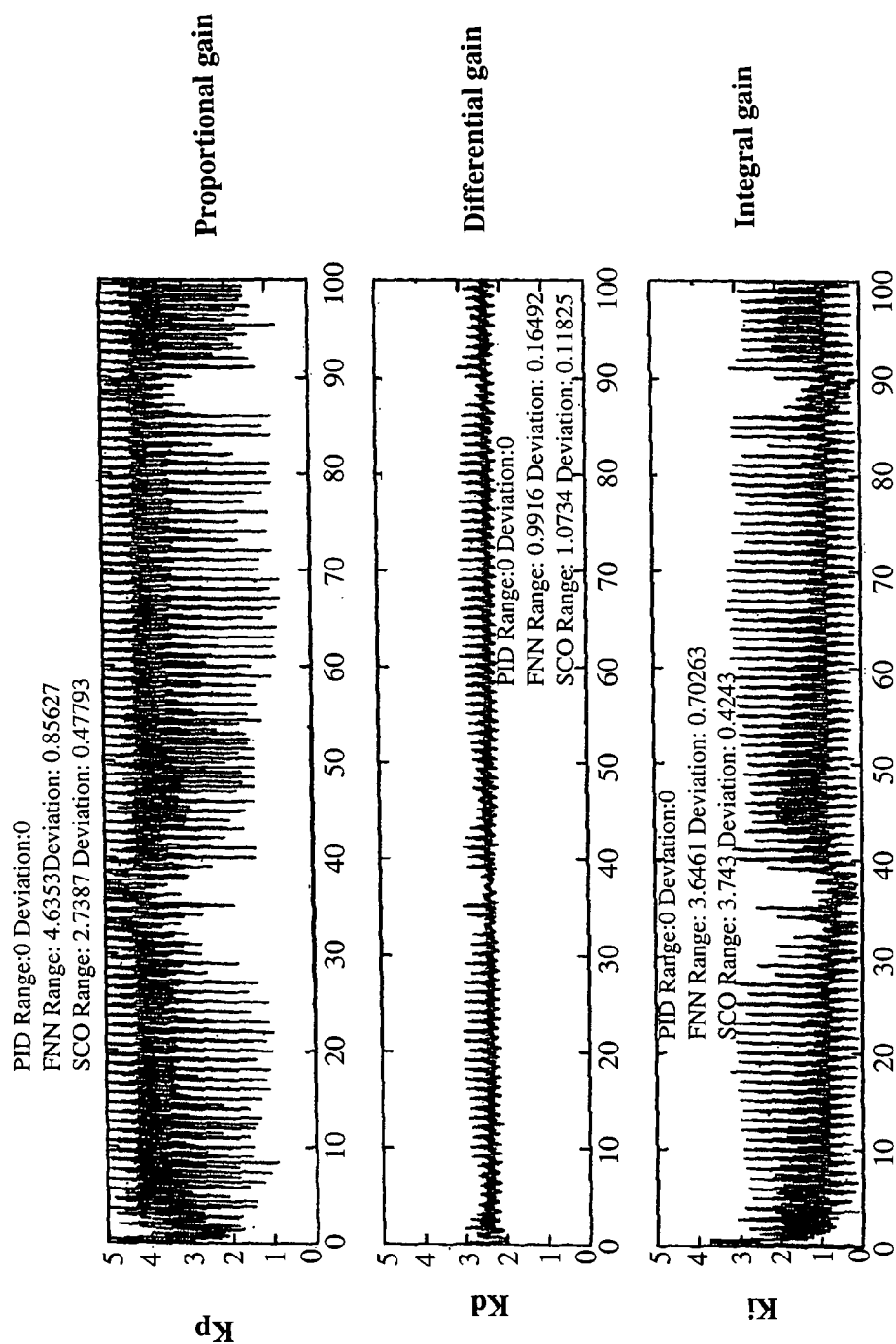
FIG. 54 shows the coefficient gains.
Figure 55:
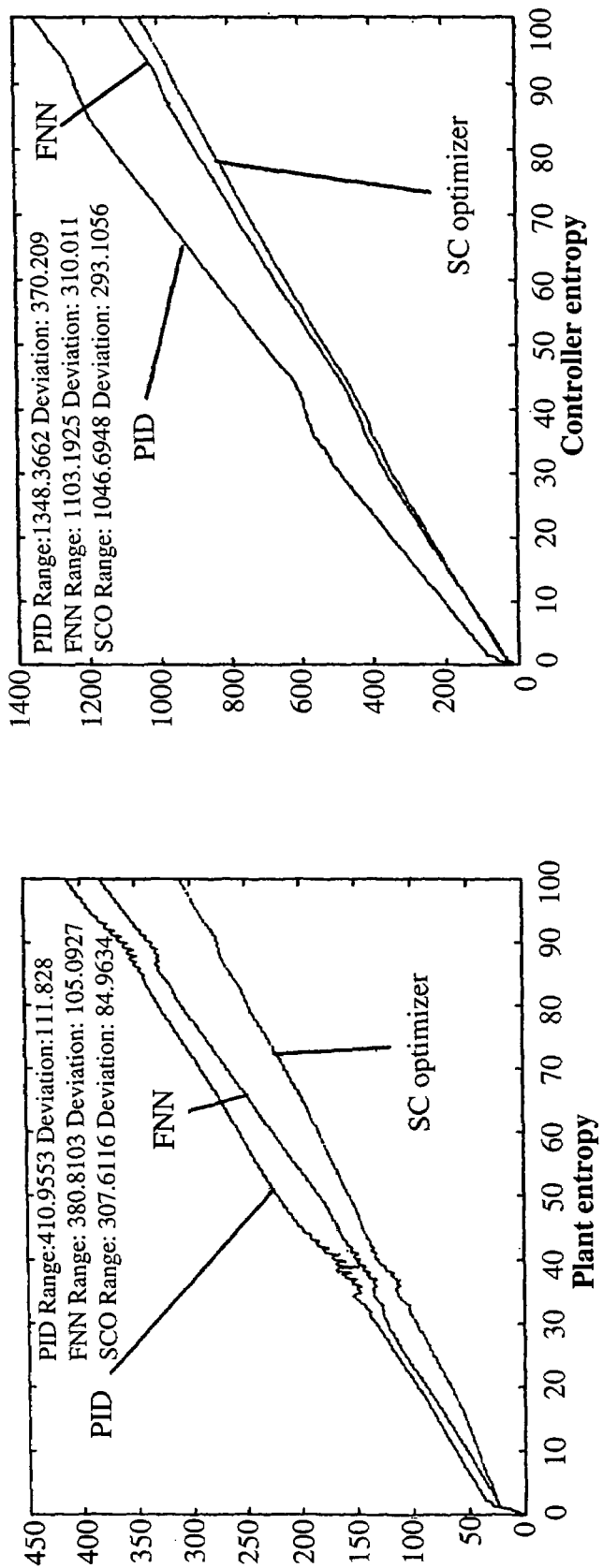
FIG. 55 shows the plant and controller entropy.
Figure 56:
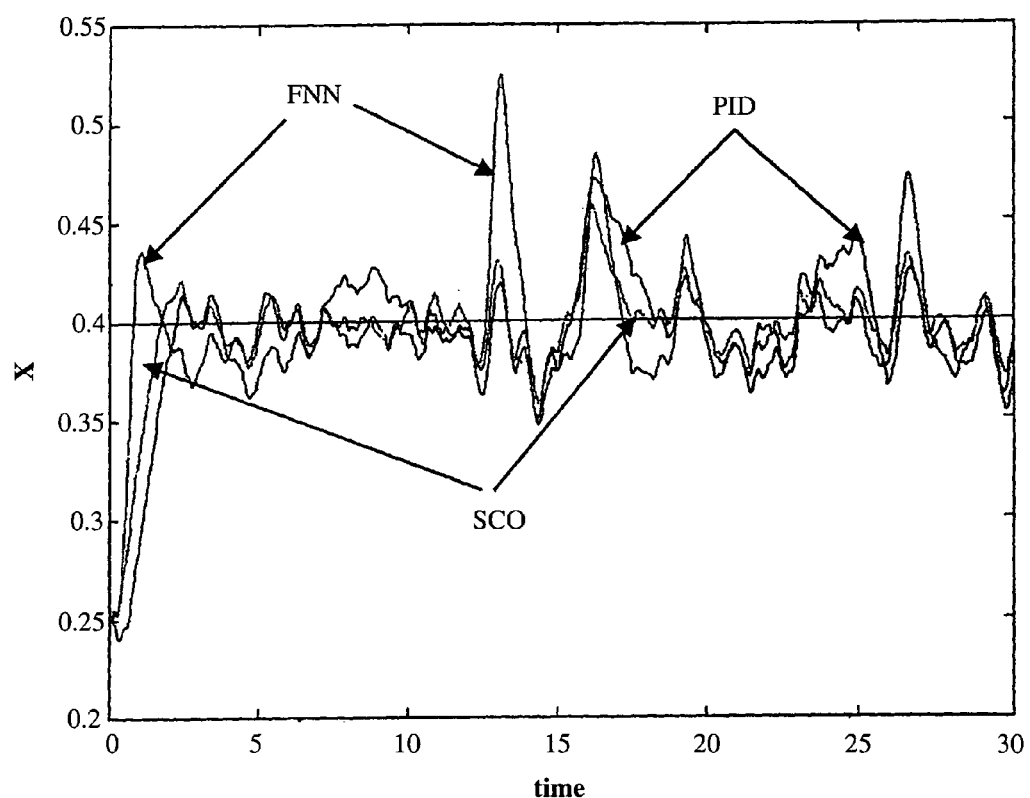
FIG. 56 shows swing motion under fuzzy control with two P(I)D controllers. Motion along Theta-axis under Gaussian stochastic excitation Comparison of P(I)D,FNN and SCO control.
Figure 57:
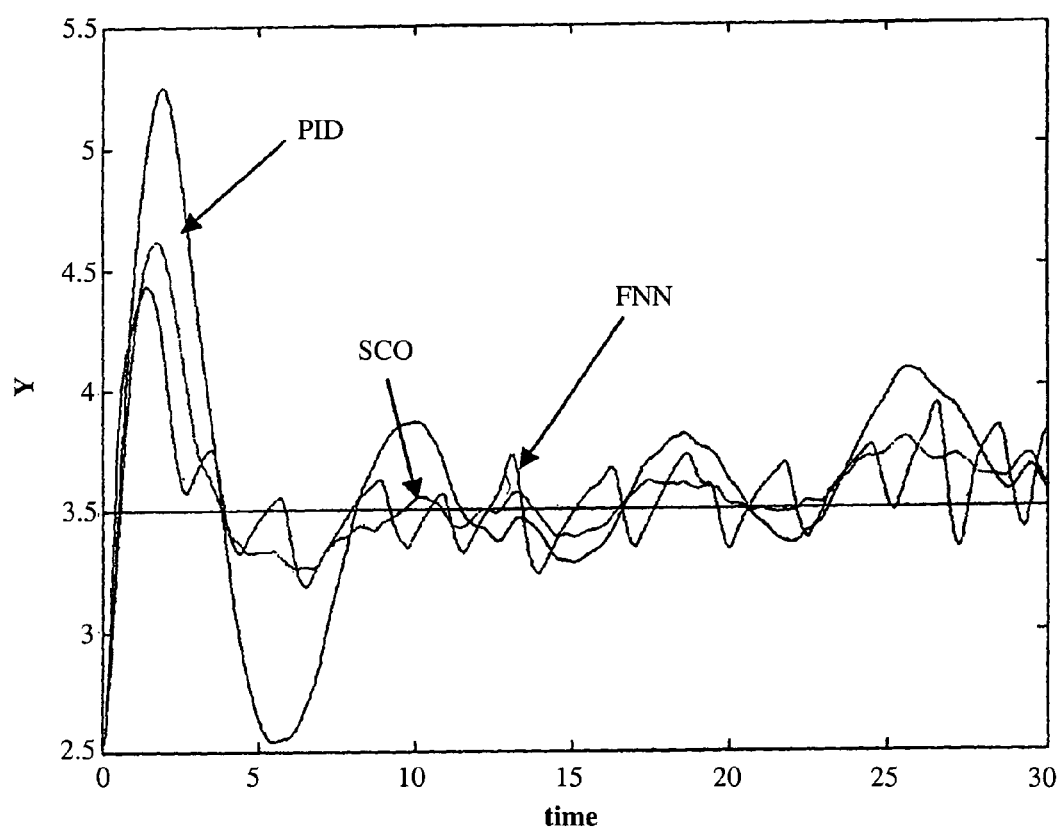
FIG. 57 shows Swing motion under fuzzy control with two P(I)D controllers. Motion along L-axis under non-Gaussian (Rayleigh) stochastic excitation Comparison of P(I)D, FNN and SCO control.
Figure 58:
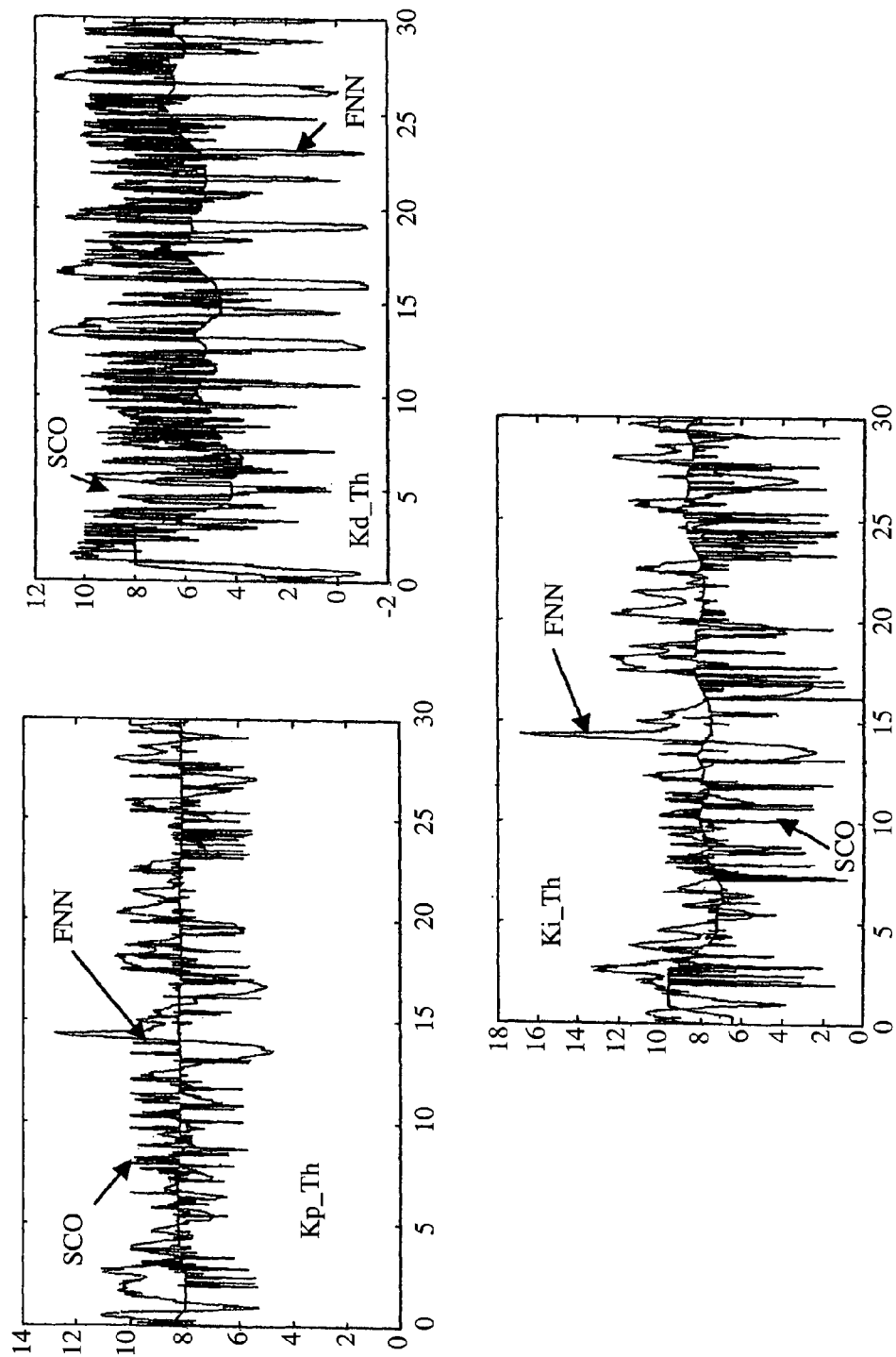
FIG. 58 shows Swing motion under fuzzy control with two P(I)D controllers, Motion along Theta-axis under Gaussian stochastic excitation SCO and FNN Control law comparison, control along Theta-axis.
Figure 59:
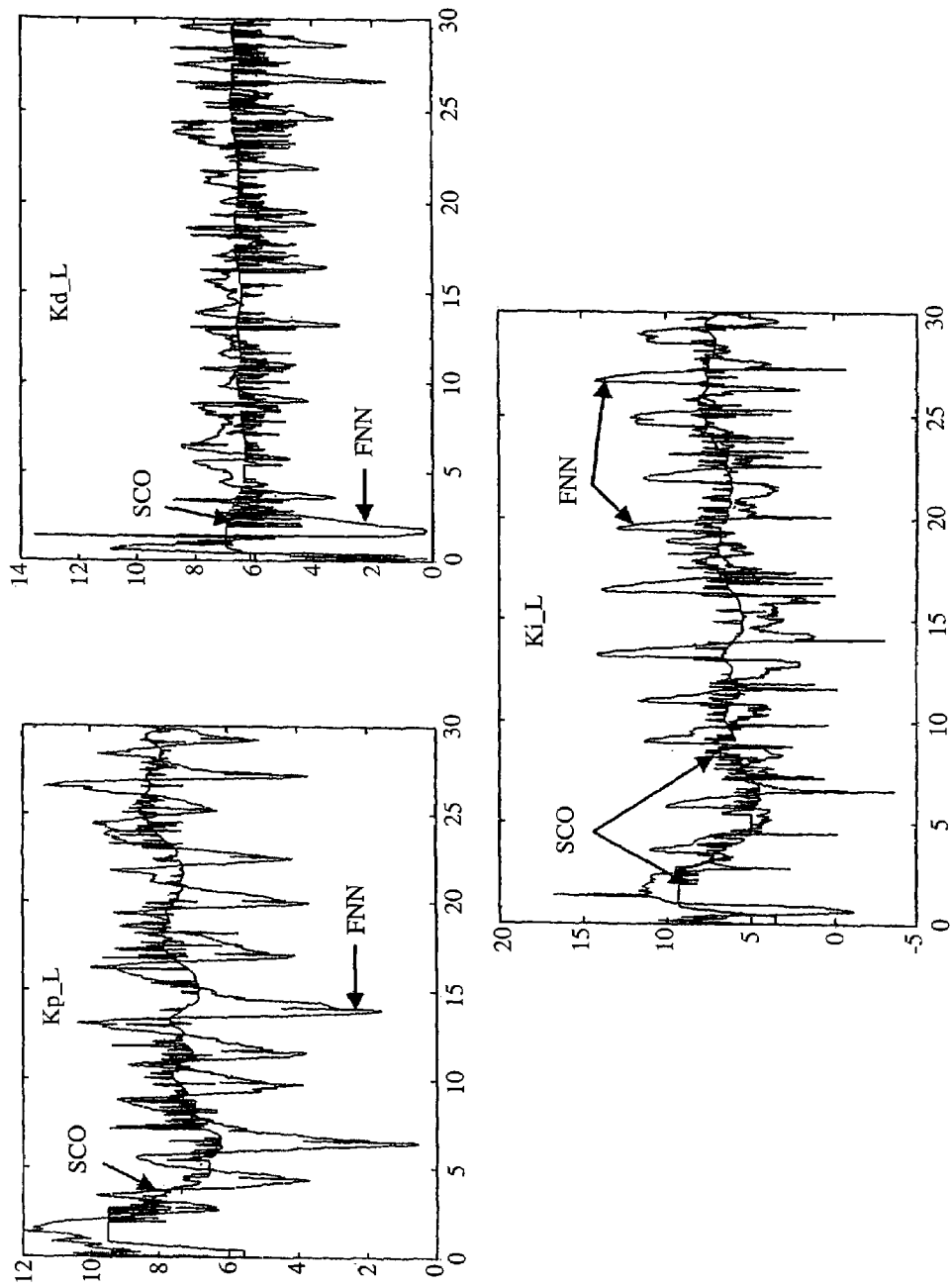
FIG. 59 shows Swing motion under fuzzy control with two P(I)D controllers, Motion along Length-axis under Gaussian stochastic excitation SCO and FNN Control law comparison, Control along Length-axis.
Figure 60:
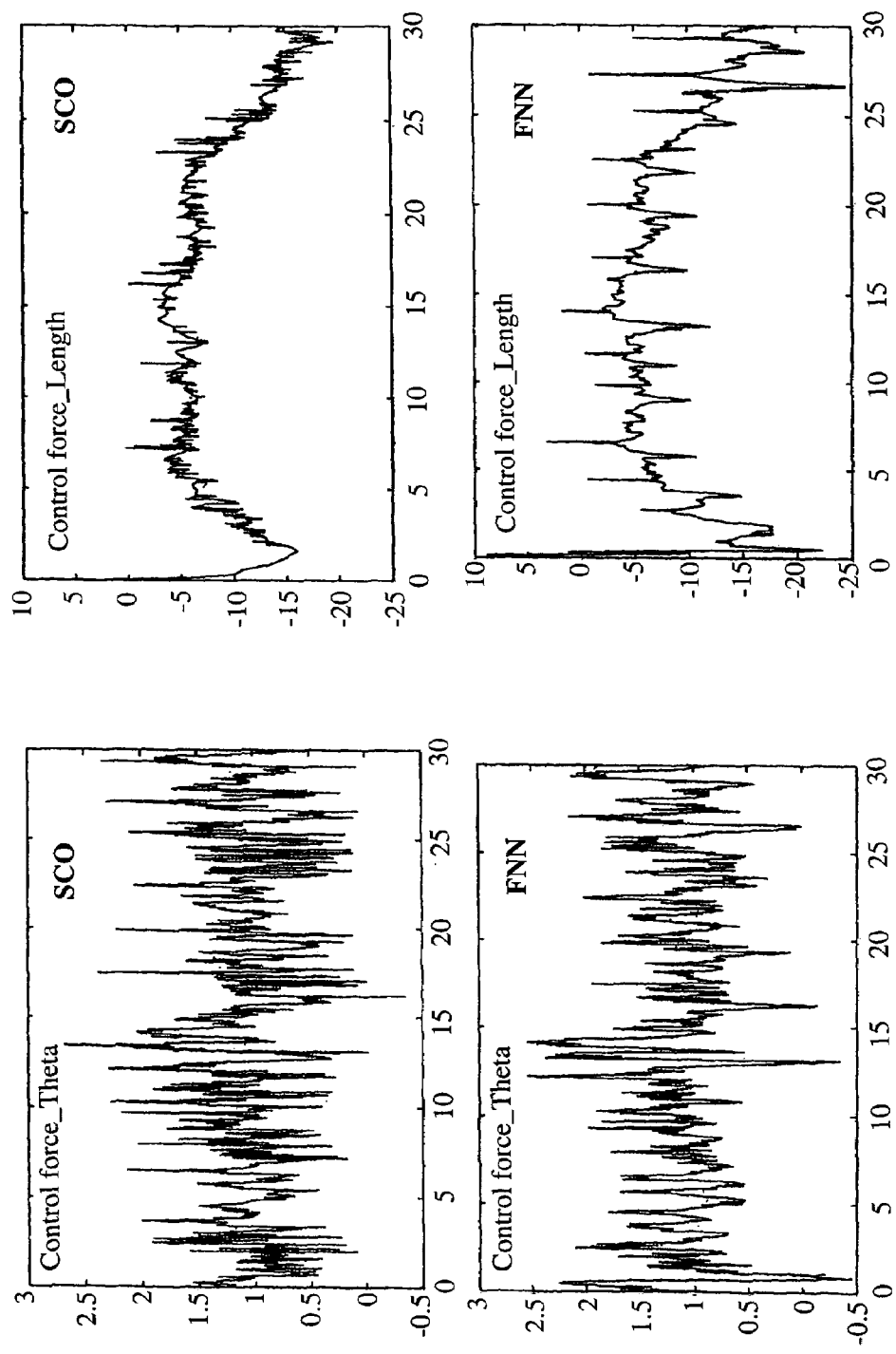
FIG. 60 shows Swing motion under fuzzy control with two P(I)D controllers. SCO and FNN Control force (Theta-axis and Length-axis) comparison.

The reference signal according to Equation (41) is shown in the FIG. 51. Control results using the reference signal of FIG. 51 are shown in FIGS. 52–18 and summarized in Table 7.

TABLE 7

|  | P(I)D | | FNN | | SCoptimizer | |
| --- | --- | --- | --- | --- | --- | --- |
|  | Range | Deviation | Range | Deviation | Range | Deviation |
| 'e' | 4.65 | 0.44 | 4.76 | 0.5 | 4.83 | 0.5 |
| 'de' | 12.13 | 1.64 | 13.73 | 2.15 | 13.82 | 2.14 |
| 'θ' | 3.01 | 0.46 | 2.58 | 0.39 | 2.58 | 0.36 |
| 'l' | 8.78 | 2.87 | 8.61 | 2.81 | 8.59 | 2.77 |
| 'i' | 9.68 | 1.43 | 8.38 | 1.37 | 8.44 | 1.23 |
| 'dSp' | 293.81 | 11.16 | 81.55 | 5.14 | 68.97 | 4.19 |
| 'Sp' | 410.96 | 111.83 | 380.81 | 105.09 | 307.81 | 84.96 |
| 'dSc' | 269.01 | 12.54 | 146.54 | 9 | 142.06 | 8.38 |
| 'Sc' | 1346.37 | 370.21 | 1103.19 | 310.01 | 1046.69 | 293.11 |
| 'U' | 65.32 | 8.92 | 40.61 | 8.89 | 42.37 | 7.77 |
| 'Kp' | 0.00 | 0 | 4.64 | 0.86 | 2.74 | 0.48 |
| 'Kd' | 0.00 | 0 | 0.99 | 0.16 | 1.07 | 0.12 |
| 'Ki' | 0.00 | 0 | 3.65 | 0.7 | 3.74 | 0.42 |
| $(S_p - S_c)^* *(\dot{S}_p - \dot{S}_c)$ | 124838.92 | 6974.98 | 33307.25 | 4022.85 | 24103.82 | 3709.82 |

Table 7 shows that the FC prepared with a KB generated by the SC optimizer 242 is more robust in the presence of reference signal variation. Thus, the SC optimizer creates a robust KB for FC and reduces the number of rules in comparison with a KB created with other approaches. The KB created by the SC optimizer 242 automatically has a relatively more optimal number of rules based. The KB created by the SC optimizer 242 tends to be smaller and thus more computationally efficient. The KB created by the SC optimizer tends to be more robust for excitation signal variation as well as for reference signal variation.

Swing dynamic system simulation results, Motion under fuzzy control with two P(I)D Controllers. Comparison between back propagation FNN and SC optimizer control results In one embodiment two state variables (the angle θ and the length l) are controlled, and two types of stochastic excitations are used.

Gaussian excitation (a white noise) is acting along θ-axis, and non-Gaussian (Rayleigh) excitation is acting along l-axis. Initial conditions: $\theta_0=0.25$, $l_0=2.5$, $\dot{\theta}_0=0$, $\dot{l}_0=0.01$, and reference signals: θ=0.4; l=3.5. In this example we see Sugeno 0 FIS with four inputs and six outputs variables. Input variables are: control error, derivative of control error for two P(I)D Controllers (along θ and l-axes). Output variables are control gains for P(I)D θ and P(I)D l correspondingly. For fuzzy simulation in this case we have chosen fitness function which minimizes a control error.

Tables 43, 44 and FIGS. 56, 57, 58, 59 and 60 show the simulation results.

Table 8 shows dynamic and thermodynamic characteristics of swing motion along θ-axis.

TABLE 8

| | P(I)D | | FNN | | SCoptimizer | |
|---|---|---|---|---|---|---|
| | Range | Deviation | Range | Deviation | Range | Deviation |
| 'e' | 0.2311 | 0.0368 | 0.2744 | 0.0330 | 0.2082 | 0.0271 |
| 'de' | 0.3401 | 0.0615 | 0.6906 | 0.0924 | 0.3580 | 0.0576 |
| 'θ' | 0.2311 | 0.0368 | 0.2744 | 0.0330 | 0.2082 | 0.0271 |
| '$\dot{\theta}$' | 0.3464 | 0.0619 | 0.6919 | 0.0924 | 0.3592 | 0.0577 |
| 'dSp' | 0.0272 | 0.0019 | 0.1353 | 0.0101 | 0.0361 | 0.0024 |
| 'Sp' | 0.0093 | 0.0012 | 0.0444 | 0.0049 | 0.0114 | 0.0015 |
| 'dSc' | 0.1593 | 0.0258 | 0.7304 | 0.0733 | 0.2297 | 0.0294 |
| 'Sc' | 0.5705 | 0.1558 | 0.9173 | 0.2805 | 0.6036 | 0.1582 |
| 'U' | 1.8772 | 0.3107 | 3.0092 | 0.4544 | 3.0419 | 0.4139 |
| 'Kp' | 0 | 0 | 12.7595 | 1.3437 | 4.7755 | 0.6805 |
| 'Kd' | 0 | 0 | 12.7159 | 3.2428 | 7.0913 | 1.6870 |
| 'Ki' | 0 | 0 | 16.8095 | 2.2770 | 9.9998 | 1.5148 |
| $(S_p - S_c)^* *(\dot{S}_p - \dot{S}_c)$ | 0.0707 | 0.0087 | 0.3402 | 0.0320 | 0.0799 | 0.0091 |

Table 9 shows dynamic and thermodynamic characteristics of swing motion along l-axis.

TABLE 9

| | P(I)D | | FNN_P(I)D | | SCoptimizer | |
|---|---|---|---|---|---|---|
| | Range | Deviation | Range | Deviation | Range | Deviation |
| 'e' | 2.7487 | 0.5118 | 1.9356 | 0.2385 | 2.1212 | 0.2694 |
| 'de' | 3.5462 | 0.5347 | 5.1765 | 0.5602 | 2.9937 | 0.3848 |
| 'l' | 2.7487 | 0.5118 | 1.9356 | 0.2385 | 2.1212 | 0.2694 |
| '$\dot{l}$' | 3.5471 | 0.5349 | 5.1770 | 0.5602 | 2.9938 | 0.3848 |
| 'dSp' | 11.6337 | 1.6373 | 27.5628 | 2.3988 | 9.0148 | 1.2071 |
| 'Sp' | 17.222 | 2.8356 | 18.9126 | 2.6774 | 8.9580 | 1.1389 |
| 'dSc' | 29.0804 | 4.0928 | 59.0850 | 4.6245 | 27.8549 | 3.8679 |
| 'Sc' | 43.0811 | 7.0611 | 42.0118 | 6.6106 | 28.8407 | 3.6452 |
| 'U' | 22.6100 | 4.1190 | 33.4908 | 4.5510 | 25.2402 | 4.0567 |
| 'Kp' | 0 | 0 | 11.9993 | 2.0805 | 4.4347 | 0.7776 |
| 'Kd' | 0 | 0 | 13.5328 | 1.6818 | 3.8774 | 0.4960 |
| 'Ki' | 0 | 0 | 20.3707 | 3.1219 | 9.8635 | 1.2870 |
| $(S_p - S_c)^* *(\dot{S}_p - \dot{S}_c)$ | 119.9456 | 22.1278 | 213.0406 | 18.1487 | 157.4477 | 22.3259 |

Figure 61:
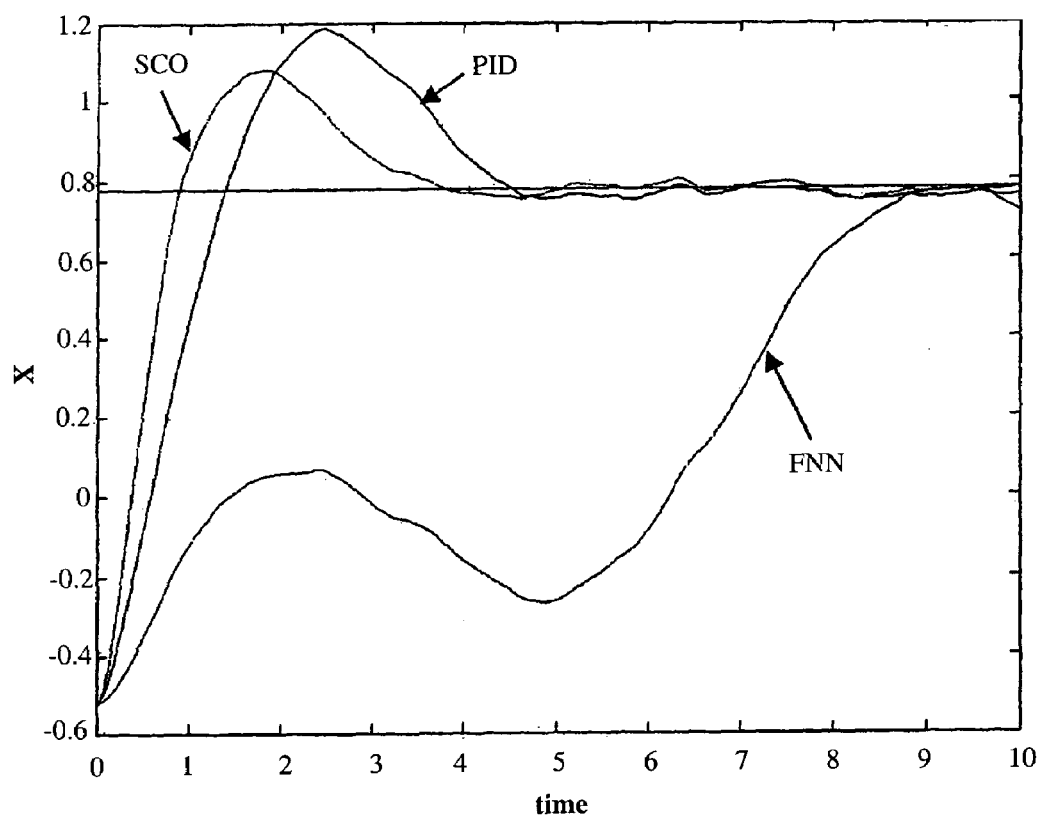
FIG. 61 shows Swing motion under fuzzy control with two P(I)D controllers, investigation of robustness, Motion along Theta-axis under Gaussian stochastic excitation, comparison of P(I)D, FNN and SCO control.
Figure 62:
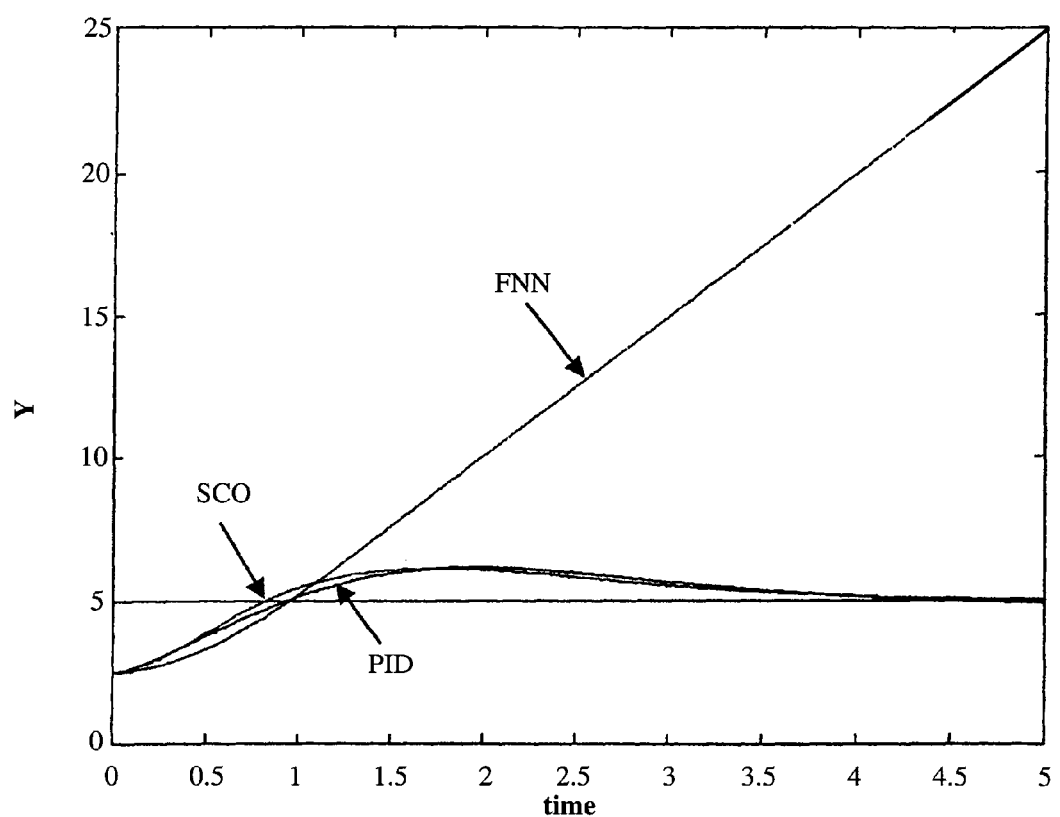
FIG. 62 shows swing motion under fuzzy control with two P(I)D controllers, investigation of robustness, motion along Length-axis under non-Gaussian (Rayleigh) stochastic excitation, comparison of P(I)D, FNN and SCO control.

In Tables 10 and 11 and in FIGS. 61, 62 results of robustness investigations are shown using the FC with the same KB (obtained from the teaching signal for the given above initial conditions) in the new situation, where new initial conditions, new reference signals, new noises amplitudes and new time of simulation are considered.

TABLE 10

| | P(I)D | | FNN | | SCoptimizer | |
|---|---|---|---|---|---|---|
| | Range | Deviation | Range | Deviation | Range | Deviation |
| 'e' | 1.7058 | 0.0770 | — | — | 1.6025 | 0.0599 |
| 'de' | 1.4721 | 0.1053 | — | — | — | 0.1179 |
| 'θ' | 1.7058 | 0.0770 | — | — | 1.6025 | 0.0599 |
| '$\dot{\theta}$' | 1.4775 | 0.1053 | — | — | 2.1911 | 0.1179 |
| 'dSp' | 2.3699 | 0.1136 | — | — | 7.8942 | 0.3266 |
| 'Sp' | 1.6819 | 0.0764 | — | — | 3.8596 | 0.1592 |
| 'dSc' | 6.5034 | 0.4078 | — | — | 10.4666 | 0.5201 |
| 'Sc' | 11.1231 | 1.1647 | — | — | 11.1151 | 1.0726 |
| 'U' | 6.0736 | 0.3156 | — | — | 11.8522 | 0.5232 |
| 'Kp' | 0 | 0 | — | — | 8.4882 | 0.7814 |
| 'Kd' | 0 | 0 | — | — | 9.2615 | 1.5437 |
| 'Ki' | 0 | 0 | — | — | 9.9899 | 1.5492 |
| $(S_p - S_c)^* *(\dot{S}_p - \dot{S}_c)$ | 14.7445 | 0.9209 | — | — | 13.5519 | 0.5222 |

In this case the output of FC_FNN gives unacceptable control of the swing motion.

TABLE 11

| | P(I)D | | FNN_P(I)D | | Scoptimizer | |
|---|---|---|---|---|---|---|
| | Range | Deviation | Range | Deviation | Range | Deviation |
| 'e' | 3.6429 | 0.1447 | — | — | 3.5974 | 0.1420 |
| 'de' | 3.7624 | 0.2177 | — | — | 4.4991 | 0.2403 |
| 'l' | 3.6429 | 0.1447 | — | — | 3.5974 | 0.1420 |
| '$\dot{l}$' | 3.7631 | 0.2170 | — | — | 4.4991 | 0.2404 |
| 'dSp' | 19.5747 | 1.1262 | — | — | 30.6159 | 1.4965 |
| 'Sp' | 18.9028 | 0.9256 | — | — | 23.1497 | 1.1836 |
| 'dSc' | 97.8403 | 5.6594 | — | — | 94.1772 | 4.6575 |
| 'Sc' | 95.0564 | 4.6141 | — | — | 72.0488 | 3.6436 |
| 'U' | 36.7835 | 0.8077 | — | — | 28.7214 | 1.0880 |
| 'Kp' | 0 | 0 | — | — | 9.9998 | 0.5328 |

TABLE 11-continued

| | P(I)D | | FNN_P(I)D | | Scoptimizer | |
|---|---|---|---|---|---|---|
| | Range | Deviation | Range | Deviation | Range | Deviation |
| 'Kd' | 0 | 0 | — | — | 8.6156 | 0.6355 |
| 'Ki' | 0 | 0 | — | — | 9.4755 | 0.8124 |
| $(S_p - S_c)^* *(\dot{S}_p - \dot{S}_c)$ | 2.9475 | 166.9512 | — | — | 1.4757 | 75.4050 |

In Table 11, the FC_FNN gives unacceptable control of the swing motion under unknown conditions. The simulation results show that the FC with the KB generated by the SC optimizer is more effective and robust than P(I)D and FNN control under new conditions such as different excitations, different reference signal and different initial conditions.

Although the foregoing has been a description and illustration of specific embodiments of the invention, various modifications and changes can be made thereto by persons skilled in the art, without departing from the scope and spirit of the invention as defined by the claims attached hereto.

What is claimed is:

1. A method for optimizing a knowledge base in a soft computing controller, comprising:

selecting a fuzzy model by selecting one or more parameters, said one or more parameters comprising at least one of a number of input variables, a number of output variables, a type of fuzzy inference model, and a teaching signal;

optimizing linguistic variable parameters of a knowledge base according to said one or more parameters to produce optimized linguistic variables;

ranking rules in said rule base according to firing strength;

eliminating rules with relatively weak firing strength leaving selected rules from said rules in said rule base; and optimizing said selected rules, using said fuzzy model, said linguistic variable parameters and said optimized linguistic variables, to produce optimized selected rules.

2. The method of claim 1, further comprising optimizing said selected rules using a derivative-based optimization procedure.

3. The method of claim 1, further comprising optimizing parameters of membership functions of said optimized selected rules to reduce approximation errors.

* * * * *

UNITED STATES PATENT AND TRADEMARK OFFICE
CERTIFICATE OF CORRECTION

PATENT NO. : 7,219,087 B2
APPLICATION NO. : 10/897978
DATED : May 15, 2007
INVENTOR(S) : Panfilov et al.

Page 1 of 1

It is certified that error appears in the above-identified patent and that said Letters Patent is hereby corrected as shown below:

Column 3 at line 21, after "rules" insert --.--.

Column 3 at line 44, change "$R_{\theta 2}^1$" to --$R_{fs}^1$--.

Column 13 at line 30, change " $x_{1_2}(t)$ " to -- $x_{l_2}(t)$ --.

Column 13 at line 39, change "$\Sigma_2^1$" to --$\mu_2^1$--.

Column 21 at approximately line 43, change " $k_t \int_0 e$ " to -- $k_t \int_0 e$ --.

Column 23 at approximately line 9, change "back" to --Back--.

Column 23 (Table 3, Column 2) at approximately line 52, change "$l_0$" to --$i_o$--.

Column 27 at approximately line 6, change "back" to --Back--.

Column 27 at line 14, change "see" to --use--.

Column 27 (Table 8, Column 1) at approximately line 33, change "'θ'" to -- '$\dot{\theta}$' --.

Column 28 (Table 10, Column 1) at approximately line 15, change "'θ'" to -- '$\dot{\theta}$' --.

Signed and Sealed this

Sixth Day of May, 2008

JON W. DUDAS
*Director of the United States Patent and Trademark Office*